US010657228B1

(12) United States Patent
Kaplan et al.

(10) Patent No.: US 10,657,228 B1
(45) Date of Patent: *May 19, 2020

(54) TECHNOLOGIES FOR INTEGRATING CLOUD CONTENT ITEMS ACROSS PLATFORMS

(71) Applicant: Dropbox, Inc., San Francisco, CA (US)

(72) Inventors: Joshua Kaplan, San Francisco, CA (US); Jason Terk, San Francisco, CA (US); Stan Yeung, Oakland, CA (US)

(73) Assignee: Dropbox, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/582,425

(22) Filed: Sep. 25, 2019

Related U.S. Application Data

(60) Provisional application No. 62/756,367, filed on Nov. 6, 2018.

(51) Int. Cl.
*G06F 21/10* (2013.01)
*H04L 29/08* (2006.01)
(Continued)

(52) U.S. Cl.
CPC ............ *G06F 21/10* (2013.01); *G06F 16/183* (2019.01); *G06F 16/9538* (2019.01);
(Continued)

(58) Field of Classification Search
None
See application file for complete search history.

(56) References Cited

U.S. PATENT DOCUMENTS 5,781,732 A * 7/1998 Adams ................... G06Q 10/10
709/205
7,584,199 B2 9/2009 Matsusaka
(Continued)

FOREIGN PATENT DOCUMENTS

CN 105100170 A 11/2015

OTHER PUBLICATIONS

Nelson, "Wide-Area Software-Defined Storage", ProQuest Dissertations & Theses Global: The Sciences and Engineering Collection, 267 pp. (2018).
(Continued)

*Primary Examiner* — Backhean Tiv
(74) *Attorney, Agent, or Firm* — Polsinelli PC

(57) ABSTRACT

Systems and methods for integrating cloud-based and cloud-backed content items with a content management system are provided. In some examples, a method can include receiving a request to access a canonical content item stored at a content management system, the canonical content item representing a cloud-based content item or a cloud-backed content item having features designed for access through a native online application associated with a cloud content provider; in response to the canonical content item being invoked, sending, from a local application to the cloud content provider, a request for the features of the content item; receiving, at the local application and from the cloud content provider, metadata for enabling the features of the content item; and based on the metadata, providing, on the local application, the features and a content of the content item as part of a rendered instance of the canonical content item.

20 Claims, 27 Drawing Sheets

(51) Int. Cl.
 *G06F 16/182* (2019.01)
 *G06F 16/9538* (2019.01)
(52) U.S. Cl.
 CPC .......... *H04L 67/06* (2013.01); *H04L 67/1097* (2013.01); *H04L 67/32* (2013.01); *G06F 2221/0713* (2013.01)

(56) References Cited

U.S. PATENT DOCUMENTS

| | | | | |
|---|---|---|---|---|
| 7,818,678 | B2* | 10/2010 | Massand | G06F 40/197 715/751 |
| 8,196,029 | B1* | 6/2012 | Rucker | G06F 40/197 715/200 |
| 8,984,536 | B1* | 3/2015 | Hushon, Jr. | G06F 9/542 719/318 |
| 9,436,635 | B1* | 9/2016 | Hushon, Jr. | G06F 13/372 |
| 9,646,010 | B2 | 5/2017 | Mokhtarzada | G06F 16/1824 |
| 9,767,101 | B2* | 9/2017 | Abramson | G06F 16/48 |
| 9,836,549 | B2* | 12/2017 | Heinrich | G06F 16/972 |
| 9,946,691 | B2 | 4/2018 | Grigorovitch et al. | |
| 10,007,804 | B2 | 6/2018 | Redberg | |
| 10,013,574 | B2 | 7/2018 | Hore | |
| 10,057,140 | B2* | 8/2018 | Fulton | H04L 41/5093 |
| 10,157,084 | B2 | 12/2018 | Nachtrab et al. | |
| 10,291,395 | B1* | 5/2019 | Nenov | H04L 9/14 |
| 10,476,758 | B2* | 11/2019 | Marvin | G06F 9/542 |
| 2005/0097441 | A1* | 5/2005 | Herbach | G06F 21/10 715/229 |
| 2005/0289512 | A1* | 12/2005 | Matsusaka | G06F 9/526 717/120 |
| 2008/0059539 | A1* | 3/2008 | Chin | G06Q 10/10 |
| 2009/0182778 | A1* | 7/2009 | Tormasov | G06F 16/176 |
| 2010/0325199 | A1* | 12/2010 | Park | G06F 16/10 709/203 |
| 2011/0161795 | A1* | 6/2011 | Bellwood | G06F 40/166 715/210 |
| 2012/0290926 | A1* | 11/2012 | Kapadia | G06F 40/197 715/255 |
| 2012/0297183 | A1* | 11/2012 | Mukkara | H04L 9/0894 713/153 |
| 2014/0222917 | A1* | 8/2014 | Poirier | H04L 65/403 709/204 |
| 2014/0280484 | A1 | 9/2014 | Klemenz et al. | |
| 2014/0372906 | A1* | 12/2014 | Campbell | H04L 65/602 715/753 |
| 2015/0039360 | A1* | 2/2015 | Gowdra | G06F 8/71 705/7.12 |
| 2015/0302421 | A1* | 10/2015 | Caton | G06K 19/06037 705/17 |
| 2015/0370796 | A1* | 12/2015 | Abramson | G06F 16/48 707/726 |
| 2016/0182515 | A1* | 6/2016 | Barraclough | G06F 40/134 726/4 |
| 2016/0241509 | A1 | 8/2016 | Akcin | |
| 2017/0024392 | A1 | 1/2017 | Shah et al. | |
| 2017/0078302 | A1* | 3/2017 | Mellor | H04L 63/102 |
| 2017/0214726 | A1* | 7/2017 | Malatesha | G06F 3/0482 |
| 2017/0272335 | A1* | 9/2017 | Hamlin | H04L 41/5045 |
| 2017/0279859 | A1* | 9/2017 | Pogorelik | G06F 3/04817 |
| 2018/0027006 | A1* | 1/2018 | Zimmermann | H04L 63/0227 726/11 |
| 2018/0074786 | A1 | 3/2018 | Oberbreckling et al. | |
| 2018/0113870 | A1* | 4/2018 | Rogers | G06F 16/44 |
| 2018/0322510 | A1 | 11/2018 | Cleaver et al. | |
| 2019/0272281 | A1* | 9/2019 | Hawa | H04L 67/06 |
| 2019/0318015 | A1* | 10/2019 | Cheesman | G06F 16/176 |

OTHER PUBLICATIONS

Notice of Allowance from U.S. Appl. No. 16/582,455, dated Dec. 12, 2019, 9 pages.
Non-Final Office Action from U.S. Appl. No. 16/582,361, dated Jan. 8, 2020, 8 pages.

* cited by examiner

TECHNOLOGIES FOR INTEGRATING CLOUD CONTENT ITEMS ACROSS PLATFORMS

CROSS-REFERENCE TO RELATED APPLICATIONS

This application claims the benefit of, and priority to, U.S. Provisional Patent Application No. 62/756,367, filed on Nov. 6, 2018, entitled "TECHNOLOGIES FOR INTEGRATING CLOUD-BASED DOCUMENTS ACROSS PLATFORMS", the contents of which are hereby expressly incorporated by reference in their entirety.

This application is also related to U.S. Non-Provisional patent application Ser. No. 16/582,361, filed on Sep. 25, 2019, entitled "TECHNOLOGIES FOR INTEGRATING CLOUD-BASED DOCUMENTS ACROSS PLATFORMS"; U.S. Non-Provisional patent application Ser. No. 16/582,674, filed on Sep. 25, 2019, entitled "TECHNOLOGIES FOR INTEGRATING CLOUD-BASED DOCUMENTS ACROSS PLATFORMS"; U.S. Non-Provisional patent application Ser. No. 16/582,685, filed on Sep. 25, 2019, entitled "TECHNOLOGIES FOR INTEGRATING CLOUD-BASED DOCUMENTS ACROSS PLATFORMS"; U.S. Non-Provisional patent application Ser. No. 16/582,809, filed on Sep. 25, 2019, entitled "TECHNOLOGIES FOR INTEGRATING CLOUD-BASED DOCUMENTS ACROSS PLATFORMS"; and U.S. Non-Provisional patent application Ser. No. 16/582,455, filed on Sep. 25, 2019, entitled "TECHNOLOGIES FOR INTEGRATING CLOUD-BASED DOCUMENTS ACROSS PLATFORMS"; the contents of which are hereby expressly incorporated by reference in their entirety.

TECHNICAL FIELD

The present technology pertains to integration of cloud content items with distributed storage, collaboration and synchronization systems.

BACKGROUND

Cloud storage systems allow users to store and access data on the cloud. A cloud storage system can allow users to maintain a variety of content items stored on, and accessible from, a single cloud storage system. Some cloud storage systems allow users to share data with other users and access the data in a collaborative fashion. Moreover, some cloud storage systems may also support synchronization of copies of data across a number of client devices and servers so each copy of the data is identical and locally accessible from the client devices. The synchronization functionality can enable users to store local copies of the data on their client devices and access the local copies of the data from their client devices. The local copies of the data can be synchronized with the data on the cloud storage systems to ensure consistency between local and cloud copies of the data. The local copies of the data may provide users with faster access to the data and may allow users to access the data when their client devices are offline.

Increasingly, users are using a variety of cloud-based or cloud-backed content items and applications from different cloud-based services. Often, such cloud-based or cloud-backed content items are stored across separate cloud storage systems associated with the different cloud-based services. Many of such cloud-based applications do not operate on traditional files, instead operating on the cloud-based content items, which are typically designed specifically for the cloud-based applications. For example, the cloud-based content items may have specific formats and functionalities that may only be supported by specific cloud-based applications and services associated with those cloud-based content items.

In many cases, a cloud-based or cloud-backed content item cannot be represented in file-based storage systems, and its content cannot be rendered using other applications, such as traditional file applications, or may lose some cloud-backed features and functionalities when rendered through an application other than the specific cloud-based application associated with the cloud-based document. Disadvantageously, the increasing use of cloud-based and cloud-backed content items and applications from different cloud-based services and the lacking or limited support for such content items by a single storage solution have created an explosion of content items that are increasingly scattered across different systems and devices.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
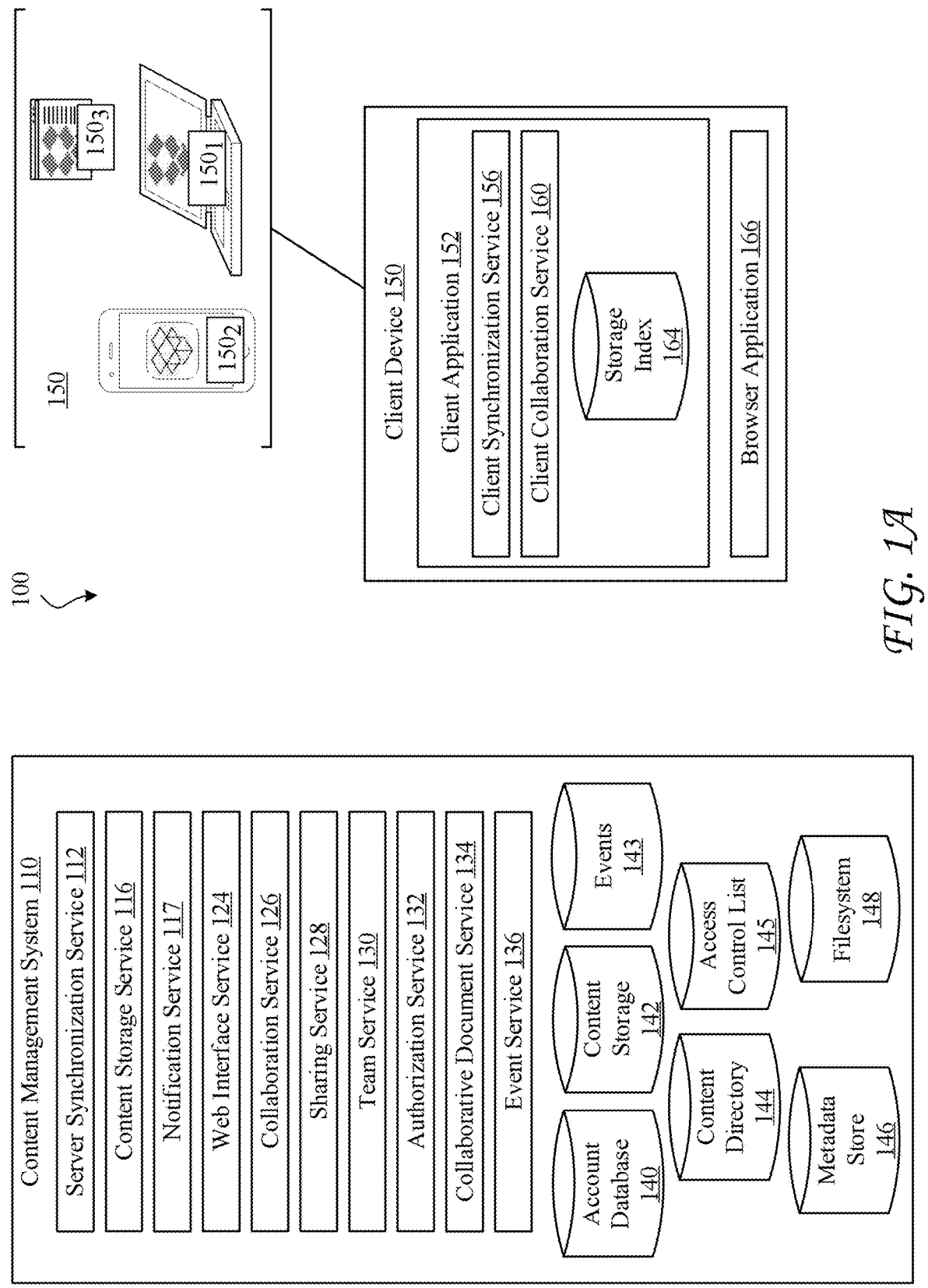
FIG. 1A shows an example configuration of a computing environment including a content management system and client devices.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Cloud storage systems allow users to store and access content items across multiple devices. The content items may include, but are not limited to, files, documents, messages (e.g., email messages or text messages), media files (e.g., photos, videos, and audio files), folders, or any other unit of content. Content items may be shared with multiple users, edited, deleted, added, renamed, moved and/or otherwise accessed or manipulated. However, in many cases, a single cloud storage system or solution may not be capable of representing, rendering, and/or managing content items, such as cloud-based and cloud-backed content items, created or supported by specific cloud-based applications hosted by different cloud-based services or providers. As a result, users often store and access such content items from different cloud storage and content systems, while maintaining and accessing other content items on separate cloud storage systems.

Moreover, as previously explained, the increasing use of cloud-based or cloud-backed content items and applications from different cloud-based services and the lacking or limited support for such content items by a single storage solution have created an explosion of content items that are increasingly scattered across different systems and devices. The scattered nature of a user's content can significantly hamper the user's ability to organize the content, gain uniform or complete access to the content and associated functionalities from a single cloud storage system, and collaborate with other users. These issues can quickly multiply as users attempt to collaborate with more users and implement a growing variety of cloud-based and cloud-backed content items and applications, often causing content silos that are extremely difficult to manage.

The technologies herein can provide an integrated and unified solution that addresses or overcomes the foregoing and other technical problems and limitations. For example, the technologies herein can provide a cloud storage solution that is capable of organizing, representing and rendering cloud-based and cloud-backed documents from a wide variety of cloud-based applications or services while maintaining support for the various cloud-based or cloud-backed functionalities associated with such cloud-based and cloud-backed content items, such as content creation within the cloud-based or cloud-backed content items. In some cases, the cloud storage solution herein can also extend the functionalities or features of such cloud-based and cloud-backed content items to include additional functionalities or features provided by the cloud storage solution herein, such as sharing, organization, collaboration, and security functionalities or features.

In some aspects, the disclosed technologies are deployed in the context of a content management system, such as a cloud storage service, having content item synchronization capabilities and collaboration features, among others. An example configuration 100 of a content management system and environment is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items or objects associated with the content items or user accounts can be stored in metadata store 146. Likewise, data regarding where a content item is stored in content storage 142 can be stored in content directory 144. Additionally, data regarding changes, access, etc., can be stored in filesystem 148.

Each of the various storages/databases such as content storage 142, content directory 144, filesystem 148, and metadata store 146 can be comprised of more than one such storage or database and can be distributed over many devices and locations. Other configurations are also possible. For example, data from content storage 142, content directory 144, filesystem 148, and/or metadata store 146 may be combined into one or more content storages or databases or further segmented into additional content storages or databases. Thus, content management system 110 may include more or less storages and/or databases than shown in FIG. 1A.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata store 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata store 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata store 146, in association with the unique ID of the content item.

Content storage service 116 can also store a log of data regarding changes, access, etc., in filesystem 148. Filesystem 148 can include the unique ID of the content item and a description of the change or access action along with a time stamp or version number and any other relevant data. Filesystem 148 can also include pointers to blocks affected by the change or content item access. Content storage service can provide the ability to undo operations, by using a content item version control that tracks changes to content items, different versions of content items (including diverging version trees), and a change history that can be acquired from the filesystem 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a browser application 166, such as a web browser. For example, client device 150 can use browser application 166 to access web pages and content on content management system 110. However, client devices can also access content management system 110 using client application 152 stored and running on client device 150. Client application 152 can include a client synchronization service 156. Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update filesystem 148, metadata store 146, content directory 144, content storage 142, account database 140, etc. as appropriate.

When synchronizing from content management system 110 to client device 150, a mount, modification, addition, deletion, move of a content item recorded in filesystem 148 can trigger a notification to be sent to client device 150 using notification service 117. When client device 150 is informed of the change a request changes listed in filesystem 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 136 can generate an event for such interaction. When event service 136 detects a user interaction with a content item and/or another user, event service 136 can create an event identifier (e.g., unique event identifier) and event type, and associate the event identifier and event type with the user (e.g., user identifier and namespace identifier) to create an event or event record for the interaction. After the event is created, event service 136 can send the event identifier and any information associated with the event to events store 143 for storage.

Events store 143 can include one or more storage systems, such as one or more databases, for storing events and associated information. In some examples, events store 143 can include a distributed database or distributed storage system. Events store 143 can receive and store the event data for access by content management system 110.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item. Content management system 110 (e.g., via event service 136) and/or client device 150 can track user interactions with content, such as read or write events, and maintain a history of such events and interactions for a user (e.g., events store 143).

In some embodiments, content management system 110 can report a history of user interaction with a shared content item. Collaboration service 126 can query data sources such as events store 143, metadata store 146 and filesystem 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata store 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While configuration 100 is presented with specific components, it should be understood by one skilled in the art, that the architectural configuration of system 100 is simply one possible configuration and that other configurations with more or fewer components are possible.

Figure 1B:
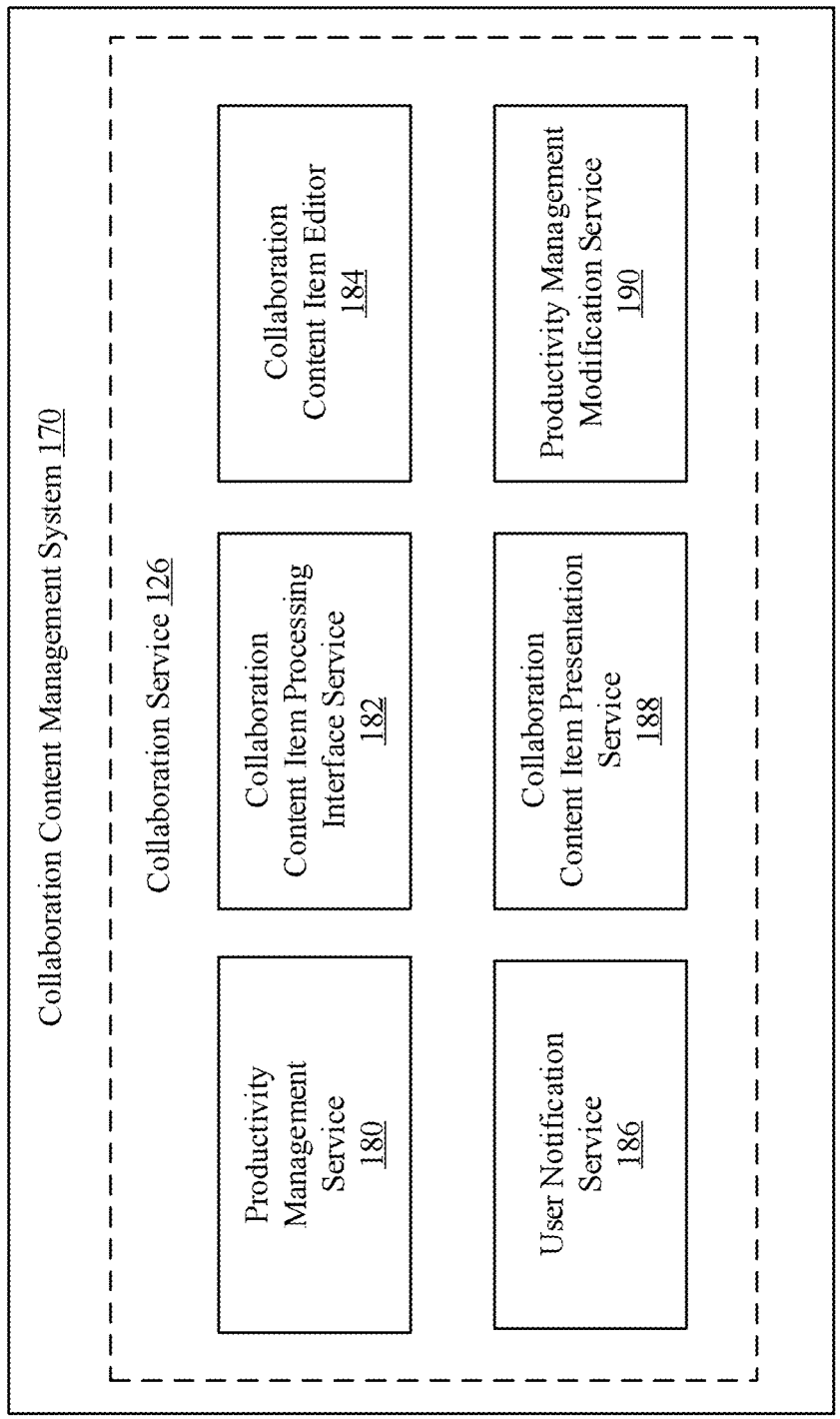
FIG. 1B shows an example collaboration content management system.

FIG. 1B shows an example collaboration content management system 170, according to some examples. Collaboration content management system 170 can include one or more servers and/or applications for hosting and running collaboration service 126. Collaboration content management system 170 can be part of content management system 110 or separate from content management system 110. For clarity and explanation purposes, collaboration content management system 170 will be described herein as part of content management system 110.

Collaboration service 126 can include one or more components and/or services. For example, collaboration service 126 may include productivity management service 180, collaboration content item processing interface service 182, collaboration content item editor 184, user notification service 186, collaboration content item presentation service 188, and productivity management modification service 190. Productivity management service 180, collaboration content item processing interface service 182, collaboration content item editor 184, user notification service 186, collaboration content item presentation service 188, and/or productivity management modification service 190 can include one or more services, components, devices, etc., such as physical servers, virtual machines, software containers, etc. Moreover, one or more of productivity management service 180, collaboration content item processing interface service 182, collaboration content item editor 184, user notification service 186, collaboration content item presentation service 188, and productivity management modification service 190 may be coupled to one another or to components not explicitly shown.

Productivity management service 180 may be configured to gather productivity data from content management system 110. In various embodiments, productivity management service 180 identifies an event and gathers information related to the event. For instance, productivity management service 180 may gather a specific calendar entry and/or a specific task from an online calendar. Productivity management service 180 may further gather information from the calendar entry or gather information related to the calendar entry such as time(s), date(s), relevant locations, title(s), agenda(s), summaries, description(s), and/or attendees related to the event. Productivity management service 180 may provide the productivity data to the other modules of collaboration service 126.

Collaboration content item processing interface service 182 may be configured to interface with collaboration service 126. In various embodiments, collaboration content item processing interface service 182 may provide collaboration content items to one or more modules of collaboration service 126, as described further herein.

Collaboration content item editor 184 may be configured to create and/or modify collaboration content items. A collaboration content item may be created in a variety of ways. In some embodiments, collaboration content item editor 184 enables creation of the collaboration content item into the content management system 106. Collaboration content item editor 184 may enable access to or be any collaboration content item editing application (e.g., Microsoft Word®, Google Docs®, or the like) either in the cloud or executed locally. In one example, content management system 106 may provide to one of client devices 150 a user interface element (e.g., a box or a button) that allows creation of a new collaboration content item.

In some embodiments, collaboration content item editor 184 may create the collaboration content item in conjunction with the productivity management service 180. For example, collaboration content item editor 184 may provide a suggestion to a user to create or invoke a collaboration content item associated with an upcoming event. In various embodiments, collaboration service 126 may identify a user that is opening or otherwise using collaboration content item editor 184. Productivity management service 180 may identify an upcoming event for the user on the user's calendar. Subsequently, collaboration content item editor 184 may provide a suggestion to the user to create or invoke the collaboration content item associated with the upcoming event.

Although it is discussed that collaboration content item editor 184 may provide a suggestion to the user to create or invoke the collaboration content item associated with the upcoming event, it will be appreciated that the suggestion to create or invoke the collaboration content item may be made by any application. For example, a user may log into and/or otherwise access any application or suite of applications. Once the user is identified and an upcoming event is identified on the user's calendar, any application may provide the user with the suggestion to create or invoke the collaboration content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaboration content item in response to the suggestion, collaboration content item editor 184 may create or invoke the requested collaboration content item. If the application that provided the suggestion to the user is not a collaboration content item editor, then a collaboration content item editor may be executed and the requested collaboration content item created and/or invoked in response to the user's request.

In accordance with some embodiments, collaboration content item editor 184 may configure the productivity management service 180 to provide access to the collaboration content item (e.g., using a link, including the collaboration content item, or any other mechanism to enable access to the collaboration content item) in a meeting request, a task entry, or the like. In some embodiments, collaboration content item editor 184 may instruct productivity management service 180 to place an icon corresponding to a link to the collaboration content item in the calendar entry, meeting request, task entry, or the like. When a user has opened the link (e.g., by clicking the icon), the user may be directly guided to the collaboration content item from the meeting request, task entry, or the like. In one example, the link in the calendar entry may provide the user (e.g., using client device 150) access to a collaboration content item stored in content management system 106 (e.g., in storage accessible through the cloud) or in productivity management service 180.

Once the user requests to create or invoke the collaboration content item, collaboration content item editor 184 may create and/or invoke a collaboration content item. The collaboration content item may be subsequently edited, altered, viewed, changed, stored, and/or the like by an editing application (e.g., either stored locally on a client device or in the cloud). In various embodiments, one or more different client devices 150 may utilize different editing applications to make changes to the collaboration content item. Collaboration content item editor 184 and/or other editing applications may allow for the collaboration content item to be changed by multiple different users using different client devices 150 at the same time or substantially at the same time (e.g., in real time or substantially in real time).

It will be appreciated that users may be automatically guided to a collaboration content item related to a calendar entry, meeting request, a task entry, or the like without human intervention. In some embodiments, users may be guided to a collaboration content item related to a calendar entry, a meeting request, a task entry, or the like without having the users separately open collaboration content item editing applications. Such functionalities may prove particularly convenient for users seeking to take, review, or collaborate on notes associated with an event, as these users need not open applications other than productivity management applications.

Collaboration content item editor 184 may receive from users additional content for the collaboration content item. For example, collaboration content item editor 184 may be configured to receive from client devices 150 changes or edits to the collaboration content item. In various embodiments, the changes may include text, characters strings, or the like. The changes may also include annotations to the collaboration content item, comments to the collaboration content item, files to be attached to the collaboration content item, pictures to be attached to the collaboration content item, links to be attached to the collaboration content item, tasks related to the collaboration content item, or the like that can be incorporated into the collaboration content item. In various embodiments, edits to the collaboration content item are collaboration. For instance, collaboration content item editor 184 may obtain edits (e.g., text changes and/or additions of audio files, pictures, tables, or the like) from any number of client devices 150 at a given time (or in real time). Collaboration edits may be incorporated in a variety of formats, including formats that provide different text attributes such as colors, fonts, styles, or the like for different users.

In various embodiments, collaboration content item editor 184 (and or a security or permissions module associated with a server) may establish permissions and/or security for the collaboration content item. For example, collaboration content item editor 184 may enable event attendees to view and/or make edits to the collaboration content item while others may not have rights to view the collaboration content items and/or make changes. Permissions and/or security may be enforced in any number of ways. However, access to the collaboration content item may, in various embodiments, be provided to attendees of the event or a subset of attendees.

In some implementations, users can enter commands by providing pre-established primitives. A primitive can be a specified sequence of one or more characters that the content management system 106 recognizes as mapped to particular functionality. In some implementations, a primitive can be followed by one or more parameters specifying how the system should implement the corresponding functionality. Examples of primitives include a user identification primitive (e.g., "@" followed by a username parameter—referred to herein as a mention of a user), a task creation primitive (e.g., "[ ]" followed by a task title parameter), an emoji selector primitive (e.g., ":"), a content item selector and reference insertion primitive (e.g., "+" followed by at contentItem title parameter), a bullet list primitive (e.g., "*"), etc. Primitive parameters can define the corresponding functionality in various ways.

For example, the + primitive can operate by taking the content specified by a contentItemTitle parameter and attempting to match it to an existing content item. In some implementations, when such a match is found, the primitive, and any associated parameter, can be replaced in the collaboration content item with a reference to the content item, such as a URL. Such a reference, when activated, can load the referenced collaboration content item. In some implementations, a primitive can take another primitive as a parameter. For example, the content "[ ] @Jane" can be interpreted such that @Jane links to a user with the username "Jane," and this link is used by the primitive "[ ]" to creates a new task, where that task is assigned to the user Jane.

In various embodiments, collaborative content item editor 184 (and or a security or permissions module associated with a server) may establish permissions and/or security for the collaborative content item. For example, collaborative content item editor 184 may enable event attendees to view and/or make edits to the collaborative content item while others may not have rights to view the collaborative content items and/or make changes. Permissions and/or security may be enforced in any number of ways.

However, access to the collaborative content item may, in various embodiments, be provided to attendees of the event or a subset of attendees.

In various embodiments, access to the collaboration content item is limited based on storage access rights. For example, a user with access rights to cloud storage may access, view, and/or make changes to the collaboration content item. In some embodiments, a user with access rights assigned by the content management system 106 may access, view, and/or make changes to the collaboration content item.

User notification service 186 may be configured to notify users of each of client devices 150 of information related to the state and/or contents of the collaboration content item. Notifications may be sent, for example as an email notification, a chat message notification, a notification in a display of the collaboration content item, or in relation to the collaboration content item through a file system or other organizational system. In various embodiments, user notification service 186 provides notifications about changes to client devices 150. For example, user notification service 186 may notify users whether a collaboration content item has been created for an event. As another example, user notification service 186 may notify specific users that they have been invited to attend an event.

Collaboration content item presentation service 188 may provide to client devices 150 selected collaboration content items. The collaboration content items may be displayed in client devices 150 through a native application, an Internet browsing window, or the like supported by client devices 150.

It will be appreciated that collaboration content item presentation service 188 may restrict writing permissions to the collaboration content items at any time. In an example, prior to occurrence of the event, collaboration content item presentation service 188 may restrict writing permissions to the collaboration content item (and turn the collaboration content item into a read-only collaboration content item) for all users except the creator or invoker of the collaboration content item. In some embodiments, the creator or invoker of the collaboration content item may select a subset of recipients to receive writing permissions.

Collaboration content item presentation service 188 may also support a collaboration content item viewing portal users can use to view existing collaboration content items. The collaboration content item viewing portal may order specific collaboration content items based on one or more ordering factors. "Ordering factors," as used herein, may include any factors used to order collaboration content items. Ordering factors can include factors used to order collaboration content items chronologically. More specifically, in some embodiments, the collaboration content item viewing portal orders collaboration content items according to the date(s) and/or times the collaboration content items were created. The collaboration content item viewing portal may also order collaboration content items according to the date(s) and/or time(s) the collaboration content items were edited. In various embodiments, the collaboration content item viewing portal orders collaboration content items according to the date(s) and/or time(s) of corresponding events to which the collaboration content items were related. Ordering factors can also include factors used to order collaboration content items according to the preferences of a specific user, such as whether the user has accepted events to which the collaboration content items were related.

In some embodiments, a collaboration content item viewing portal may be dedicated to a particular user who has received access to the collaboration content item because the particular user was related to an event. The user's collaboration content item viewing portal may provide access to any number of collaboration content items including the collaboration content item. The collaboration content items represented in the collaboration content item viewing portal may be ordered in any number of ways. For example, the collaboration content item viewing portal may order collaboration content items based on date and time of corresponding events.

The collaboration content item viewing portal may support search functions. For instance, the collaboration content item viewing portal may enable or allow searching for collaboration content items according to textual strings, titles, event attendees, and/or other attributes. The search functions may allow a specific user to search one or more collaboration content items for that user or for other users.

In some embodiments, productivity management modification service 190 may be configured to coordinate collaboration content items with calendar entries and to enable access to the collaboration content item through calendar entries.

Figure 2:
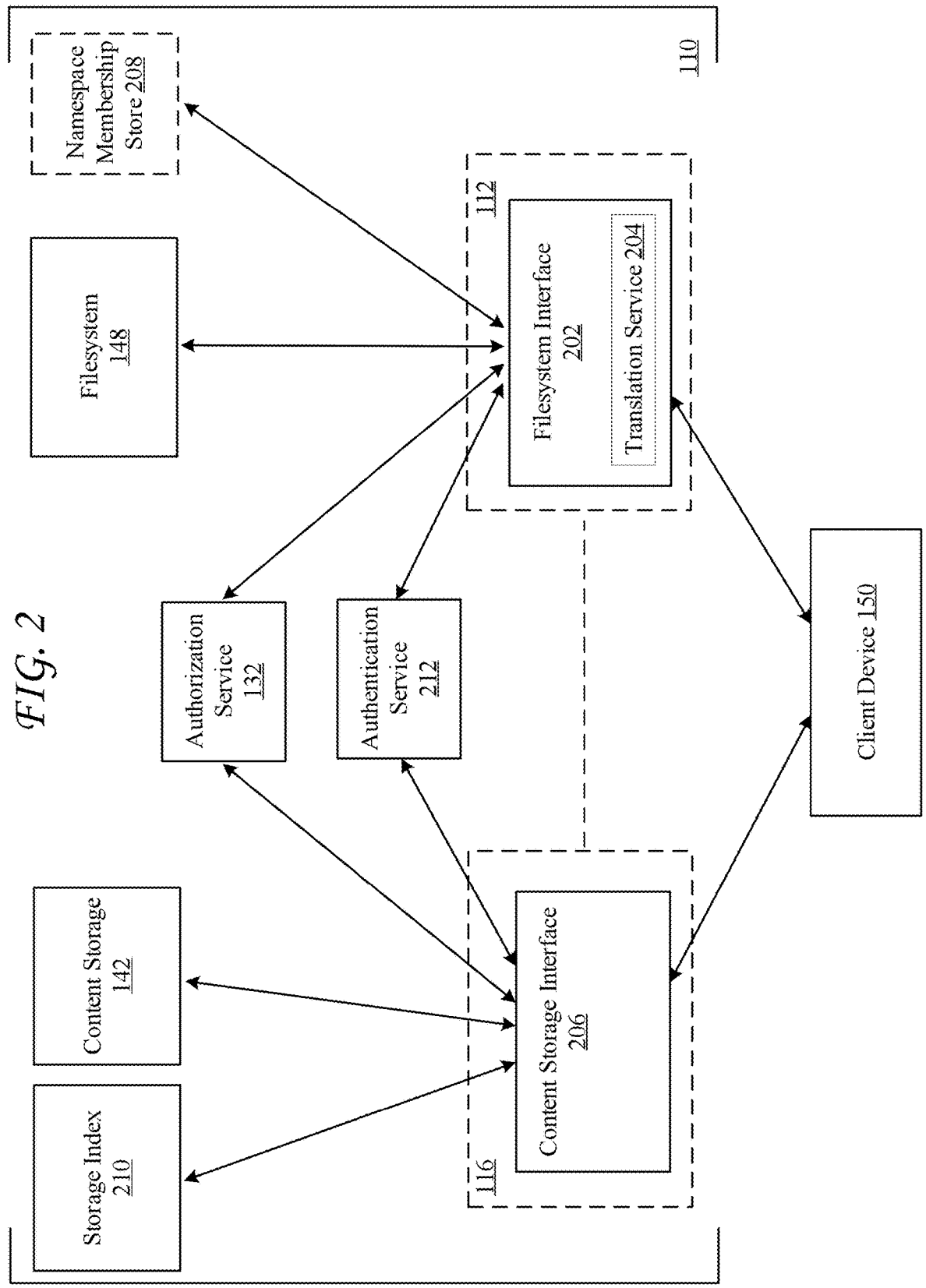
FIG. 2 shows a schematic diagram of an example architecture for synchronizing content between a content management system and client devices.

FIG. 2 shows a schematic diagram of an example architecture for synchronizing content between content management system 110 and client device 150 in configuration 100. In this example, client device 150 interacts with content storage 142 and filesystem 148 respectively via content storage interface 206 and filesystem interface 202. Content storage interface 206 can be provided or managed by content storage service 116, and filesystem interface 202 can be provided or managed by server synchronization service 112. For example, content storage interface 206 can be a subcomponent or subservice of content storage service 116, and filesystem interface 202 can be a subcomponent or subservice of server synchronization service 112.

Content storage interface 206 can manage communications, such as content requests or interactions, between client device 150 and content storage 142. Content storage interface 206 can process requests from client device 150 to upload and download content to and from content storage 142. Content storage interface 206 can receive content requests (e.g., downloads, uploads, etc.) from client device 150, authenticate client device 150 via authentication service 212, communicate with authorization service 132 to determine if client device 150 (and/or the request from client device 150) is authorized to upload or download the content to or from content storage 142 (e.g., based on permissions in access control list 145), and interact with content storage 142 to download or upload the content associated with the content requests from client device 150. If the request from client device 150 is a request to download a content item, content storage interface 206 can retrieve the content item from content storage 142 and provide the content item to client device 150. If the request from client device 150 is a request to upload a content item, content storage interface 206 can obtain the content item from client device 150 and upload the content item to content storage 142 for storage.

When processing content requests from client device 150, content storage interface 206 can communicate with storage index 210 to check the availability and/or storage location of the requested content in content storage 142, and track content items in content storage 142. Storage index 210 can maintain an index of content items on content storage 142, which identifies the content items on content storage 142 and can also identify a respective location of the content items within content storage 142. Thus, storage index 210 can track content items on content storage 142 as well as storage locations of the content items. Storage index 210 can track entire content items, such as files, and/or portions of the content items, such as blocks or chunks. In some cases, content items can be split into blocks or chunks, which can be stored at content storage 142 and tracked in storage index 210. For example, content storage 142 can store a content item as blocks or chunks of data that include respective data portions of the content item. Storage index 210 can track the blocks or chunks of the content item stored in content storage 142.

Filesystem interface 202 can manage communications, such as metadata requests and content synchronizations and operations, between client device 150 and filesystem 148. For example, filesystem interface 202 can translate, validate, authenticate, and/or process operations, configurations, and state information between client device 150 and filesystem 148. Filesystem interface 202 can verify permissions from an FSAuth token in a cursor or through authorization service 132 to authorize, or verify authorization of, requests sent by client device 150 to filesystem 148. When processing requests or operations from client device 150, filesystem interface 202 can access namespace membership store 208 to determine or verify namespace ownership information for any namespaces associated with the requests or operations from client device 150, and verify permissions of content associated with the requests or operations from client device 150.

Translation service 204 in filesystem interface 202 can perform linearization and translation operations for communications between client device 150 and filesystem 148. For example, translation service 204 can translate communications from client device 150 to a different format consistent with the structure and format of data in filesystem 148, and vice versa. To illustrate, in some cases, client device 150 can process content item information (e.g., state, changes, versions, etc.) at client device 150 as operations, while filesystem 148 can process the same information as content item revisions reflected by rows in a data structure such as a database table. To enable synchronization of content item information between client device 150 and filesystem 148, translation service 204 can translate operations from client device 150 into revisions suitable for filesystem 148, and can translate revisions reflected in rows of data on filesystem 148 to operations suitable for client device 150.

In some cases, content management system 110 (e.g., filesystem interface 202, authorization service 132, or content storage interface 206) can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, an encryption key, access permissions to identified content item(s), etc. The token can be provided with or in a cryptographically signed data object called a cursor, which will be described in greater detail below. Content management system 110 (e.g., filesystem interface 202, authorization service 132, or content storage interface 206) can send the token(s) to client device 150, and client device 150 can provide the token to content management system 110 when requesting content item revisions and/or updates to filesystem 148 as further described below. Client device 150 can also provide the token to content storage interface 206 to validate any content requests (e.g., downloads, uploads, etc.). Content storage interface 206 can use the token to authorize queries to storage index 210 and upload or download content items to or from content storage 142.

For example, client device 150 can send to content storage interface 206 a request to upload a content item to content storage 142. The request can include the token and the content item to be uploaded. Content storage interface 206 can use the token to authorize a query to storage index 210 to check if the content item already exists on content storage 142, and/or authorize the upload of the content item to content storage 142. Client device 150 can provide the token to filesystem interface 202 to authorize a request to store metadata on filesystem 148 to track the upload and revision of the content item.

Figure 3:
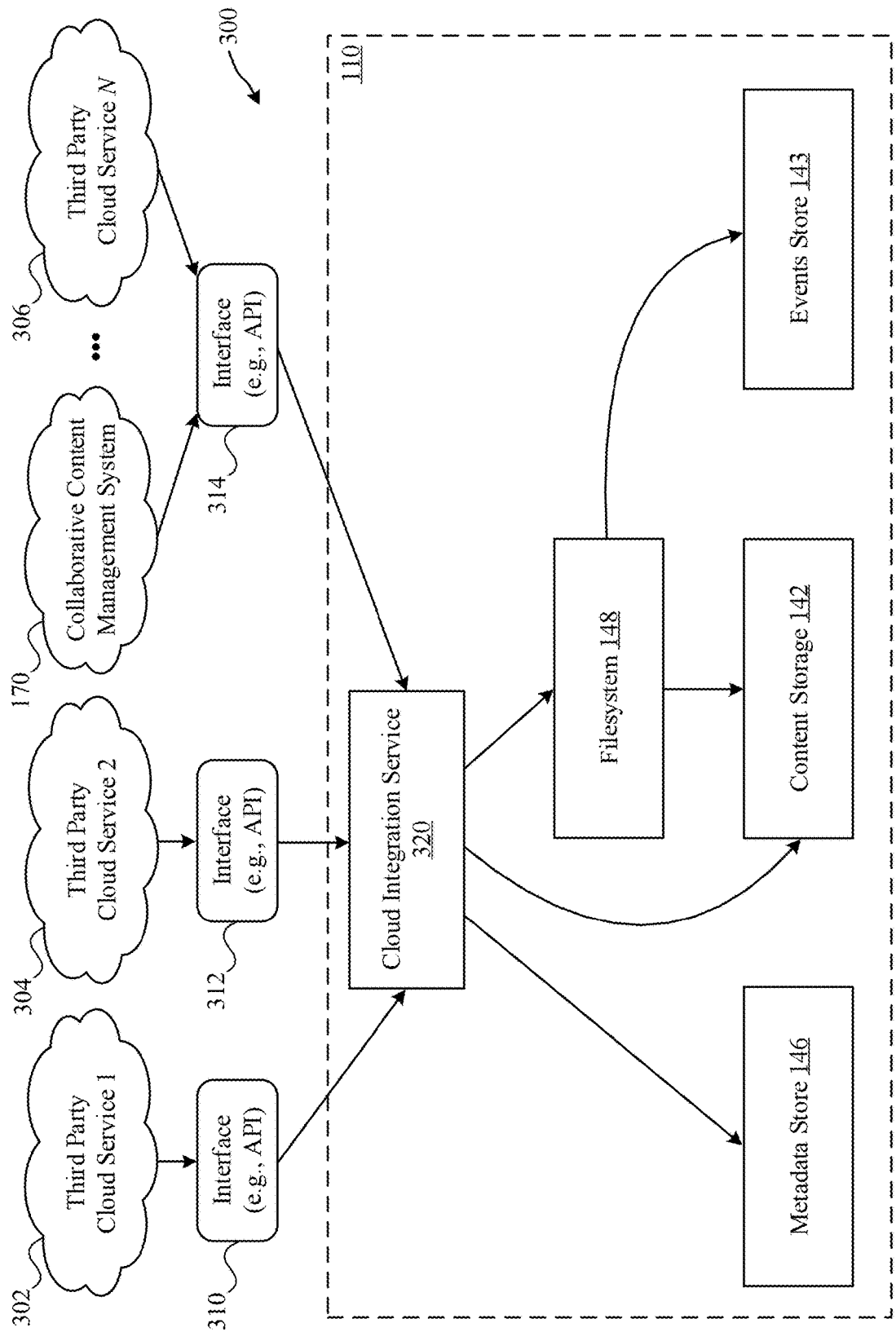
FIG. 3 shows an example architecture for integrating cloud functionalities and content from different cloud services into a content management system.

FIG. 3 shows example architecture 300 for integrating data and functionalities of content items stored on or supported by different cloud services with smart pointers, basic pointers, and/or canonical content items stored on content management system 110. In this example, the different cloud services include third-party cloud services 302, 304, 306 and collaboration content management system 170. Content management system 110 can store and manage smart pointers, basic pointers, canonical content items associated with cloud-based and/or cloud-backed content items, and receive associated content and/or cloud functionalities from third-party cloud services 302, 304, 306, and collaboration content management system 170.

In some cases, third-party cloud services 302, 304, 306 and collaboration content management system 170 can store and manage cloud-based content items, cloud-backed content items, and/or the content or content items associated with smart pointers, basic pointers and/or canonical content items on content management system 110; and can provide respective content, functionalities and/or features (e.g., commenting, collaboration, sharing, editing, etc.) for representations or instances (e.g., canonical content items, smart pointers, basic pointers) stored on content management system 110 and corresponding to specific cloud-based and/or cloud-backed content items. For example, content management system 110 can store a basic pointer referencing a content item (e.g., a cloud-based or cloud-backed content item) on a third-party cloud service (e.g., 302, 304, 306, 170), and obtain access to the content and/or functionalities associated with the content item referenced by the basic pointer through the third-party cloud service. In another example, content management system 110 can store a smart pointer or a representation (e.g., a canonical representation) of a content item (e.g., a cloud-based or cloud-backed content item) on a third-party cloud service (e.g., 302, 304, 306, 170), and use the smart pointer or the representation of the content item to access the content item and its associated content and functionalities from the third-party cloud service.

As further described herein, a basic pointer can be a representation of a content item on a third-party cloud service (e.g., 302, 304, 306, 170), that does not include the contents of the content item but instead includes a pointer or address (e.g., URL, URI, etc.) to the content item on the third-party cloud service. The pointer or address can direct a user or device to the content item on the third-party cloud service to access the content item on the third-party cloud service. For example, in some cases, the basic pointer can be a light wrapper around an address, such as a URL, for accessing the content item on the third-party cloud service. Thus, a basic pointer stored on content management system 110 can allow a user to access the associated content item on the third-party cloud service through the basic pointer on content management system 110.

On the other hand, as further described with reference to FIG. 5A, a smart pointer can be a representation of a content item on a third-party cloud service (e.g., 302, 304, 306, 170), that does not include the contents of the content item but can render such contents and provide its associated functionalities. A smart pointer may appear to a user as another content item stored in content management system 110, but may not include the actual content of the third-party cloud service content item associated with the smart pointer. Instead, the smart pointer may reference the third-party cloud service content item and provide access to the actual content of the third-party cloud service content item from the smart pointer on content management system 110.

In some cases, in addition to providing access to the content of the associated third-party cloud service content item, a smart pointer can provide access to cloud functionalities provided by a third-party cloud service and/or enable other functionalities supported by content management system 110, such as previews, searching, commenting, etc. For example, a smart pointer can reference a content item on a third-party cloud service and render the content item and provide associated cloud functionalities by obtaining the content and associated functionalities from the third-party cloud service. To illustrate, when a user opens or activates the smart pointer, the user's client device can obtain from the third-party cloud service the contents and associated functionalities of the content item referenced by the smart pointer. The user's client device can then render a view or instance of the content item, including its contents, and enable the functionalities obtained from the third-party cloud service. Thus, the smart pointer can provide a user experience similar to (or the same as) the user accessing the content item directly from the third-party cloud service, even though the smart pointer and content management system 110 may not store the actual content of the content item.

Smart pointers can also provide organization and/or access primitives associated with content management system 110, while allowing third-party cloud services storing the content items associated with the smart pointers to continue to provide their own organization and/or access models in addition to those associated with content management system 110. Thus, smart pointers can receive features and/or functionalities from third-party cloud services as well as content management system 110.

A canonical content item can be an instance or representation of a cloud-based content item or a cloud-backed content item stored on content management system 110. In some cases, the canonical content item can include the actual content of the cloud-based or cloud-backed content item associated with the canonical content item, and can render such content and provide associated functionalities, including associated cloud functionalities provided by third-party cloud services 302, 304, 306, 170 and/or functionalities provided by content management system 110.

A cloud-based content item can include a content item that is inextricably reliant on, and/or natively supported by, a cloud-based application, editor, and/or service. The authoritative source of the content of the cloud-based content item can be the cloud-based content management system associated with the cloud-based content item. Cloud-based content items can include content items created, accessed, and/or manipulated via respective cloud-based applications or editors. Non-limiting examples of cloud-based content items can include DROPBOX PAPER, GOOGLE DOCS, QUIP, PREZI, etc.

A cloud-backed content item can include a content item capable of integrating and/or interacting with a cloud service and obtaining additional functionality, such as real-time collaboration, from the cloud service. For example, a cloud-backed content item can be accessed through an application or editor, such as an online editor, that can interface with a cloud service to obtain additional functionality for the cloud-backed content item from the cloud service. Non-limiting examples of cloud-backed content items include MICROSOFT WORD, MICROSOFT EXCEL, KEYNOTE and PAGES from APPLE IWORK, etc.

Figure 4:
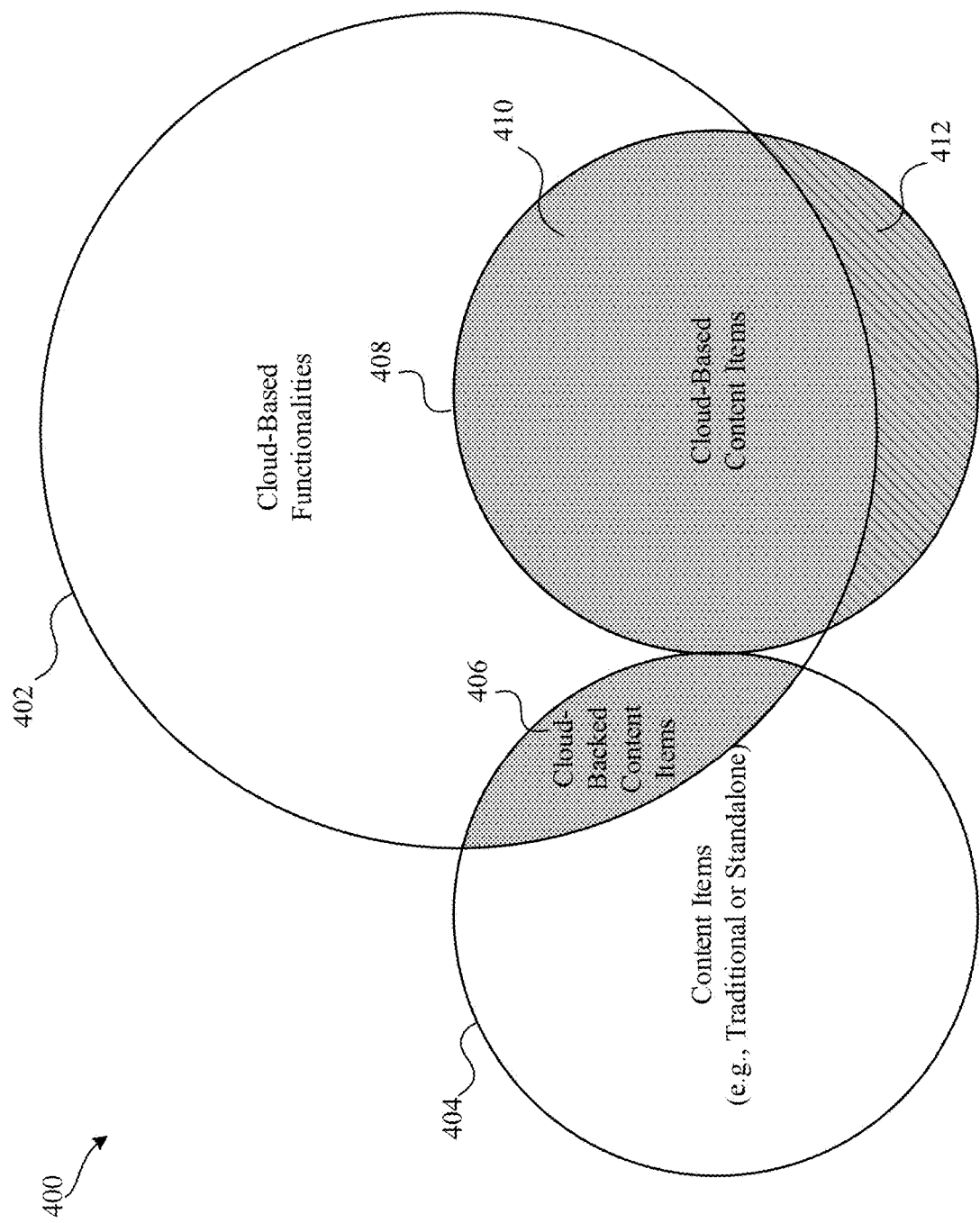
FIG. 4 is a Venn diagram showing functional similarities and differences between various types of content items.

With reference to FIG. 4, Venn diagram 400 shows functional similarities and differences between various types of content items. In this example, circle 402 represents a set of cloud-based functionalities supported by one or more cloud services. Example cloud-based functionalities can include online access and storage functionalities as well as collaboration functionalities such as collaborative editing, live commenting, activity notifications, versioning, editing attribution, messaging, etc.

Circle 404 represents traditional content items (e.g., plain text files, image files, productivity documents, etc.), which can provide respective content and functionalities irrespective or independent of any cloud service. As illustrated by region 406 representing cloud-backed content items, some traditional content items can be cloud-backed files; meaning, such content items can obtain at least some of the cloud-based functionalities represented by circle 402 from one or more cloud services. The cloud-backed content items represented by region 406 can receive such additional functionalities from applications or editors capable of operating on the cloud-backed content items and interfacing with one or more cloud services.

Like traditional content items, cloud-backed content items can be created, accessed, and modified locally from a client device. In some cases, like traditional content items, cloud-backed content items can support filesystem operations, such as read, write, delete, rename, move, etc. Moreover, in some cases, cloud-backed content items can also be created, accessed, and modified from a web browser or online editor.

Circle 408 represents cloud-based content items. The cloud-based content items can support cloud-based functionalities (e.g., 402) and can derive such functionalities from one or more cloud services. The cloud-based content items are inextricably reliant on one or more cloud services and natively supported by an associated cloud-based application or editor from one or more associated cloud services. For example, a cloud-based content item can be accessed from a cloud service through an online editor provided by the cloud service. The online editor can be used to manipulate the content in the cloud-based content item, collaborate with users having access to the cloud-based content item, and derive any other cloud-based functionalities from the cloud service associated with the online editor.

Region 412 represents other cloud-based functionalities supported by cloud-based content items. In some examples, the other cloud-based functionalities represented by region 412 can include one or more cloud-based functionalities that are not supported or available to cloud-backed content items and/or traditional content items. In other examples, the other cloud-based functionalities represented by region 412 can include one or more functionalities that are supported by cloud-backed content items and traditional content items irrespective or independent of any cloud service. In yet other examples, the other cloud-based functionalities represented by region 412 can include non-collaborative functionalities.

Unlike traditional content items and cloud-backed content items, cloud-based content items are not native to non-cloud based applications or editors. Moreover, in some cases, unlike traditional content items and cloud-backed content items, cloud-based content items may not support filesystem operations or operate irrespective of a cloud-based service, application, and/or editor.

Returning to FIG. 3, third-party cloud services 302, 304, 306 and collaboration content management system 170 can host and/or provide one or more respective cloud-based applications or content item editors for users to create, access, and/or interact with one or more respective types of cloud-based or cloud-backed content items. In some cases, third-party cloud services 302, 304, 306 and collaboration content management system 170 can provide one or more types of cloud-based applications or editors respectively designed for one or more specific types of cloud-based or cloud-backed content items. For example, a particular cloud-based application or editor can be designed to handle a specific type of cloud-based content item, such as content creation, rendering, modification and other types of interactions with the cloud-based content item, as well as other features or functionalities for the cloud-based content item such as collaboration, commenting, sharing, publishing, etc.

The cloud-based applications or editors can allow users to create or modify online or web-based content items, publish the online or web-based content items, share the online or web-based content items, collaborate with other users through the online or web-based content items, store the online or web-based content items on a cloud storage associated with one or more respective cloud services, and/or interact in other ways with the online or web-based content items and/or users having access to the online or web-based content items. In some cases, the cloud-based applications or editors can allow users to create or modify cloud-backed content items, publish the cloud-backed content items, share the cloud-backed content items, collaborate with other users through the cloud-backed content items, store the cloud-backed content items, and/or interact in other ways with the cloud-backed content items and/or users having access to the cloud-backed content items.

In some examples, the cloud-based applications or editors can be web-based applications provided by the cloud services (e.g., 302, 304, 306, 170) for creating and interacting with respective types of cloud-based and/or cloud-backed content items. The cloud-based applications or editors can support various respective types of content items, content formats, content features, content functionalities, etc. In some cases, a particular type of cloud-based content item (e.g., 408) and/or associated functionalities may only be supported (fully or partially) by a cloud-based application or editor associated with that particular type of cloud-based content item. In other cases, a particular type of cloud-based content item and/or associated functionalities may be supported by other software applications or editors.

In some examples, a particular type of cloud-backed content item and/or associated functionalities can be supported (fully or partially) by one or more cloud-based applications or editors and/or other software applications. For example, a particular type of cloud-backed content item may be supported by one or more software applications or tools on a client device and may also be supported by a cloud-based application or editor.

To illustrate, a cloud-backed content item may be supported by a software application or tool that is capable of rendering the cloud-backed content item without the use of a cloud-based application or editor. The software application or tool can allow a user to access and interact with the cloud-backed content item from the user's device. The software application or tool can enable filesystem operations on the cloud-backed content item, such as read, write, delete, rename, move, and/or any other operations. The software application or tool may support a set of features or functionalities for that cloud-backed content item, but a cloud-based application or editor associated with a cloud service can be used to access or enable additional, cloud-based functionalities for that cloud-backed content item.

For example, in some cases, a cloud-based application or editor can provide support for the cloud-backed content item, and can be used to access and interact with the cloud-backed content item. The cloud-based application or editor can provide additional functionalities (e.g., in addition to the functionalities supported by a native and/or non-cloud based application or editor) to the cloud-backed content item, such as live, collaborative editing; live commenting; messaging; and/or other collaboration features.

Third-party cloud services 302, 304, 306 and collaboration content management system 170 can communicate with cloud integration service 320 via interfaces 310, 312, 314, to receive or provide data and/or metadata associated with one or more cloud-based and cloud-backed content items. Interfaces 310, 312, 314 can be, for example, application programming interfaces (APIs) for exchanging data between cloud integration service 320 and third-party cloud services 302, 304, 306 and collaboration content management system 170. Cloud integration service 320 can be a service that implements the logic and/or functionalities for interacting with cloud services (e.g., 302, 304, 306, 170) and/or content items on or supported by the cloud services (e.g., 302, 304, 306, 170), such as cloud-based or cloud-backed content items. In some examples, cloud integration service 320 can communicate with cloud services (e.g., 302, 304, 306, 170) to receive data and/or cloud functionalities, such as cloud-based collaboration functionalities, for content items stored on content management system 110, such as canonical content items.

For example, cloud integration service 320 can provide the functionality for communicating with the cloud services (e.g., 302, 304, 306, 170) to retrieve from the cloud services (e.g., 302, 304, 306, 170) metadata associated with canonical content items (e.g., cloud-based content items, cloud-backed content items, etc.) or smart pointers on content management system 110; updating metadata associated with canonical content items (e.g., cloud-based content items, cloud-backed content items, etc.) or smart pointers on content management system 110 based on metadata updates received from the cloud services (e.g., 302, 304, 306, 170); communicating with the cloud services (e.g., 302, 304, 306, 170) to retrieve and update content associated with canonical content items (e.g., cloud-based content items, cloud-backed content items, etc.) or smart pointers on the content management system 110; sending to the cloud services (e.g., 302, 304, 306, 170) content and/or metadata associated with content items (e.g., cloud-based or cloud-backed content items) maintained by the cloud services; exchanging with the cloud services (e.g., 302, 304, 306, 170) activity information associated with canonical content items (e.g., cloud-based or cloud-backed content items) or smart pointers; authenticating with the cloud services (e.g., 302, 304, 306, 170); providing tokens or authentication information to the cloud services (e.g., 302, 304, 306, 170) for allowing the cloud services to authenticate with content management system 110; etc.

Moreover, cloud integration service 320 can support various operations for communicating with the cloud services (e.g., 302, 304, 306, 170); accessing features and functionalities associated with canonical content items (e.g., cloud-based or cloud-backed content items) or smart pointers; accessing features and functionalities associated with content management system 110; interacting with canonical content items (e.g., cloud-based content items or cloud-backed content items), smart pointers, or basic pointers stored in content storage 142 and/or client device 150; interacting with content items (e.g., cloud-based or cloud-backed content items) on the cloud services (e.g., 302, 304, 306, 170); interacting with the cloud services (e.g., 302, 304, 306, 170) to receive or provide data and/or functionalities associated with cloud-based content items or cloud-backed content items stored on the cloud services (e.g., 302, 304, 306, 170) and/or canonical content items (e.g., cloud-based content items or cloud-backed content items), smart pointers, and/or basic pointers stored in content storage 142 or client device 150; etc.

Non-limiting examples of operations supported by cloud integration service 320 include operations to create content items (e.g., canonical content items such as cloud-based content items or cloud-backed content items, smart pointers, basic pointers, etc.) and/or associated data or content; operations to authenticate with cloud services (e.g., 302, 304, 306, 170); operations to receive or update metadata associated with content items (e.g., cloud-based or cloud-backed content items) stored on or supported by one or more cloud services (e.g., 302, 304, 306, 170); operations to retrieve content items (e.g., canonical content items such as cloud-based or cloud-backed content items, third-party cloud service content items associated with canonical content items) and/or related data from content storage 142, client device 150 and/or the cloud services (e.g., 302, 304, 306, 170); operations to restore content items (e.g., canonical content items such as cloud-based or cloud-backed content items, third-party cloud service content items associated with canonical content items, etc.) and/or associated data or request restoration of such content items and/or associated data from the cloud services (e.g., 302, 304, 306, 170); commenting operations; operations to generate and/or present previews of canonical content items (e.g., cloud-based or cloud-backed content items); operations to share canonical content items (e.g., cloud-based or cloud-backed content items) and/or associated data; operations to revert to previous versions of canonical content items (e.g., cloud-based or cloud-backed content items); operations to modify (rename, move, delete, edit, etc.) canonical content items (e.g., cloud-based or cloud-backed content items); and so forth.

Cloud integration service 320 can communicate with filesystem 148 to store or access metadata associated with canonical content items (e.g., cloud-based or cloud-backed content items) from the cloud services (e.g., 302, 304, 306, 170). Filesystem 148 can store and provide such metadata for use by cloud integration service 320 and any other service in content management system 110. The metadata can include, for example and without limitation, information regarding changes to the canonical content items (e.g., cloud-based or cloud-backed content items), access information associated with the canonical content items, data logs associated with the canonical content items, unique identifiers (IDs) associated with the canonical content items, description information associated with the canonical content items, version numbers or information associated with the canonical content items, timestamps associated with filesystem entries corresponding to the canonical content items, change history information for the canonical content items, pointers to content associated with the canonical content items, folders, file paths, etc.

Cloud integration service 320 can also communicate with metadata store 146 to update or retrieve metadata and objects in metadata store 146. Metadata store 146 can store other metadata and objects such as entities or associations pertaining to user accounts, canonical content items (e.g., cloud-based or cloud-backed content items), user groups, namespaces, memberships, etc. For example, metadata store 146 may store, without limitation, metadata describing content items (e.g., traditional content items, cloud-based content items, cloud-backed content items), content item types, comments, indexing data, access permissions, user or group memberships, sharing information, etc. In some examples, metadata store 146 can also store information describing the relationship of content items (e.g., traditional content items, cloud-based content items, cloud-backed content items) to one or more accounts, collections, groups, namespaces, folders, team entities, etc., in metadata store 146.

Cloud integration service 320 can communicate with content storage 142 to store and/or retrieve content from content storage 142. Cloud integration service 320 can store and retrieve content from the cloud-based or cloud-backed content items and/or representations of cloud-based or cloud-backed content items, such as smart pointers and canonical content items as further described below. For example, in some cases, content storage 142 may store the content of one or more cloud-based or cloud-backed content items for access to the content directly from content storage 142. In this example, cloud integration service 320 may retrieve, store, or update such content in content storage 142.

In other examples, content storage 142 may only store representations of one or more cloud-based or cloud-backed content items. For example, content storage 142 may only store a smart pointer referencing a cloud-based or cloud-backed content item stored on a cloud service (e.g., 302, 304, 306, 170) as further described below. In this example, the representations (e.g., smart pointers) of the cloud-based or cloud-backed content items may be retrieved from content storage 142 and provided to client devices requesting access to the cloud-based or cloud-backed content items, but some or all of the actual content in the cloud-based or cloud-backed content items may not be included in the representations and instead obtained from respective cloud services (e.g., 302, 304, 306, 170) as further described below.

Cloud integration service 320 can also communicate with events store 143 to store, retrieve, and/or update activity and event information associated with content items such as canonical content items (e.g., cloud-based or cloud-backed content items) or smart pointers. Cloud integration service 320 can monitor events or activity from events store 143, obtain status information associated with content items (e.g., canonical content items such as cloud-based or cloud-backed content items, smart pointers, etc.) from events store 143, process events and/or metrics based on information in events store 143, generate or provide notifications or alerts based on information in events store 143, etc.

Figure 5A:
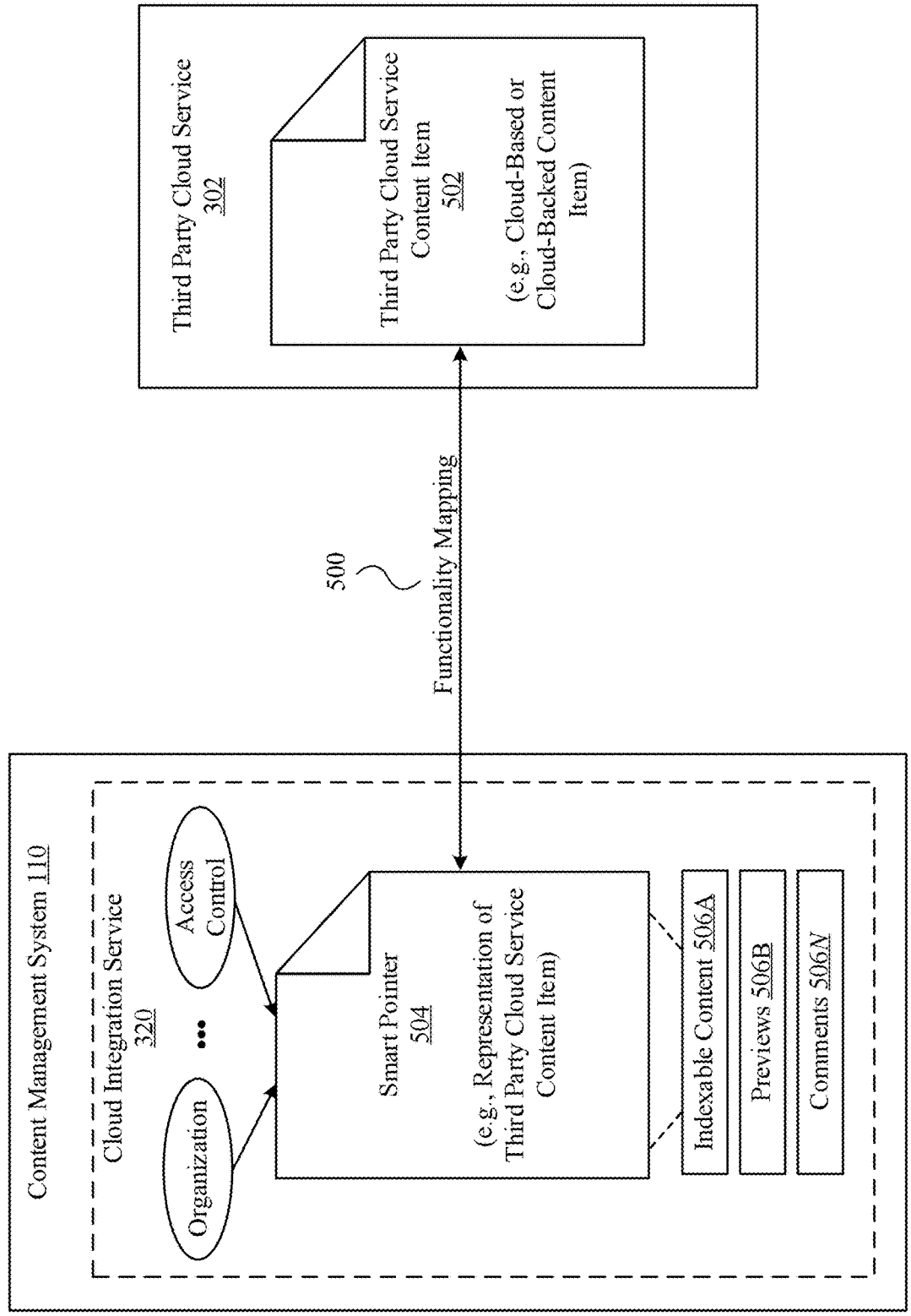
FIG. 5A shows an example functionality mapping between a cloud service content item on a third-party cloud service and a smart pointer in a content management system.

FIG. 5A shows example functionality mapping 500 between third-party cloud service content item 502 on third-party cloud service 302 and smart pointer 504 in content management system 110. Third-party cloud service content item 502 can be a cloud-based or cloud-backed content item hosted by third-party cloud service 302. In some cases, third-party cloud service content item 502 can be a cloud-based content item hosted by the third-party cloud service 302 and created for (or using) a cloud-based application or editor, such as a web-based application or editor. In other cases, third-party cloud service content item 502 can be a cloud-backed content item hosted by the third-party cloud service 302 and created for (or using) a client application, a native application associated with the cloud-backed content item, or a cloud-based application or editor.

Third-party cloud service content item 502 can include specific formatting, content, features, and functionalities supported by third-party cloud service 302 and the cloud-based application or document editor associated with third-party cloud service content item 502. For example, third-party cloud service content item 502 can include a specific type of data or content, specific sharing features, specific online collaboration features, specific web-publishing features, specific reviewing features, specific document or user behavior functionalities, etc. In some examples, third-party cloud service content item 502 can include specific formatting, content, features, and functionalities supported by a client or native software application, as well as additional functionalities and/or features supported by the third-party cloud service 302. For example, the third-party cloud service content item 502 can be a cloud-backed content item that includes specific formatting, content, features, and functionalities (e.g., filesystem operations, etc.) supported by a client or native software application, as well as additional features or functionalities enabled by third-party cloud service 302, such as collaboration functionalities (e.g., live editing, commenting, messaging, activity notifications, etc.).

In some cases, the content, features, and/or functionalities of third-party cloud service content item 502 are supported through third-party cloud service 302 and a specific cloud-based application or editor associated with third-party cloud service content item 502, but its content and functionalities can also be obtained through smart pointer 504 as further described herein. For example, the content, features, and/or functionalities of third-party cloud service content item 502 may be specifically designed for, and supported by, third-party cloud service 302 and an associated cloud-based application or editor, but its content (and associated functionalities) may also be accessed/rendered, edited, etc., through smart pointer 404 on content management system 110 (and/or client application 152).

In some examples, the content, features, and/or functionalities of third-party cloud service content item 502 may be partially or fully accessible and supported by other applications (e.g., applications other than a cloud-based application or editor provided by third-party cloud service 302 for third-party cloud service content item 502), such as local and/or file-based applications or content editors. For example, third-party cloud service content item 502 can be a cloud-backed content item and at least some of its content, features, and/or functionalities can be accessed through a client application while additional functionalities can be accessed through third-party cloud service 302. In some cases, users may access/render the content in third-party cloud service content item 502 from smart pointer 504, and may access some or all of the features or functionalities of third-party cloud service content item 502 from third-party cloud service 302.

Smart pointer 404 can be a representation of third-party cloud service content item 502 stored in content management system 110 for access by client devices (e.g., 150) having accounts on content management system 110. For example, smart pointer 504 may appear as another content item stored in content management system 110 but may not include the actual content of third-party cloud service content item 502. Instead, smart pointer 504 may reference third-party cloud service content item 502 and provide access to the actual content of third-party cloud service content item 502 from smart pointer 504 on content management system 110. In some cases, in addition to providing access to the content of third-party cloud service content item 502, smart pointer 504 can also provide access to cloud-based functionalities provided by third-party cloud service 302 and/or enable other functionalities supported by content management system 110, such as previews, searching, commenting, etc.

In some cases, smart pointer 504 can provide organization and/or access primitives associated with content management system 110, while allowing third-party cloud service 302 to continue to provide its own organization and/or access models in addition to those associated with content management system 110. For example, a user may be able to rename smart pointer 504, copy smart pointer 504 to another location in content management system 110, move smart pointer 504 to another location in content management system 110, add smart pointer 504 to a shared folder in content management system 110, etc. Moreover, content management system 110 can provide additional features and/or functionalities to smart pointer 504, as further described below.

In some examples, when smart pointer 504 is invoked by a client device (e.g., 150), the client device can launch an instance of third-party cloud service content item 502. The instance of the third-party cloud service content item 502 can obtain and present, using cloud integration service 320, the content of third-party cloud service content item 502. Here, cloud integration service 320 can obtain such content from third-party cloud service 302. In some examples, cloud integration service 320 can also obtain one or more functionalities from third-party cloud service 302, for provisioning via the instance of the third-party cloud service content item 522. The launched instance may present or render the content of third-party cloud service content item 502 and provide access to the features or functionalities of third-party cloud service content item 502, without storing the actual content of third-party cloud service content item 502.

Thus, from the user's perspective, when smart pointer 504 is launched from the user's client device, the user experience in this example may be similar or identical to the experience when third-party cloud service content item 502 is actually accessed from third-party cloud service 302 through an associated cloud-based application or editor. Therefore, while smart pointer 504 may not store the actual content from third-party cloud service content item 502, the user experience when accessing smart pointer 504 may be indistinguishable (or almost indistinguishable) from the user experience when third-party cloud service content item 502 is accessed directly from third-party cloud service 302 through an associated cloud-based application or editor.

In some cases, smart pointer 502 may include certain content and/or metadata associated with third-party cloud service content item 502, such as indexable content 506A, previews 506B, comments 506N, etc. For example, content management system 110 may obtain (e.g., from third-party cloud service 302 and/or via cloud integration service 320) content and/or metadata associated with third-party cloud service content item 502, which content management system 110 can use to generate and/or store indexable content 506A, previews 506B, comments 506N, and/or any other relevant information.

Indexable content 506A can include one or more portions of content or metadata associated with third-party cloud service content item 502, which can be used by content management system 110 (and/or client device 150) for indexing and searching of data associated with third-party cloud service content item 502. Previews 506B can be used to generate a rendered preview of third-party cloud service content item 502 without launching an entire instance of third-party cloud service content item 502. Comments 506N can be used to associate third-party cloud service content item 502 and/or content in third-party cloud service content item 502 with specific comments provided by one or more users with access to third-party cloud service content item 502. Comments 506N can allow various user comments created through third-party cloud service 302 and/or content management system 110 to be presented and/or identified when a user accesses smart pointer 504.

Content management system 110 may manage or control various features or functionalities on content management system 110 for smart pointer 504, such as the storage and organization of smart pointer 504 within a user account and/or client device, access control permissions (e.g., read permissions, edit permissions, sharing permissions, etc.) for smart pointer 504, etc. In some cases, content management system 110 may extend the features and/or functionalities provided by third-party cloud service 302 for third-party cloud service content item 502, and thus associated with smart pointer 504, to include one or more features or functionalities supported by content management system 110, such as sharing functionalities, synchronization functionalities, local storage functionalities, events or notification functionalities, commenting functionalities, rating functionalities, collaboration functionalities, etc.

Moreover, content management system 110 may control or manage where and how smart pointer 504 is depicted within a user account or content organizational structure (e.g., hierarchical organization, folder or filesystem based organization, etc.). For example, content management system 110 can depict smart pointer 502 within a particular folder, collection, or location on the user account and/or client device as in a way that appears as if third-party cloud service content item 502 and its associated content is being stored through content management system 110 according to a specific organization or storage scheme associated with a user's content in content management system 110.

Figure 5B:
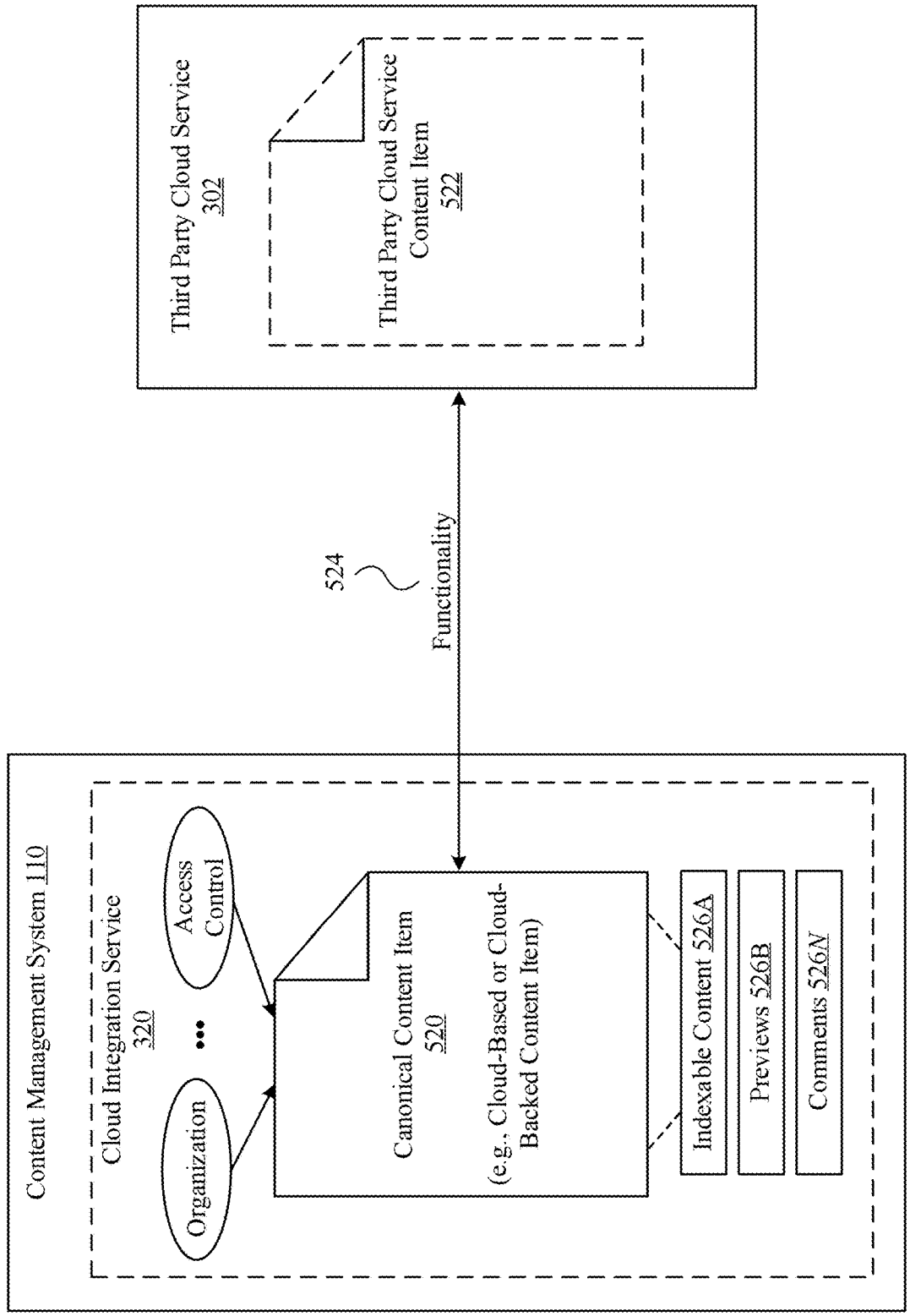
FIG. 5B shows an example functionality mapping between a cloud service content item on a third-party cloud service and a canonical content item in a content management system.

FIG. 5B shows example functionality mapping 524 between canonical content item 520 in content management system 110 and third-party cloud service content item 522 and/or functionalities associated with canonical content item 520 provided or supported by third-party cloud service 302. Canonical content item 520 can represent a cloud-based or cloud-backed content item stored in content management system 110 and/or third-party cloud service 302. Moreover, canonical content item 520 can provide access by client devices (e.g., 150) having accounts on content management system 110 to content and functionalities associated with canonical content item 520 (e.g., content and functionalities of a cloud-based or cloud-backed content item associated with canonical content item 520).

In some cases, canonical content item 520 can include some or all of the actual content associated with canonical content item 520. In other words, canonical content item 520 can be stored in content management system 110 along with its actual content. Moreover, canonical content item 520 can be stored in one or more user accounts on content management system 110 and can appear to a user as another content item in the user account. In some cases, third-party cloud service 302 can also store a copy or version of the cloud-backed or cloud-based content item represented by canonical content item 520, as depicted by third-party cloud service content item 522 in FIG. 5B.

In some cases, canonical content item 520 can be a cloud-backed content item stored on content management system 110 and capable of obtaining additional functionalities, such as real-time collaboration, from content management system 110 and/or third-party cloud service 302. Canonical content item 520 can obtain functionalities from third-party cloud service 302 via cloud integration service 320. To illustrate, in one example, canonical content item 520 can represent a cloud-backed content item stored on, and accessible from, content management system 110 that supports a set of functionalities, such as view and edit functionalities, irrespective of any cloud service (e.g., 302) or cloud-based functionalities (e.g., 402). However, in this example, when canonical content item 520 is accessed from content management system 110 (or a client device associated with content management system 110), cloud integration service 320 can communicate with third-party cloud service 302 to obtain one or more cloud-based functionalities for canonical content item 520 from third-party cloud service 302. Thus, despite canonical content item 520 not being stored on third-party cloud service 302, content management system 110 can nevertheless integrate into canonical content item 520 additional functionalities provided or supported by third-party cloud service 302.

In some cases, canonical content item 520 can be a cloud-based content item stored on content management system 110 and capable of rendering the content of the cloud-based content items and providing its associated functionalities, such as real-time collaboration. In this example, cloud integration service 320 can communicate with third-party cloud service 302 to obtain the content and functionalities associated with the cloud-based content item represented by canonical content item 520. This can allow canonical content item 520 to render the cloud-based content item and provide its associated functionalities even if the cloud-based content item is not native to content management system 110 and/or would otherwise require a specific application or editor from third-party cloud service 302 for rendering and interacting with the cloud-based content item.

To illustrate, in one example, canonical content item 520 can represent a cloud-based content item stored on, and accessible from, content management system 110 that traditionally could only be rendered and supported by a specific cloud-based application or editor from third-party cloud service 302. However, in accordance with some aspects of the present technology, when canonical content item 520 is accessed from content management system 110 (or a client device associated with content management system 110), cloud integration service 320 can communicate with third-party cloud service 302 to obtain data and cloud-based functionalities for canonical content item 520 from third-party cloud service 302. Cloud integration service 320 can then render the cloud-based content item through canonical content item 520 and provide associated cloud-based functionalities supported by third-party cloud service 302. Thus, despite canonical content item 520 not being stored on third-party cloud service 302 or accessed from a cloud-based application or editor associated with third-party cloud service 302, content management system 110 can nevertheless render the cloud-based content item represented by canonical content item 520 and integrate associated functionalities provided or supported by third-party cloud service 302.

In some cases, canonical content item 520 may include certain content and/or metadata associated with the cloud-based or cloud-backed content item it represents, such as indexable content 526A, previews 526B, comments 526N, etc. For example, content management system 110 may obtain (e.g., from third-party cloud service 302 or content storage 142, and/or via cloud integration service 320) content and/or metadata associated with canonical content item 520, which content management system 110 can use to generate and/or store indexable content 526A, previews 526B, comments 526N, and/or any other relevant information.

Indexable content 526A can include one or more portions of content or metadata associated with canonical content item 520 and/or the cloud-based or cloud-backed content item represented by canonical content item 520, which can be used for indexing and searching of data associated with canonical content item 520. Previews 526B can be used to generate a rendered preview of canonical content item 520 and/or the cloud-based or cloud-backed content item represented by canonical content item 520, without launching an entire instance of canonical content item 520. Comments 526N can be used to associate canonical content item 520 and/or the content of the cloud-based or cloud-backed content item represented by canonical content item 520, with specific comments provided by one or more users with access to canonical content item 520 and/or the cloud-based or cloud-backed content item represented by canonical content item 520. Comments 406N can allow various user comments created through third-party cloud service 302 and/or content management system 110 to be presented and/or identified when a user accesses canonical content item 520.

Content management system 110 may manage or control various features or functionalities on content management system 110 for canonical content item 520, such as the storage and organization of canonical content item 520 within a user account and/or client device, access control permissions (e.g., read permissions, edit permissions, sharing permissions, etc.) for canonical content item 520, etc. In some cases, content management system 110 may extend the features and/or functionalities provided by third-party cloud service 302 for the cloud-based or cloud-backed content item represented by canonical content item 520 to include one or more features or functionalities supported by content management system 110, such as sharing functionalities, synchronization functionalities, local storage functionalities, events or notification functionalities, commenting functionalities, rating functionalities, collaboration functionalities, etc. Thus, in some cases, canonical content item 520 can obtain functionalities and features from both third-party cloud service 302 and content management system 110.

Moreover, content management system 110 may control or manage where and how canonical content item 520 is depicted within a user account or content organizational structure (e.g., hierarchical organization, folder or filesystem based organization, etc.). For example, content management system 110 can depict canonical content item 502 within a particular folder, collection, or location on the user account and/or client device (e.g., 150), and/or according to a specific organization or storage scheme associated with a user's content in content management system 110.

Figure 5C:
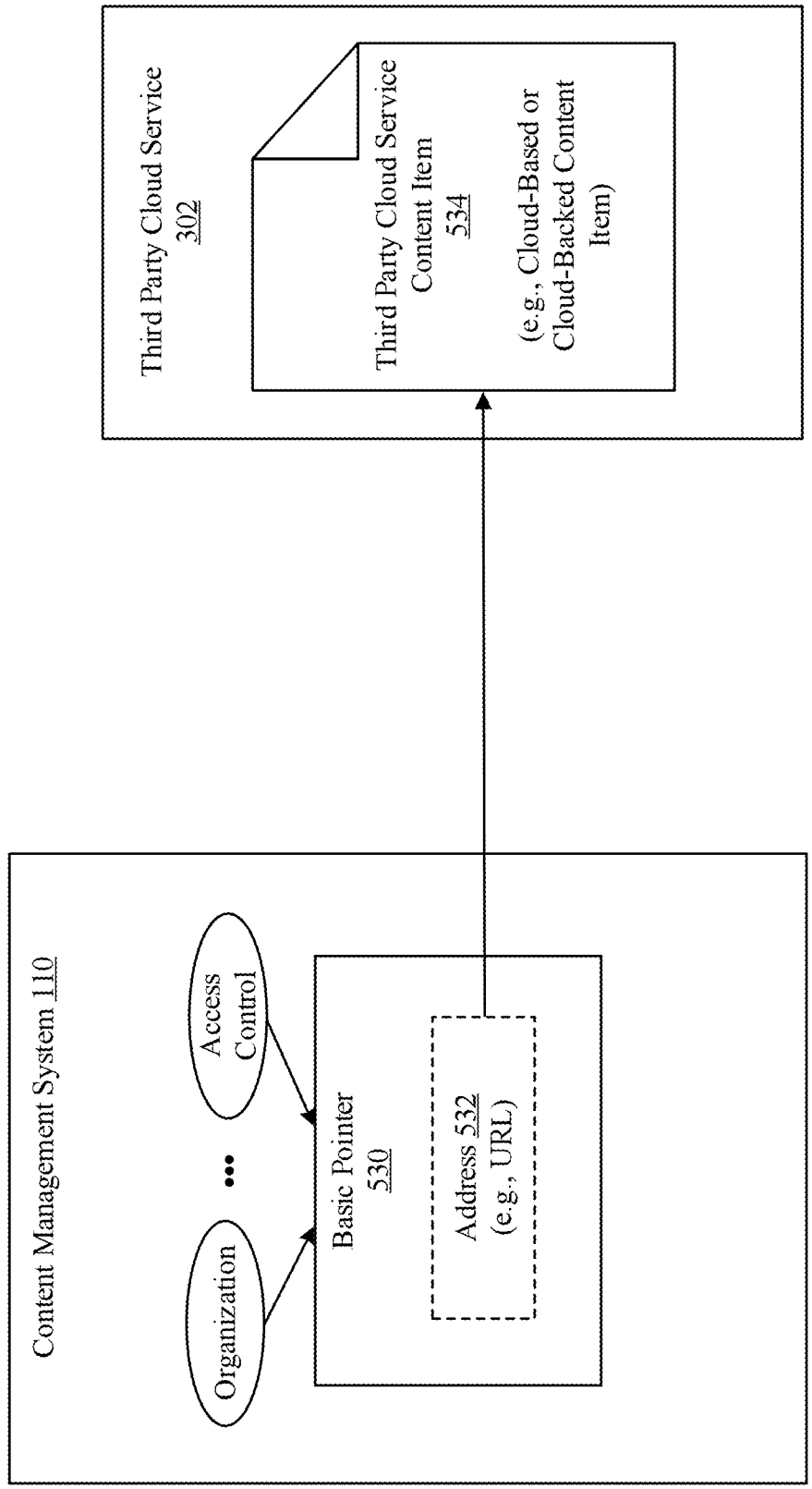
FIG. 5C shows an example functionality mapping between a cloud service content item on a third-party cloud service and a basic pointer in a content management system.

FIG. 5C shows an example basic pointer (530) on content management system 110. In this example, basic pointer 530 references third-party cloud service content item 534 on third-party cloud service 302. Basic pointer 530 may not include the actual content of third-party cloud service content item 534, but rather includes an address 532 for accessing third-party cloud service content item 534 on third-party cloud service 302 from basic pointer 530. In some examples, address 532 can be a URL associated with third-party cloud service content item 534, and basic pointer 530 can be a light wrapper around the URL. When a user selects or activates basic pointer 530, the user can be directed by address 534 to third-party cloud service content item 534 on third-party cloud service 302. The user can then access third-party cloud service content item 534 from third-party cloud service 302.

Thus, in some cases, basic pointer 530 can function similar to a link or bookmark for accessing third-party cloud service content item 534 on third-party cloud service 302. However, content management system 110 can manage the organization and/or access to basic pointer 530 from content management system 110, and can depict or provide basic pointer 530 within a user account on content management system 110 as another content item.

Figure 6A:
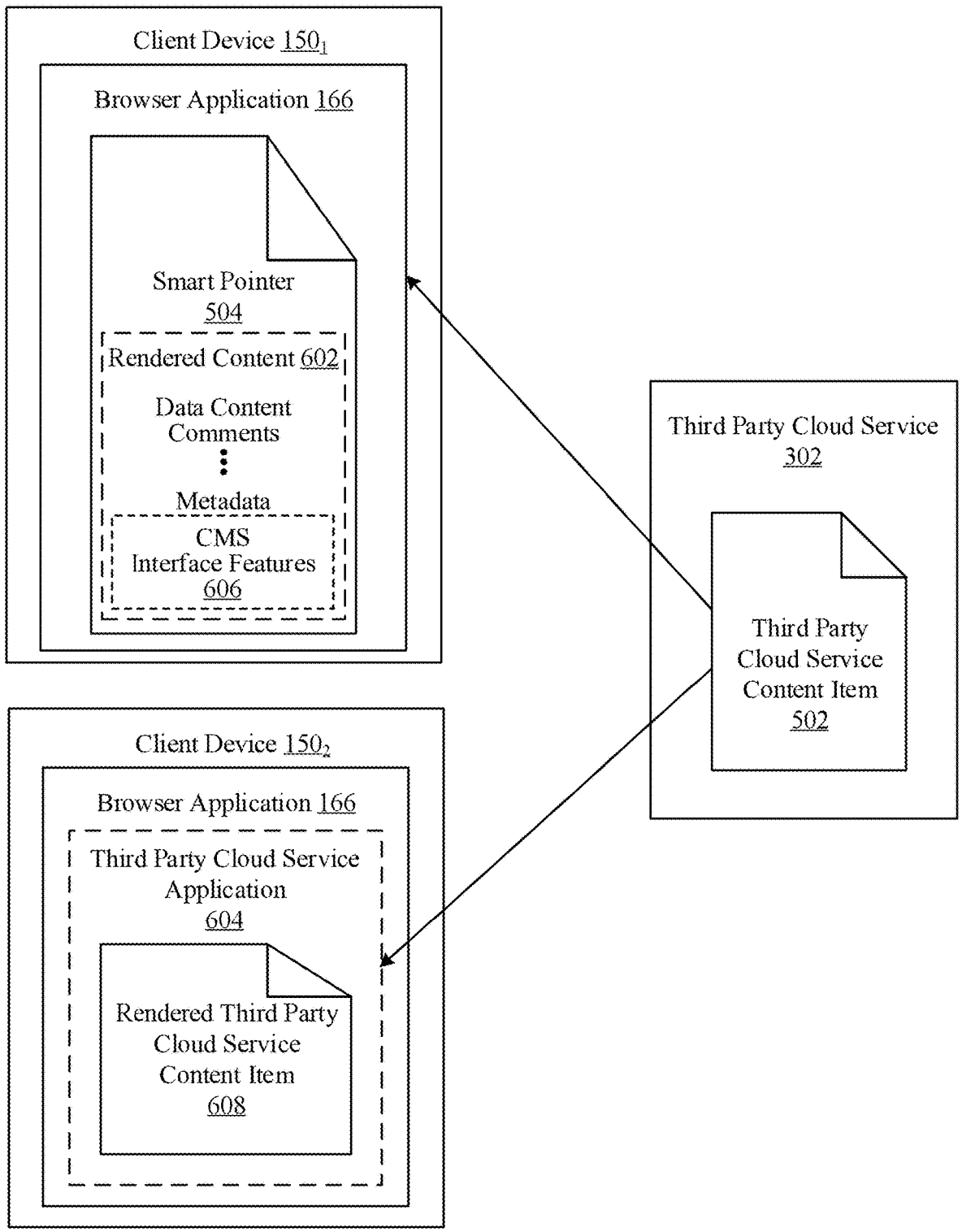
FIG. 6A shows an example user experience and use case of a smart pointer being accessed through a browser application on a client device and a cloud service content item being accessed through a browser application on another client device.

FIG. 6A shows example user experiences and use cases of smart pointer 504 being accessed through browser application 166 on client device 150$_1$ and third-party cloud service content item 502 being accessed through browser application 166 on client device 150$_2$. In this example, a user on client device 150$_1$ can access the content of third-party cloud service content item 502 through smart pointer 504 and a user on client device 150$_2$ can access the content of third-party cloud service content item 502 directly from third-party cloud service 302.

Smart pointer 504 can be accessed from client device 150$_1$ through browser application 166. Prior to being launched or invoked, smart pointer 504 can appear to the user as a copy of third-party cloud service content item 502. When client device 150$_1$ invokes or launches smart pointer 504 through browser application 166, browser application 166 can receive the content of third-party cloud service content item 502 from third-party cloud service 302 and present the content as rendered content 602. Rendered content 602 can display the content of third-party cloud service content item 502, enable access to features and functionalities of third-party cloud service content item 502, and provide a user experience that is similar or identical to the user experience when third-party cloud service content item 502 is accessed directly from third-party cloud service 302 through a corresponding cloud-based application or document editor. Rendered content 602 may resemble or mirror the layout of third-party cloud service content item 502, the formatting of third-party cloud service content item 502, the features of third-party cloud service content item 502, etc., and may depict the content of third-party cloud service content item 502 as configured in third-party cloud service content item 502.

On the other hand, client device $150_2$ is depicted accessing third-party cloud service content item 502 directly from third-party cloud service 302 through browser application 166. In this example, to access third-party cloud service content item 502 from client device $150_2$, browser application 166 implements third-party cloud service application 604, which can be, for example, a web or cloud-based application or editor provided by third-party cloud service 302 for third-party cloud service content item 502 and other cloud-based or cloud-backed content items that are the same or similar type as third-party cloud service content item 502.

Third-party cloud service application 604 can communicate with third-party cloud service 302 to retrieve the content and features of third-party cloud service content item 502 and provide an online rendering of third-party cloud service content item 502. Thus, through third-party cloud service application 604, browser application 166 on client device $150_2$ can present rendered third-party cloud service content item 608 depicting third-party cloud service content item 502, including its content and features. The user experience in this example is similar or identical to the user experience associated with smart pointer 504 at client device $150_k$, but the access and process is different, with client device $150_2$ implementing third-party cloud service application 604 to access the content and features of third-party cloud service content item 502 from third-party cloud service 302.

Moreover, smart pointer 504 allows a representation of third-party cloud service content item 502 to be stored on content management system 110 along with other user content items, and allows third-party cloud service content item 502 to be accessed by users from content management system 110 through smart pointer 504. Thus, using smart pointers such as smart pointer 504, users can maintain, organize and access their content items on content management system 110 and their content items from different cloud services and providers (e.g., 302, 304, 306, 170) from content management system 110. This way, users can have their content items stored and accessible from a single system (e.g., 110), and can avoid having to go to disparate cloud services to access different content items.

Further, in some cases, smart pointer 504 can enable content management system (CMS) interface features 606 for rendered content 602 on client device $150_1$ CMS interface features 606 can include features or functionalities provided through content management system 110 on top of those features or functionalities provided by third-party cloud service 302 for third-party cloud service content item 502. For example, rendered content 602 can be extended to include one or more features (e.g., 606) supported or provided by content management system 110, such as a feature for ranking or rating rendered content 602 or portions of rendered content 602, a notifications feed for accessing activity notifications and/or alerts associated with rendered content 602 and/or third-party cloud service content item 502, collaboration features such as co-authoring and chatting, commenting features, sharing features, etc. Thus, smart pointer 504 can not only enable users to access from content management system 110 the content and functionalities provided by third-party cloud service 302 for third-party cloud service content item 502, but also additional features and functionalities provided or supported by content management system 110.

Figure 6B:
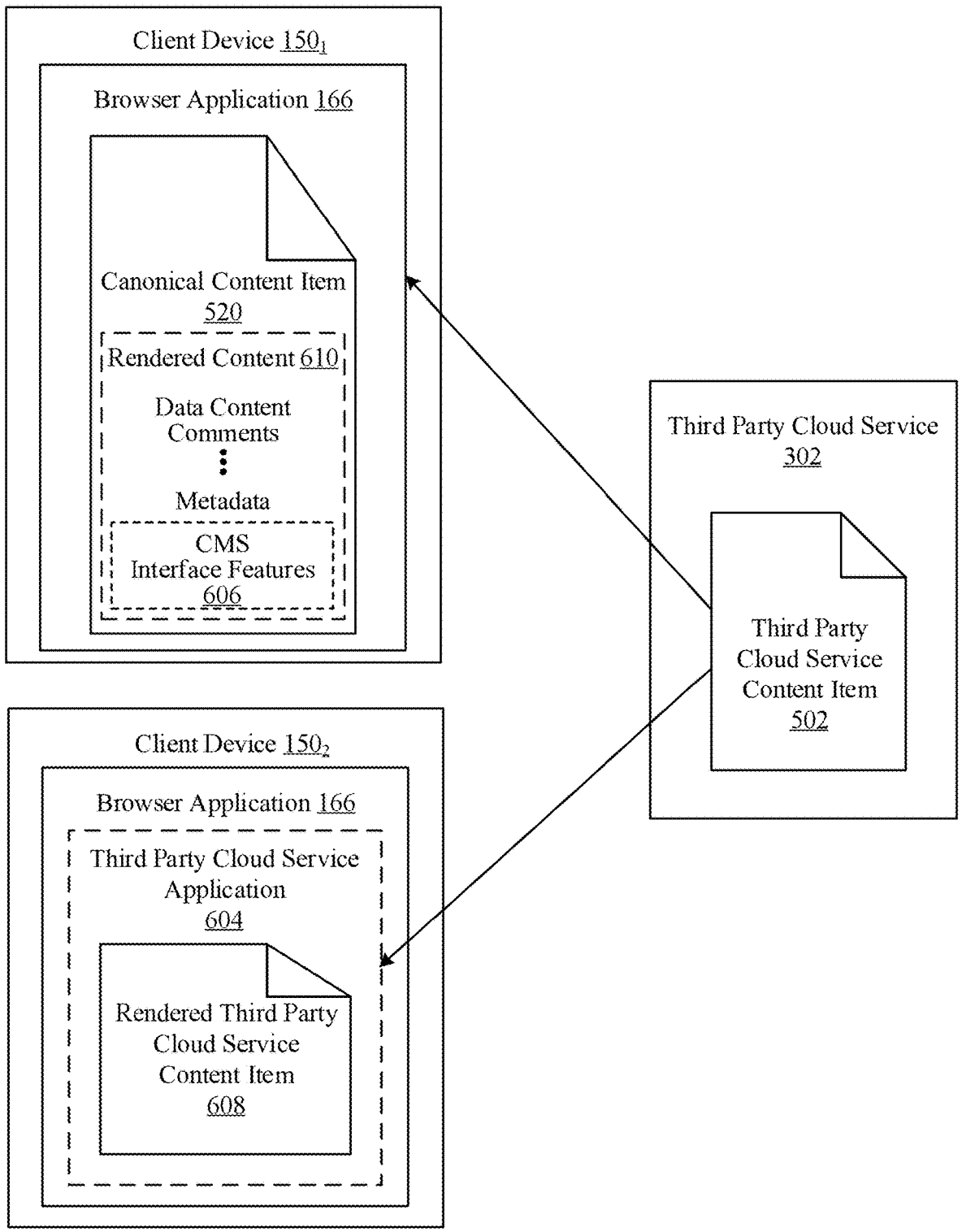
FIG. 6B shows an example user experience and use case of a canonical content item being accessed through a browser application on a client device and a cloud service content item being accessed through a browser application on another client device.

FIG. 6B shows example user experiences and use cases of canonical content item 520 being accessed through browser application 166 on client device $150_1$ and third-party cloud service content item 502 being accessed through browser application 166 on client device $150_2$. In this example, a user on client device $150_1$ can access the content of third-party cloud service content item 502 through canonical content item 520 and a user on client device $150_2$ can access the content of third-party cloud service content item 402 directly from third-party cloud service 302.

Canonical content item 520 can be accessed from client device $150_1$ through browser application 166. Canonical content item 520 can represent third-party cloud service content item 502 and can include the content of third-party cloud service content item 502. Third-party cloud service content item 502 can be a cloud-based or cloud-backed content item. Moreover, because canonical content item 520 can include the content of third-party cloud service content item 502, when client device $150_1$ invokes or launches canonical content item 520 through browser application 166, browser application 166 can obtain the content of third-party cloud service content item 402 from content management system 110 and/or canonical content item 520, and present the content as rendered content 610. Thus, browser application 166 can present rendered content 610 without directly accessing such content from third-party cloud service 302.

Rendered content 610 can display the content as part of canonical content item 520, enable access to features and functionalities of third-party cloud service content item 502 provided or supported by third-party cloud service 302, and provide a user experience that is similar or identical to the user experience when third-party cloud service content item 502 is accessed directly from third-party cloud service 302 through a corresponding cloud-based application or editor. Rendered content 610 may resemble or mirror the layout of third-party cloud service content item 502, the formatting of third-party cloud service content item 502, the features of third-party cloud service content item 502, etc., and may depict the content (e.g., rendered content 610) of third-party cloud service content item 502 as configured in third-party cloud service content item 502.

On the other hand, client device $150_2$ is depicted accessing third-party cloud service content item 502 directly from third-party cloud service 302 through browser application 166. To access third-party cloud service content item 502 from client device $150_2$, browser application 166 implements third-party cloud service application 604, which can be, for example, a web or cloud-based application or editor provided by third-party cloud service 302 for third-party cloud service content item 502 and other cloud-based or cloud-backed content items that are the same or similar type as third-party cloud service content item 502.

Third-party cloud service application 604 can communicate with third-party cloud service 302 to retrieve the content and features of third-party cloud service content item 502 and provide an online rendering of third-party cloud service content item 502. Thus, through third-party cloud service application 604, browser application 166 on client device $150_2$ can present rendered third-party cloud service content item 608 depicting third-party cloud service content item 502, including its content and features. The user experience in this example is similar or identical to the user experience associated with canonical content item 520 at client device $150_1$, but the access and process is different, with client device 150₂ implementing third-party cloud service application 604 to access the content and features of third-party cloud service content item 502 from third-party cloud service 302.

Moreover, canonical content item 520 allows a representation and associated content of third-party cloud service content item 502 to be stored on content management system 110 along with other user content items, and allows the content and features of third-party cloud service content item 502 to be accessed by users from content management system 110 through canonical content item 520. Thus, using canonical content items such as canonical content item 520, users can maintain, organize and access their content items on content management system 110 and their content items from different cloud services and providers (e.g., 302, 304, 306, 170) from content management system 110. This way, users can have their content items stored and accessible from a single system (e.g., 110), and can avoid having to go to disparate cloud services to access different content items.

Further, in some cases, canonical content item 520 can enable CMS interface features 606 for rendered content 610 on client device 150₁. CMS interface features 606 can include features or functionalities provided through content management system 110 on top of those features or functionalities provided by third-party cloud service 302 for third-party cloud service content item 502. For example, rendered content 610 provided through canonical content item 520 can be extended to include one or more features (e.g., 606) supported or provided by content management system 110, such as content ranking or rating features, a notifications feed for accessing activity notifications and/or alerts associated with rendered content 610 and/or third-party cloud service content item 502, collaboration features such as co-authoring and chatting, commenting features, sharing features, etc. Thus, canonical content item 520 can not only enable users to access from content management system 110 the content and functionalities provided by third-party cloud service 302 for third-party cloud service content item 502, but also additional features and functionalities provided or supported by content management system 110.

Figure 6C:
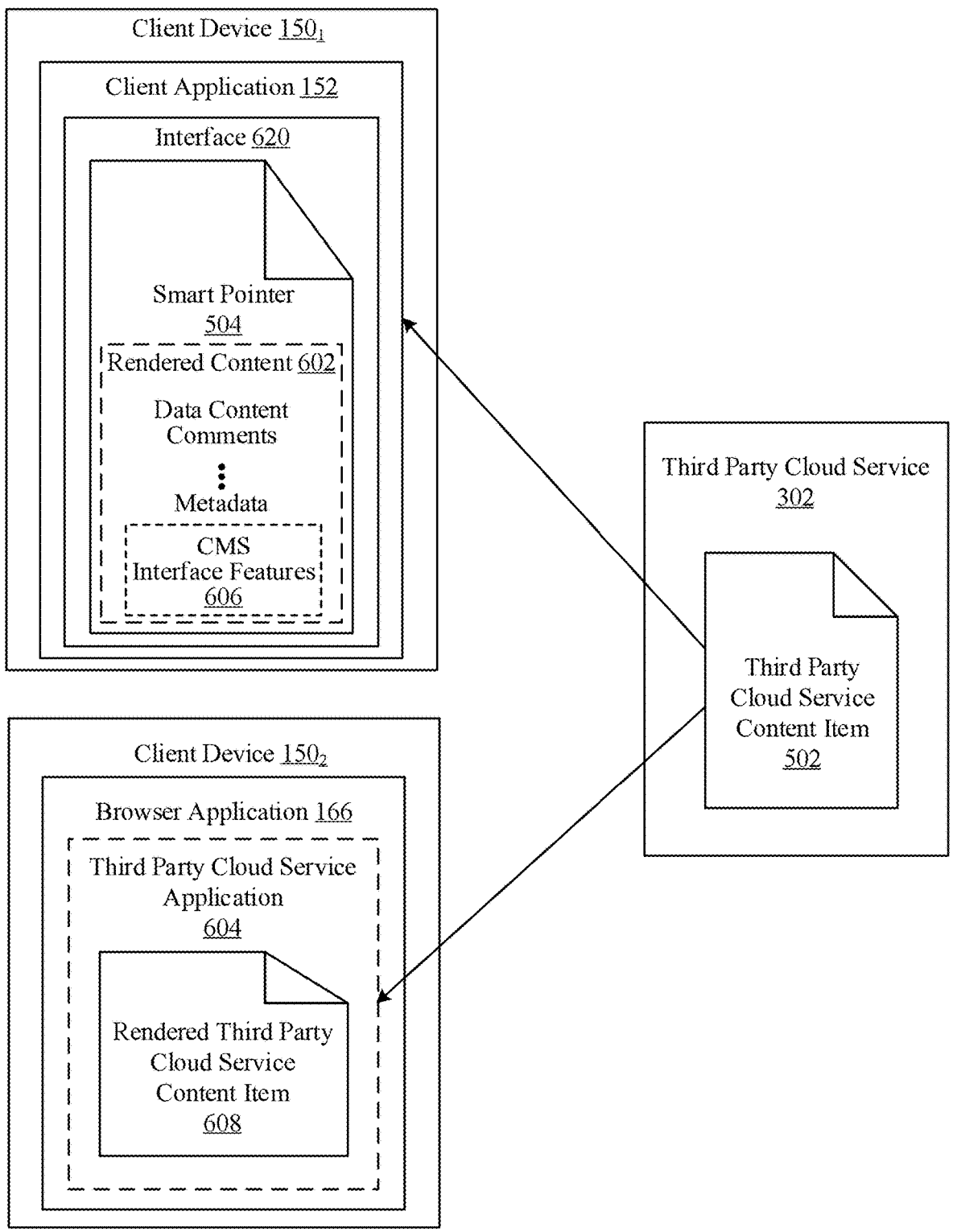
FIG. 6C shows another example user experience and use case of a smart pointer being accessed through a client application on a client device and a cloud service content item being accessed through a browser application on another client device.

FIG. 6C shows other example user experiences and use cases of smart pointer 504 being accessed through client application 152 on client device 150₁ and third-party cloud service content item 502 being accessed through browser application 166 on client device 150₂. The user experience and use case of third-party cloud service content item 502 being accessed through browser application 166 and third-party cloud service application 604 on client device 150₂ is the same as shown in FIGS. 6A and 6B, but is provided in this example to depict the differences and similarities in the process and user experience in this use case relative to the example use case when smart pointer 504 is accessed through client application 152 on client device 150₁.

As shown in FIG. 6C, a user on client device 150₁ can access the content of third-party cloud service content item 502 through smart pointer 504 and client application 152, as opposed to accessing the content of third-party cloud service content item 502 directly from third-party cloud service 302 using browser application 166 and third-party cloud service application 604 as depicted with respect to client device 150₂. Prior to being launched or invoked, smart pointer 504 can appear to the user as a copy of third-party cloud service content item 502 available on content management system 110 through client application 152. When client device 150₁ invokes or launches smart pointer 504 through client application 152, client application 152 can receive the content of third-party cloud service content item 502 from third-party cloud service 302 and present the content on interface 620 as rendered content 602.

Interface 620 can be an interface provided by client application 152, the operating system or windowing system at client device 150₁, and/or any other tool or software at client device 150₁. Rendered content 602 can display the content of third-party cloud service content item 502, enable access to features and functionalities of third-party cloud service content item 502, and provide a user experience that is similar or identical to the user experience when third-party cloud service content item 502 is accessed directly from third-party cloud service 302 through a corresponding cloud-based application or editor. Rendered content 602 may resemble or mirror the layout of third-party cloud service content item 502, the formatting of third-party cloud service content item 502, the features of third-party cloud service content item 502, etc., and may depict the content (e.g., 602) of third-party cloud service content item 502 as configured in third-party cloud service content item 502.

Moreover, client application 152 may depict smart pointer 504 as a content item locally stored in the filesystem of client device 150₁. In some cases, smart pointer 504 may not include all or any of the actual content of third-party cloud service content item 502, as previously explained. However, client application 152 may depict smart pointer 504 on client device 150₁ as if all the actual content of third-party cloud service content item 502 is also stored as part of smart pointer 504. Thus, the user at client device 150₁ may be unaware that smart pointer 504 does not actually store all the content of third-party cloud service content item 502.

Further, as previously mentioned, smart pointer 504 allows a representation of third-party cloud service content item 502 to be stored on content management system 110 and client device 150₁ along with other user content items, and allows third-party cloud service content item 502 to be accessed by users from content management system 110 or client device 150₁ through smart pointer 504. Thus, using smart pointers such as smart pointer 504, users can maintain, organize and access their content items stored on client device 150₁ and content management system 110, as well as their content items on different cloud services and providers (e.g., 302, 304, 306, 170), from client device 150₁ and content management system 110. This way, users can have their content items stored and accessible from a single system (e.g., 110, 150), and can avoid having to go to disparate cloud services to access different content items.

In some cases, smart pointer 504 can enable CMS interface features 606 for rendered content 602 on client device 150₁. As previously explained, CMS interface features 606 can include features or functionalities provided through content management system 110 on top of those features or functionalities provided by third-party cloud service 302 for third-party cloud service content item 502. Thus, smart pointer 504 can not only enable users to access from client application 152 on client device 150₁ the content and functionalities provided by third-party cloud service 302 for third-party cloud service content item 502, but also additional features and functionalities provided or supported by content management system 110.

Figure 6D:
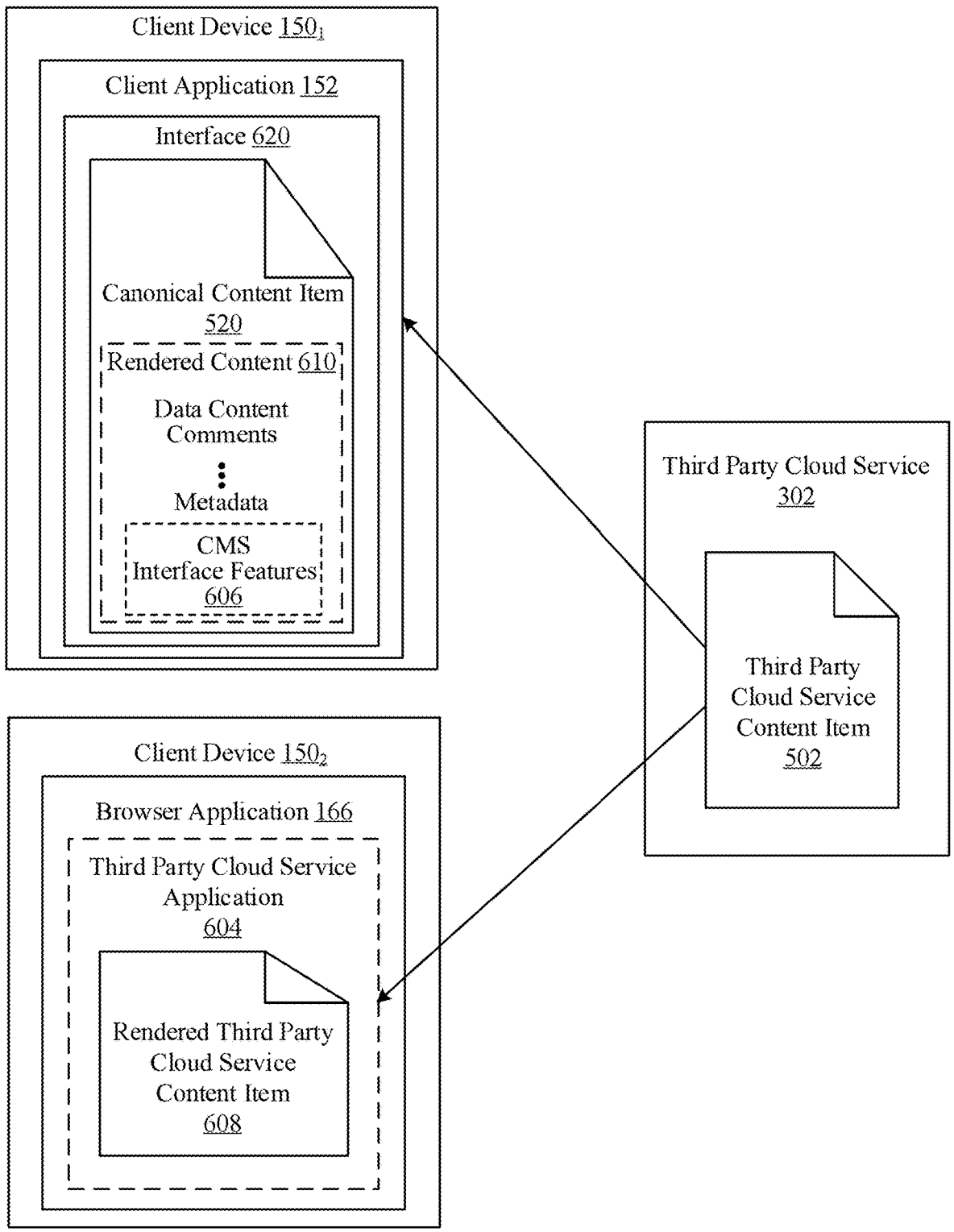
FIG. 6D shows another example user experience and use case of a canonical content item being accessed through a client application on a client device and a cloud service content item being accessed through a browser application on another client device.

FIG. 6D shows other example user experiences and use cases of canonical content item 520 being accessed through client application 152 on client device 150₁ and third-party cloud service content item 502 being accessed through browser application 166 on client device 150₂. The user experience and use case of third-party cloud service content item 502 being accessed through browser application 166 and third-party cloud service application 604 on client device 150$_2$ is the same as shown in FIGS. 6A and 6B, but is provided in this example to depict the differences and similarities in the process and user experience in this use case relative to the example use case when canonical content item 520 is accessed through client application 152 on client device 150$_1$.

As shown in FIG. 6D, a user on client device 150$_1$ can access the content of third-party cloud service content item 502 through canonical content item 520 and client application 152, as opposed to accessing the content of third-party cloud service content item 502 directly from third-party cloud service 302 using browser application 166 and third-party cloud service application 604 as depicted with respect to client device 150$_2$. In some cases, canonical content item 520 can store or include the actual content of third-party cloud service content item 502. Moreover, in some cases, canonical content item 520 can represent a cloud-based or cloud-backed content item. Here, canonical content item 520 may store the actual contents of the cloud-based or cloud-backed content item, but may obtain additional features or functionalities from third-party cloud service 302, as described herein.

Canonical content item 520 can appear to the user as a copy of third-party cloud service content item 502 available on content management system 110 through client application 152. When client device 150$_1$ invokes or launches canonical content item 520 through client application 152, client application 152 can obtain or access its content and present it on interface 620 as rendered content 610. Canonical content item 520 can also present (e.g., via interface 620) or provide additional features or functionalities obtained from third-party cloud service 302 (e.g., via cloud integration service 320).

Rendered content 610 can display the content of canonical content item 520 (e.g., stored on content management system 110 or obtained from third-party cloud service 302), enable access to features and functionalities of third-party cloud service 302 and/or third-party cloud service content item 502, and provide a user experience that is similar or identical to the user experience when third-party cloud service content item 502 is accessed directly from third-party cloud service 302 through a corresponding cloud-based application or editor. Rendered content 610 may resemble or mirror the layout of third-party cloud service content item 502, the formatting of third-party cloud service content item 502, the features of third-party cloud service content item 502, etc., and may depict the content (e.g., 602) of third-party cloud service content item 502 as configured in third-party cloud service content item 502.

Moreover, client application 152 may depict canonical content item 520 as a content item locally stored in the filesystem of client device 150$_1$. In some cases, the filesystem can not only store a representation or instance of canonical content item 520 but also the content associated with canonical content item 520. Further, as previously mentioned, canonical content item 520 can be stored on content management system 110 and client device 150$_1$ along with other user content items, and allows canonical content item 520 and its associated contents to be accessed by users from client device 150$_1$ through canonical content item 520. Thus, using canonical content items such as canonical content item 520, users can maintain, organize and access their content items stored on client device 150$_1$ and content management system 110, as well as their content items on different cloud services and providers (e.g., 302, 304, 306, 170), from client device 150$_1$ and content management system 110. This way, users can have their content items stored and accessible from a single system (e.g., 110, 150), and can avoid having to go to disparate cloud services to access different content items.

Further, in some cases, canonical content item 520 can support CMS interface features 606 for rendered content 610 on client device 150$_1$. As previously explained, CMS interface features 606 can include features or functionalities provided through content management system 110 on top of those features or functionalities provided by third-party cloud service 302 for canonical content item 520. Thus, canonical content item 520 can not only enable users to access from client application 152 on client device 150$_1$ the content and functionalities provided by third-party cloud service 302 for canonical content item 520, but also additional features and functionalities provided or supported by content management system 110.

As shown in FIGS. 6A through 6D, browser application 166 and client application 152 can present third-party cloud service content item 502 (e.g., rendered content 602, 610) on client device 150$_1$ without the use or need of third-party cloud service application 604. Thus, the techniques herein allow content management system 110 to provide client device 150$_1$ access to the content and features of third-party cloud service 302 and/or third-party cloud service content item 502 without implementing or using an application that natively supports third-party cloud service content item 502, such as third-party cloud service application 604.

Figure 7A:
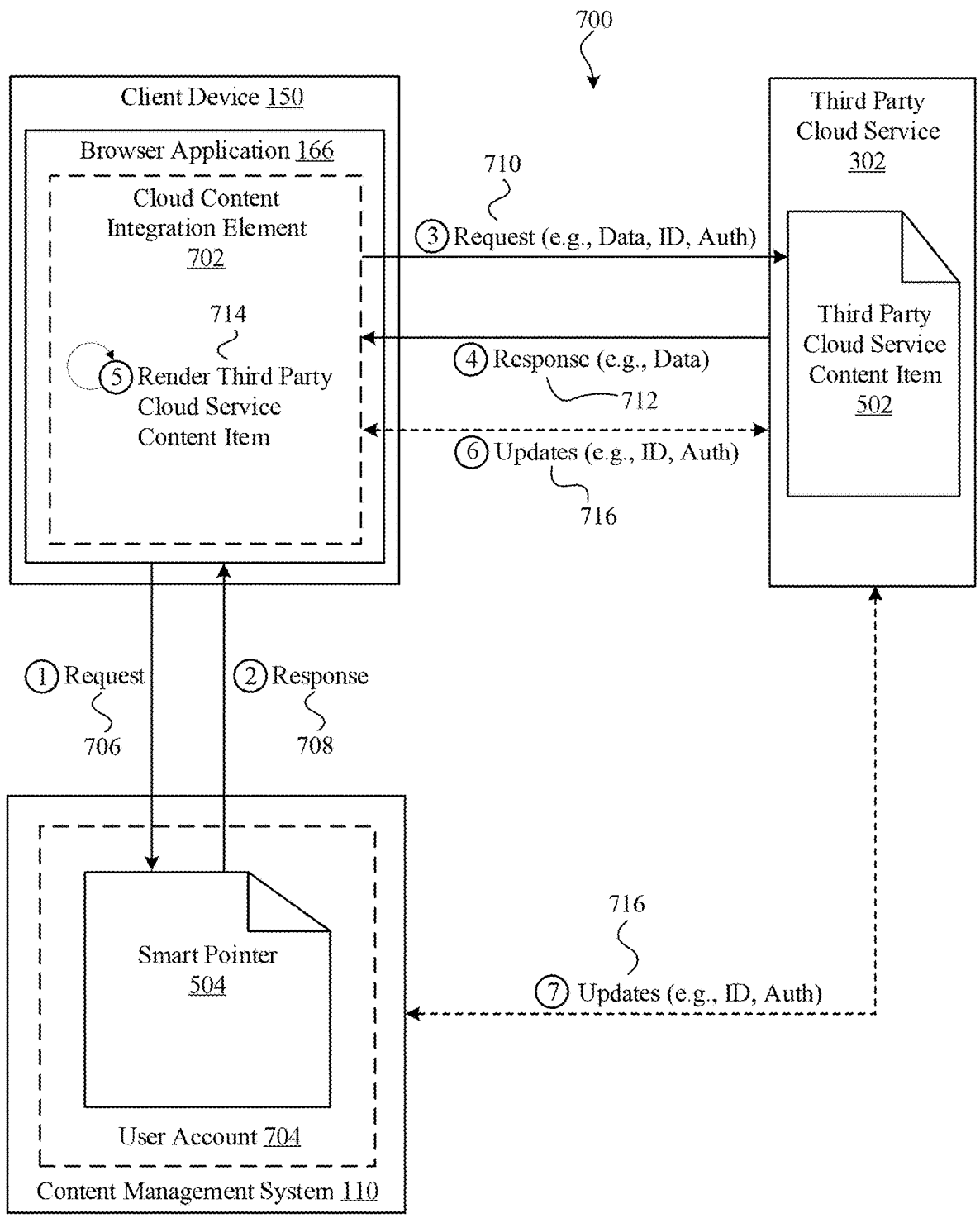
FIG. 7A shows an example process for providing a smart pointer referencing a cloud service content item, and providing a client device access to the content and functionalities of the cloud service content item through the smart pointer.

FIG. 7A shows an example process 700 for providing a representation (e.g., smart pointer 504) of third-party cloud service content item 502 in content management system 110, and providing client device 150 access to the content and functionalities of third-party cloud service content item 502 through smart pointer 504 on content management system 110.

Figure 7B:
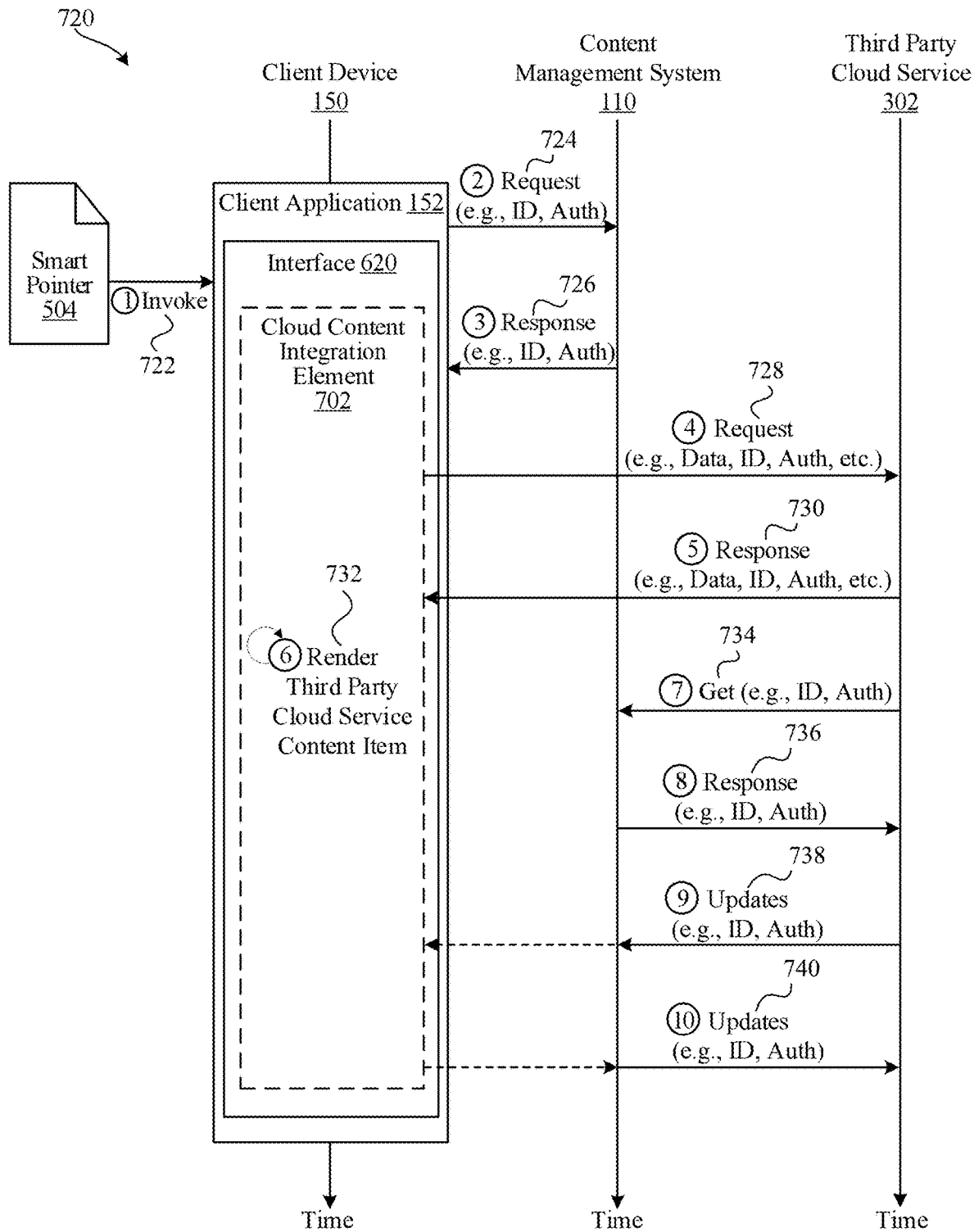
FIG. 7B shows an example process for providing a client device access to the content and functionalities of a cloud service content item through a smart pointer and a client application on a client device.

In this example, smart pointer 504 is stored in user account 704 on content management system 110. User account 704 can be a user account registered on content management system 110, which contains content items stored and maintained by the user on content management system 110. In some cases, the content items, including smart pointer 504, in user account 704 can also be stored and synchronized locally on client device 150 as previously explained. Thus, while smart pointer 504 is depicted in FIG. 7A as being stored in content management system 110, in other examples smart pointer 504 may also be stored and accessed locally on client device 150, as shown in FIG. 7B and further described below.

In process 700, browser application 166 on client device 150 first sends request 706 to content management system 110 for the content and/or metadata associated with smart pointer 504. Content management system 110 can receive request 706 and send response 708 to browser application 166, which browser application 166 can use to continue with process 700 to render/present a representation of third-party cloud service content item 502 on client device 150. Response 708 can include, for example, metadata associated with third-party cloud service content item 502, which browser application 166 can use to present or render a representation of third-party cloud service content item 502.

For example, response 708 can include an identifier (ID) that can be used to request the content of third-party cloud service content item 502 from third-party cloud service 302, authentication information (e.g., an authentication token) that can be used to authenticate third-party cloud service 302 with content management system 110 to allow the flow of data (e.g., third-party cloud service content item 502, associated metadata, associated content, etc.) and/or communications between content management system 110 and third-party cloud service 302, a title identifying third-party cloud service content item 502, access control permissions configured for user account 704 that define the level of access to the content of third-party cloud service content item 502 configured for user account 704, an address or resource identifier for requesting or obtaining the content of third-party cloud service content item 502 from third-party cloud service 302, and/or any other information or metadata associated with canonical content item 520.

Browser application 166 can receive response 708 from content management system 110 and send, via cloud content integration element 702, request 710 to third-party cloud service 302 for content and/or data associated with third-party cloud service content item 502. Cloud content integration element 702 can be an interface and/or communication element within browser application 166 configured to communicate with third-party cloud service 302 to receive content and data associated with third-party cloud service content item 502 and exchange with third-party cloud service 302 updates, metadata, and/or any other information associated with third-party cloud service content item 502. In some cases, cloud content integration element 702 can be a page, an IFrame (inline frame), an interface or web page element, a plugin, a browser tool or element, or software code that is implemented or executed by browser application 166 to communicate with third-party cloud service 302 and provide access to content and functionalities of third-party cloud service content item 502 through browser application 166 on client device 150. Cloud content integration element 702 can be configured to send and/or receive calls or requests for content and information associated with third-party cloud service content item 502 to and/or from third-party cloud service 302.

As previously noted, cloud content integration element 702 can send request 710 to third-party cloud service 302 for content and information associated with third-party cloud service content item 502. Request 710 can include, for example, an ID uniquely identifying third-party cloud service content item 502 at third-party cloud service 302, authentication information (e.g., a token for third-party cloud service 302 to use to authenticate with content management system 110), a title identifying third-party cloud service content item 502, access control information indicating a level of access to content associated with third-party cloud service content item 502 defined for user account 704 and/or client device 150, metadata associated with third-party cloud service content item 502 and/or user account 704, and/or any other information associated with third-party cloud service content item 502 and/or user account 704.

Cloud content integration element 702 can receive response 712 from third-party cloud service 302. Response 712 can include data associated with third-party cloud service content item 502, such as the content in third-party cloud service content item 502, metadata (e.g., comments, preview(s), indexable content, state information, description information, access information, status or activity information, user information, etc.) associated with third-party cloud service content item 502, etc.

Cloud content integration element 702 and browser application 166 can use the data in response 712 to render 714 third-party cloud service content item 502 or a representation of third-party cloud service content item 502 in browser application 166. At this point, a user at client device 150 can view, access and interact with the content and features of third-party cloud service content item 502 from browser application 166. The user can read the content of third-party cloud service content item 502, modify the content, add content, add or modify metadata (e.g., comments, etc.), and otherwise interact with the content and rendered representation of third-party cloud service content item 502 from browser application 166 in a similar fashion as when the user accesses third-party cloud service content item 502 directly from third-party cloud service 302 through a cloud-based application or editor (e.g., 604) provided for third-party cloud service content item 502. Process 700 can thus allow a user to access from content management system 110 content and functionalities provided by third-party cloud service 302 for cloud-based or cloud-backed content items (e.g., third-party cloud service content item 502).

In some cases, cloud content integration element 702 can also send or receive updates 716 to or from third-party cloud service 302 associated with third-party cloud service content item 502. Updates 716 can include changes and/or information associated with third-party cloud service content item 502, such as content or content changes (e.g., rename operations, edit or write operations, delete operations, purge operations, move operations, restore operations, revert operations, add or create operations, etc.), metadata or events (e.g., comments, title information or changes, IDs or ID changes, access information or permissions, organization or storing information, membership information, sharing information, user information, user activity information, tasks, timestamps, completed tasks or items, etc.), a token to authenticate third-party cloud service 302 with content management system 110, and so forth. In some examples, cloud content integration element 702 can receive updates 716 from third-party cloud service 302 and implement such updates in the rendered third-party cloud service content item on browser application 166, smart pointer 504, and/or user account 704.

In some cases, content management system 110 can similarly send or receive updates 716 to or from third-party cloud service 302. Content management system 110 can, for example, send updates 716 when it detects changes to content or metadata associated with third-party cloud service content item 502 and can receive updates 716 when content or metadata associated with third-party cloud service content item 502 are modified at third-party cloud service 302. Content management system 110 can implement any changes to content or metadata received in updates 716 from third-party cloud service 302. For example, content management system 110 can update metadata associated with canonical content item 520, such as comments, state, access information, storage information, or other information, based on updates 616 received from third-party cloud service 302. Updates 716 can thus synchronize or harmonize information associated with third-party cloud service content item 502 on third-party cloud service 302 and smart pointer 504 on content management system 110.

FIG. 7B shows an example process 720 for providing client device 150 access to the content and functionalities of third-party cloud service content item 502 through smart pointer 504 and client application 152 on client device 150. In this example, smart pointer 504 is stored on client device 150 along with other content items in user account 704 registered on content management system 110. Process 720 allows a user to store and access the content and features of third-party cloud service content item 502 from client application 152 (via smart pointer 504) without use of an application, such as a cloud-based application or editor, designed to natively support third-party cloud service content item 502.

In this example, client application 152 invokes 722 smart pointer 504 on client device 150, and sends request 724 to content management system 110 for authentication information associated with third-party cloud service content item 502. Request 724 can include a unique identifier associated with smart pointer 504 and third-party cloud service content item 502, as well as other information such as a title, user account information, login information, metadata, etc. Content management system 110 can receive request 724, verify permissions and/or authentication, and send response 726 to client application 152. Response 726 can include authentication information, such as an authentication token which third-party cloud service 302 can obtain and use to authenticate with content management system 110 to send, receive, and/or request content and metadata associated with third-party cloud service content item 502.

It should be noted that in some examples, client application 152 may skip the process of sending request 724 to content management system 110 and receiving response 726, and instead perform the remaining steps in process 720 without first sending request 724 and receiving response 726. For example, client application 152 may already have an authentication token or cached authentication information available and thus may not have to send request 724 to content management system 110. In some cases, client application 152 may send request 724 to content management system 110 if it determines it does not already have an authentication token or other authentication information, or if an existing authentication token or authentication information has expired, is invalid, or otherwise should be refreshed, updated, or replaced.

Client application 152 can implement or execute cloud content integration element 702 to communicate with third-party cloud service 302 as previously described. Here, cloud content integration element 702 can use the information in response 726, such as an authentication token, a unique identifier, access control information, a title, etc., to send request 728 to third-party cloud service 302 for the content and/or metadata of third-party cloud service content item 502. Request 728 can include, for example, authentication information and an ID that third-party cloud service 302 can use to authenticate, identify and retrieve content and/or metadata associated with third-party cloud service content item 502, and send the content and/or metadata to cloud content integration element 702.

Cloud content integration element 702 can receive response 730 sent by third-party cloud service 302. Response 730 can include the content in third-party cloud service content item 502, metadata associated with third-party cloud service content item 502, a token or authentication information to authenticate with content management system 110, etc. Client application 152 and/or cloud content integration element 702 can use the content and any metadata in response 730 to render 732 a copy or representation of third-party cloud service content item 502 (e.g., present the content of third-party cloud service content item 502 and any associated features or functionalities) on interface 620 at client device 150, and provide support for any features or functionalities associated with third-party cloud service content item 502. Interface 620 can be any graphical user interface. For example, interface 620 can be a user interface or a portion/section of a user interface provided by client application 152, a user interface or window provided by an application on client device 150, a user interface or window provided by an operating system or windowing system on client device 150, a page such as an HTML or other web page, etc.

At this point, the user at client device 150 can access and interact with the content and features of third-party cloud service content item 502 from interface 620 on client device 150. In some cases, process 720 can include steps for exchanging updates and other information between cloud content integration element 702, content management system 110, and/or third-party cloud service 302.

For example, if third-party cloud service 302 has updates associated with third-party cloud service content item 502, such as comments, content changes, metadata changes, etc., third-party cloud service 302 can send message 734 including or requesting authentication information for authenticating with content management system 110 to provide such updates from third-party cloud service 302. In some cases, message 734 can include authentication information (e.g., a token), identification information (e.g., a unique ID), and/or metadata associated with third-party cloud service content item 502. Moreover, in some cases, message 734 can include an ID associated with third-party cloud service content item 502 that content management system 110 can use to identify third-party cloud service content item 502 and associate message 734 with third-party cloud service content item 502.

Content management system 110 can send response 736, which can include, for example, authentication information, such as an authentication token, that third-party cloud service 302 can use to authenticate with content management system 110 to provide data or updates associated with third-party cloud service content item 502. In some cases, response 736 can include other information, such as a unique ID, a title of third-party cloud service content item 502, access permissions associated with third-party cloud service content item 502, metadata associated with third-party cloud service content item 502, updates available at content management system 110, and so forth.

Third-party cloud service 302 can receive response 736, verify permissions associated with third-party cloud service content item 502 and/or associated data, and send updates 738 to content management system 110 and/or cloud content integration element 702. In some examples, updates 738 can include authentication information (e.g., an authentication token) for authenticating with content management system 110, updated content associated with third-party cloud service content item 502, and/or metadata associated with third-party cloud service content item 502. Content management system 110 can use the information in updates 738 to modify or update information associated with third-party cloud service content item 502 and/or smart pointer 504. For example, content management system 110 can use the information in updates 738 to store, modify, present, and/or update metadata or events (e.g., comments, document information, access information or permissions, content descriptions, user activity, tasks, messages, timestamps, notifications, modifications, etc.) and/or content stored at content management system 110 and/or client device 150 for third-party cloud service content item 502 and/or smart pointer 504.

Similarly, cloud content integration element 702 can use the information in updates 738 to update the content and/or metadata associated with the copy or representation of third-party cloud service content item 502 rendered or presented on client device 150. For example, cloud content integration element 702 can use the information in updates 738 to update the content presented by interface 620 and/or the features or functionalities provided at interface 620 for third-party cloud service content item 502.

If any changes are made at client device 150 to content or metadata associated with third-party cloud service content item 502, cloud content integration element 702 can send updates 740 to content management system 110 and/or third-party cloud service 302 to propagate or implement such changes on the content management system 110 and/or third-party cloud service 302. For example, if the user at client device 150 adds a comment to the content rendered by interface 620 or executes a content operation such as a rename or edit associated with third-party cloud service content item 502, cloud content integration element 702 can provide the added comment or content operation (and/or associated changes) to content management system 110 and/or third-party cloud service 302 for storage and updating of such information pertaining to third-party cloud service content item 502. To illustrate, cloud content integration element 702 can send third-party cloud service 302 updates 740 including changes to content in third-party cloud service content item 502 made by a user via interface 620 during a presentation of third-party cloud service content item 502 at client device 150.

Third-party cloud service 302 can receive updates 740 from cloud content integration element 702 and implement such changes on third-party cloud service content item 502 at third-party cloud service 302. This allows the user to interact with a rendered version of third-party cloud service content item 502 on client device 150, make changes to the content, and utilize the various features or functionalities of third-party cloud service content item 502, without creating conflicting versions of third-party cloud service content item 502 or otherwise ensuring that any changes implemented on client device 150 are reconciled with a current copy or version of third-party cloud service content item 502 on third-party cloud service 302 and/or any copies or versions of third-party cloud service content item 502 on any other devices or locations.

Figure 7C:
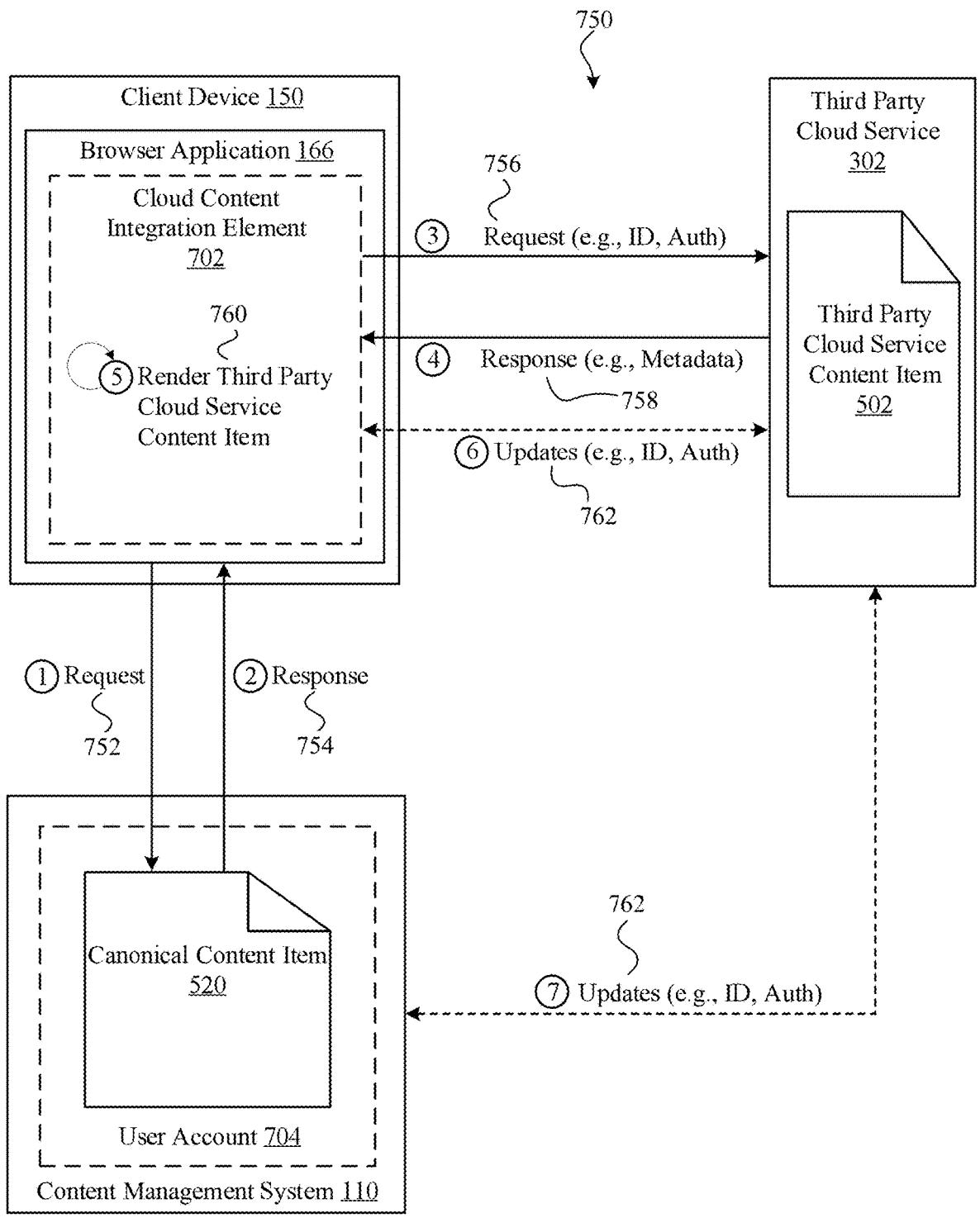
FIG. 7C shows an example process for providing a canonical content item associated with a cloud service content item, and providing a client device access to the content and functionalities of the cloud service content item through the canonical content item.
Figure 7D:
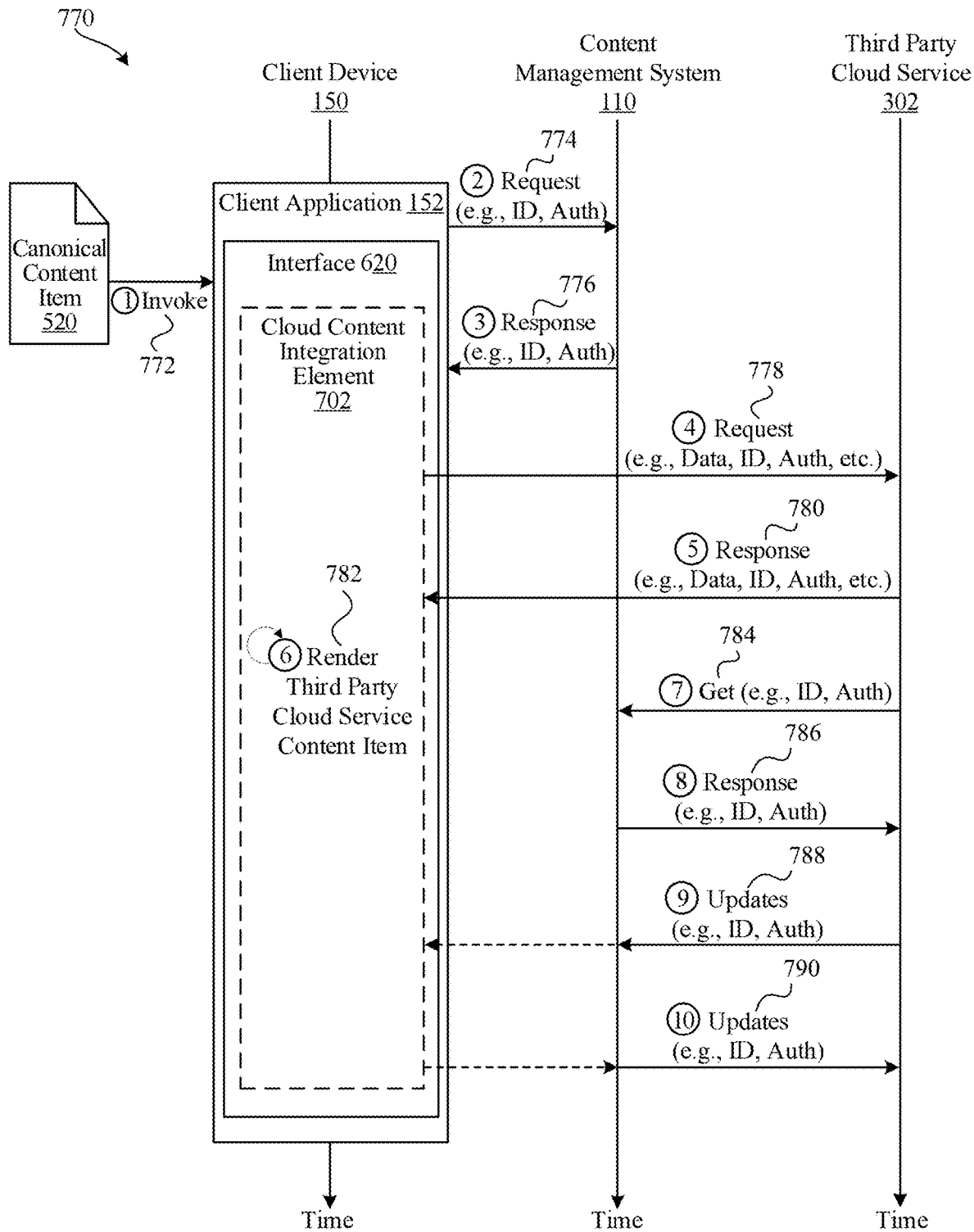
FIG. 7D shows an example process for providing a client device access to the content and functionalities of a cloud service content item through a canonical content item and client application on a client device.

FIG. 7C shows an example process 750 for providing client device 150 with the content and third-party cloud service features associated with a cloud-based or cloud-backed content item represented by canonical content item 520 on content management system 110. In this example, canonical content item 520 is stored in user account 704 on content management system 110. User account 704 can be a user account registered on content management system 110, which contains content items stored and maintained by the user on content management system 110. In some cases, the content items, including canonical content item 520, in user account 704 can also be stored and synchronized locally on client device 150 as previously explained. Thus, while canonical content item 520 is depicted in FIG. 7C as being stored in content management system 110, in other examples canonical content item 520 may also be stored and accessed locally on client device 150, as shown in FIG. 7D.

In process 750, browser application 166 on client device 150 first sends request 752 to content management system 110 for the content and features of canonical content item 520. Content management system 110 can receive request 752 and send response 754 to browser application 166, which browser application 166 can use to continue with process 750 to render/present the content and features of canonical content item 520 on client device 150. Response 754 can include, for example, content and/or metadata associated with canonical content item 520, which browser application 166 can use to present or render the content and third-party cloud service 302 features of canonical content item 520.

For example, response 754 can include an ID that can be used to request metadata of canonical content item 520 from third-party cloud service 302, authentication information (e.g., an authentication token) that can be used to authenticate third-party cloud service 302 with content management system 110 to allow the flow of data (e.g., metadata, updates, etc.) and/or communications between content management system 110 and third-party cloud service 302, a title identifying canonical content item 520 (and/or its associated cloud-based or cloud-backed content item such as third-party cloud service content item 502), access control permissions configured for user account 704 that define the level of access to the content of canonical content item 520 configured for user account 704, an address or resource identifier for requesting or obtaining content associated with canonical content item 520 from third-party cloud service 302, and/or any other information or metadata associated with canonical content item 520.

Browser application 166 can receive response 754 from content management system 110 and send, via cloud content integration element 702, request 756 to third-party cloud service 302 for metadata associated with canonical content item 520. Cloud content integration element 702 can be configured to send and/or receive calls or requests for data and information associated with canonical content item 520 to and/or from third-party cloud service 302. The metadata associated with canonical content item 520 can include information used to provide canonical content item 520 one or more features or functionalities enabled or supported by third-party cloud service 302, such as live collaboration (e.g., commenting, editing, authoring, messaging, etc.) features, previewing functionality, search functionality, indexing functionality, etc.

As previously noted, cloud content integration element 702 can send request 756 to third-party cloud service 302 for data and information associated with canonical content item 520. Request 756 can include, for example, an ID uniquely identifying canonical content item 520 (and/or a cloud-based or cloud-backed content item at third-party cloud service 302 such as third-party cloud service content item 502), authentication information (e.g., a token for third-party cloud service 302 to use to authenticate with content management system 110), a title identifying canonical content item 520, access control information indicating a level of access to content associated with canonical content item 520 defined for user account 704 and/or client device 150, metadata associated with canonical content item 520 and/or user account 704, and/or any other information associated with canonical content item 520 and/or user account 704.

Cloud content integration element 702 can receive response 758 from third-party cloud service 302. Response 758 can include data associated with canonical content item 520, such as metadata (e.g., comments, preview(s), indexable content, state information, description information, access information, status or activity information, user information, etc.) associated with canonical content item 520, and/or any other data.

Cloud content integration element 702 and browser application 166 can use the data in response 758 to render 760 canonical content item 520 (including its associated content and features) in browser application 166. At this point, a user at client device 150 can view, access and interact with the content and features of canonical content item 520 from browser application 166. The user can read the content of canonical content item 520, modify the content, add content, add or modify metadata (e.g., comments, etc.), and otherwise interact with the content and rendering of canonical content item 520 from browser application 166 in a similar fashion as when the user accesses third-party cloud service content item 502 directly from third-party cloud service 302 through a cloud-based application or editor (e.g., 604) provided for third-party cloud service content item 502.

In some cases, cloud content integration element 702 can also send or receive updates 762 to or from third-party cloud service 302 associated with canonical content item 520. Updates 762 can include changes and/or information associated with canonical content item 520, such as content or content changes (e.g., rename operations, edit or write operations, delete operations, purge operations, move operations, restore operations, revert operations, add or create operations, etc.), metadata or events (e.g., comments, title information or changes, IDs or ID changes, access information or permissions, organization or storing information, membership information, sharing information, user information, user activity information, tasks, timestamps, completed tasks or items, etc.), a token to authenticate third-party cloud service 302 with content management system 110, and so forth. In some examples, cloud content integration element 702 can receive updates 762 from third-party cloud service 302 and implement such updates in the rendered canonical content item 520 on browser application 166, canonical content item 520, and/or user account 704.

In some cases, content management system 110 can similarly send or receive updates 762 to or from third-party cloud service 302. Content management system 110 can, for example, send updates 762 when it detects changes to content or metadata associated with canonical content item 520 and can receive updates 762 when content or metadata associated with canonical content item 520 are modified at third-party cloud service 302. Content management system 110 can implement any changes to content or metadata received in updates 762 from third-party cloud service 302. For example, content management system 110 can update metadata associated with canonical content item 520, such as comments, state, access information, storage information, or other information, based on updates 762 received from third-party cloud service 302. In cases where canonical content item 520 and third-party cloud service content item 502 represent versions of the same content item, updates 762 can synchronize or harmonize information associated with third-party cloud service content item 502 on third-party cloud service 302 and canonical content item 520 on content management system 110.

FIG. 7D shows an example process 770 for providing client device 150 access to the content and third-party cloud service 302 functionalities associated with canonical content item 502 through canonical content item 520 and client application 152 on client device 150. In this example, canonical content item 520 is stored on client device 150 along with other content items in user account 704 registered on content management system 110. Process 770 allows a user to store and access the content and features of third-party cloud service content item 502 from client application 152 (via canonical content item 520) without use of an application, such as a cloud-based application or editor, designed to natively support third-party cloud service content item 502. In some cases, the content of canonical content item 520 can be stored on content management system 110 and client device 150, but some cloud-based functionalities are obtained from, and provided by, third-party cloud service 302.

In this example, client application 152 invokes 772 canonical content item 520 on client device 150, and sends request 774 to content management system 110 for authentication information associated with canonical content item 520 (and/or an associated cloud-based or cloud-backed content item such as third-party cloud service content item 502). Request 774 can include a unique identifier associated with canonical content item 520 (and/or third-party cloud service content item 502), as well as other information such as a title, user account information, login information, metadata, etc. Content management system 110 can receive request 774, verify permissions and/or authentication, and send response 776 to client application 152. Response 776 can include authentication information, such as an authentication token which third-party cloud service 302 can obtain and use to authenticate with content management system 110 to send, receive, and/or request metadata associated canonical content item 520.

It should be noted that in some examples, client application 152 may skip the process of sending request 774 to content management system 110 and receiving response 776, and instead perform the remaining steps in process 770 without first sending request 774 and receiving response 776. For example, client application 152 may already have an authentication token or cached authentication information available and thus may not have to send request 774 to content management system 110. In some cases, client application 152 may send request 774 to content management system 110 if it determines it does not already have an authentication token or other authentication information, or if an existing authentication token or authentication information has expired, is invalid, or otherwise should be refreshed, updated, or replaced.

Client application 152 can implement or execute cloud content integration element 702 to communicate with third-party cloud service 302 as previously described. Here, cloud content integration element 702 can use the information in response 776, such as an authentication token, a unique identifier, access control information, a title, etc., to send request 778 to third-party cloud service 302 for metadata associated with canonical content item 520. The metadata can include data for providing cloud-based functionalities to canonical content item 520, such as metadata for providing collaboration features (e.g., live editing, commenting, messaging, authoring, etc.), previewing features, indexing features, search features, etc. Request 778 can include, for example, authentication information and an ID that third-party cloud service 302 can use to authenticate, identify and retrieve content and/or metadata associated with canonical content item 520, and send the content and/or metadata to cloud content integration element 702.

Cloud content integration element 702 can receive response 780 sent by third-party cloud service 302. Response 780 can include metadata associated with canonical content item 520, content in third-party cloud service content item 502, a token or authentication information to authenticate with content management system 110, etc. Client application 152 and/or cloud content integration element 702 can use the metadata and information in response 780 to render 782 canonical content item 520 and its associated content on interface 620 at client device 150, and provide support for any features or functionalities associated with third-party cloud service 302.

At this point, the user at client device 150 can access and interact with the content and features of canonical content item 520 from interface 620 on client device 150. In some cases, process 770 can include steps for exchanging updates and other information between cloud content integration element 702, content management system 110, and/or third-party cloud service 302. For example, if third-party cloud service 302 has updates associated with canonical content item 520, such as comments, content changes, metadata changes, etc., third-party cloud service 302 can send message 784 including or requesting authentication information for authenticating with content management system 110 to provide such updates from third-party cloud service 302. In some cases, message 784 can include authentication information (e.g., a token), identification information (e.g., a unique ID), and/or metadata associated with canonical content item 520. Moreover, in some cases, message 784 can include an ID associated with canonical content item 520 that content management system 110 can use to identify canonical content item 520 and associate message 784 with canonical content item 520.

Content management system 110 can send response 786, which can include, for example, authentication information, such as an authentication token, that third-party cloud service 302 can use to authenticate with content management system 110 to provide data or updates associated with canonical content item 520. In some cases, response 786 can include other information, such as a unique ID, a title of canonical content item 520, access permissions associated with canonical content item 520, metadata associated with canonical content item 520, updates available at content management system 110, and so forth.

Third-party cloud service 302 can receive response 786, verify permissions associated with canonical content item 520 and/or associated data, and send updates 788 to content management system 110 and/or cloud content integration element 702. In some examples, updates 788 can include authentication information (e.g., an authentication token) for authenticating with content management system 110, updated content associated with canonical content item 520, and/or metadata associated with canonical content item 520. Content management system 110 can use the information in updates 788 to modify or update information associated with canonical content item 520. For example, content management system 110 can use the information in updates 788 to store, modify, present, and/or update metadata or events (e.g., comments, document information, access information or permissions, content descriptions, user activity, tasks, messages, timestamps, notifications, modifications, etc.) and/or content stored at content management system 110 and/or client device 150 for canonical content item 520.

Similarly, cloud content integration element 702 can use the information in updates 788 to update the content and/or metadata associated with the content and/or features rendered or presented on client device 150 for canonical content item 520. For example, cloud content integration element 702 can use the information in updates 788 to update the content presented by interface 620 and/or the features or functionalities provided at interface 620 for canonical content item 520.

In some cases, if any changes are made at client device 150 to content or metadata associated with canonical content item 520, cloud content integration element 702 can send updates 790 to content management system 110 and/or third-party cloud service 302 to propagate or implement such changes on the content management system 110 and/or third-party cloud service 302. For example, if the user at client device 150 adds a comment to the content rendered by interface 620 or executes a content operation such as a rename or edit associated with canonical content item 520, cloud content integration element 702 can provide the added comment or content operation (and/or associated changes) to content management system 110 and/or third-party cloud service 302 for storage and updating of such information pertaining to canonical content item 520 and/or an associated cloud-based or cloud-backed content item on third-party cloud service 302, such as third-party cloud service content item 502. To illustrate, cloud content integration element 702 can send third-party cloud service 302 updates 790 including changes to content in canonical content item 520 made by a user via interface 620 during a presentation of canonical content item 520 at client device 150.

In some cases, if third-party cloud service 302 maintains a copy of a content item associated with canonical content item 520, such as third-party cloud service content item 502, third-party cloud service 302 can receive updates 790 from cloud content integration element 702 and implement such changes on the content item (e.g., third-party cloud service content item 502) at third-party cloud service 302. This allows the user to interact with a rendered version of the content item (e.g., third-party cloud service content item 502) on client device 150, make changes to the content, and utilize the various features or functionalities of the content item (e.g., third-party cloud service content item 502), without creating conflicting versions of the content item (e.g., third-party cloud service content item 502) or otherwise ensuring that any changes implemented on client device 150 are reconciled with a current copy or version of the content item (e.g., third-party cloud service content item 502) on third-party cloud service 302 and/or any copies or versions of the content item on any other devices or locations.

Figure 8:
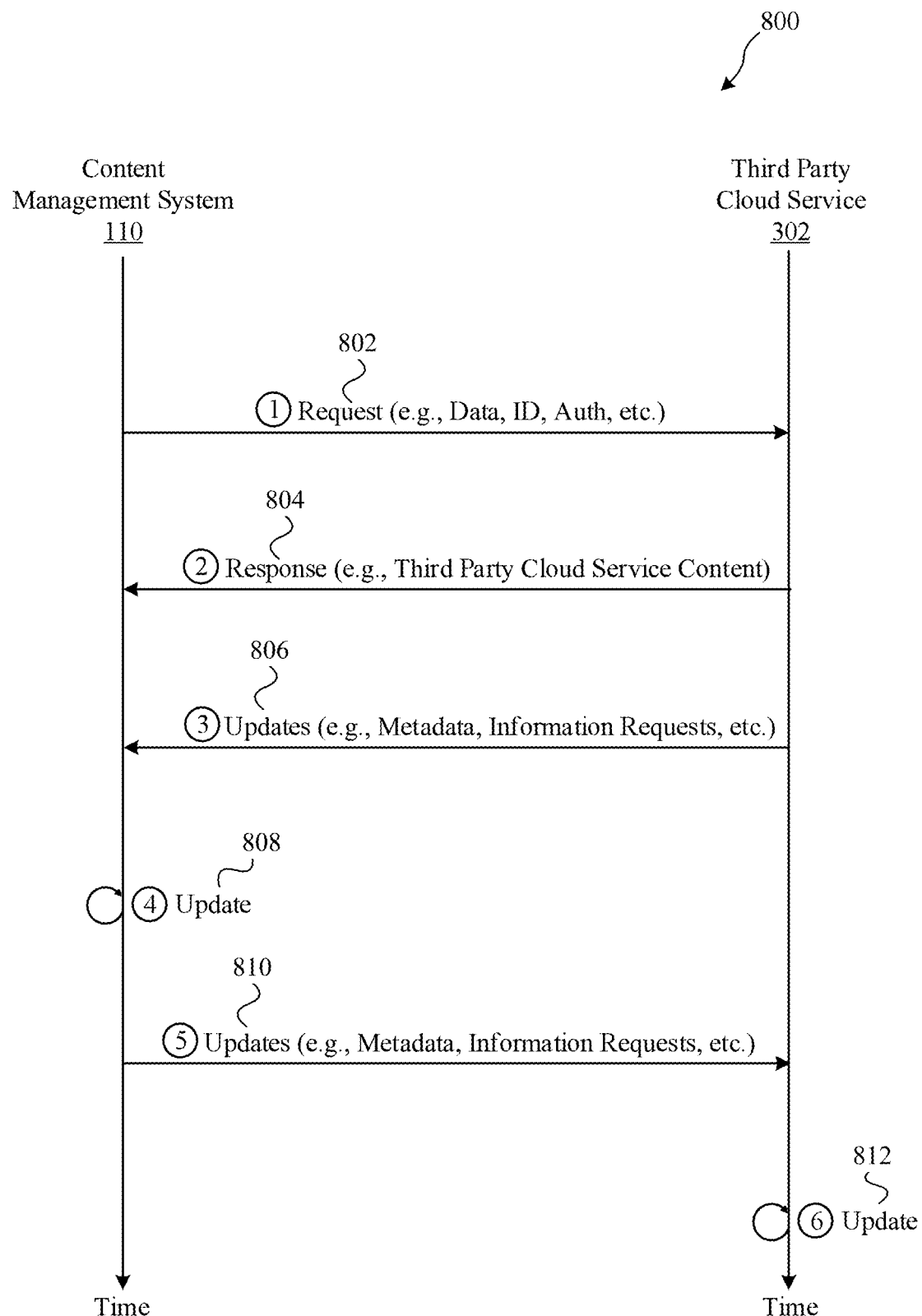
FIG. 8 shows an example flow for exchanging content, metadata and updates associated with a cloud service content item between a content management system and a third-party cloud service.

FIG. 8 shows an example flow (800) for exchanging data (e.g., content, metadata, etc.) and updates associated with a cloud-based or cloud-backed content item, such as canonical content item 520 or third-party cloud service content item 502, between content management system 110 and third-party cloud service 302. In this example, content management system 110 sends request 802 to third-party cloud service 302 for data (e.g., metadata, content, etc.) associated with a cloud-based or cloud-backed content item (e.g., canonical content item 520, third-party cloud service content item 502, etc.). Request 802 can include authentication information, a request for data associated with the content item, an ID associated with the cloud-based or cloud-backed content item, and/or other information associated with the cloud-based or cloud-backed content item such as a title, access permissions, sharing information, description information, metadata, etc. Third-party cloud service 302 receives request 802, verifies permissions and/or access to the cloud-based or cloud-backed content item, and sends response 804 to content management system 110. Response 804 can include the content in the cloud-based or cloud-backed content item and/or any metadata associated with the cloud-based or cloud-backed content item.

In some examples, response 804 can include authentication information (e.g., an authentication token) for authenticating with content management system 110 and/or data (e.g., content, metadata, etc.) associated with the cloud-based or cloud-backed content item. Content management system 110 can store the information in response 804 and/or use the information to create or store a preview of the cloud-based or cloud-backed content item, create or store a canonical content item (e.g., 520) corresponding to the cloud-based or cloud-backed content item, create or store a smart pointer (e.g., 504) corresponding to the cloud-based or cloud-backed content item, store or update metadata associated with the cloud-based or cloud-backed content item and/or a canonical content item or smart pointer corresponding to the cloud-based or cloud-backed content item, store the content of the cloud-based or cloud-backed content item, provide the content of the cloud-based or cloud-backed content item to one or more client devices for presentation or access, configure attributes (e.g., storage organization, access control permissions, content features, functionalities, etc.) associated with the cloud-based or cloud-backed content item or an associated canonical content item or smart pointer, extend the features or functionalities available for the cloud-based or cloud-backed content item based on features or functionalities provided by content management system 110, etc.

If third-party cloud service 302 detects any changes in the content or metadata of the cloud-based or cloud-backed content item, it can send updates 806 to content management system 110 to inform content management system 110 of such changes. Content management system 110 can use the information in updates 806 to perform update 808 at content management system 110. Content management system 110 can perform update 808 to implement any changes included in updates 806 or update associated information on content management system 110.

Similarly, if content management system 110 detects any changes in the content or metadata of the cloud-based or cloud-backed content item and/or an associated canonical content item (e.g., 520) or smart pointer (e.g., 504), it can send updates 810 to third-party cloud service 302 to inform third-party cloud service 302 of such changes. Third-party cloud service 302 can use the information in updates 810 to perform update 812 at third-party cloud service 302. Third-party cloud service 302 can perform update 812 to implement any changes included in updates 810 on a copy of the cloud-based or cloud-backed content item at third-party cloud service 302.

Figure 9A:
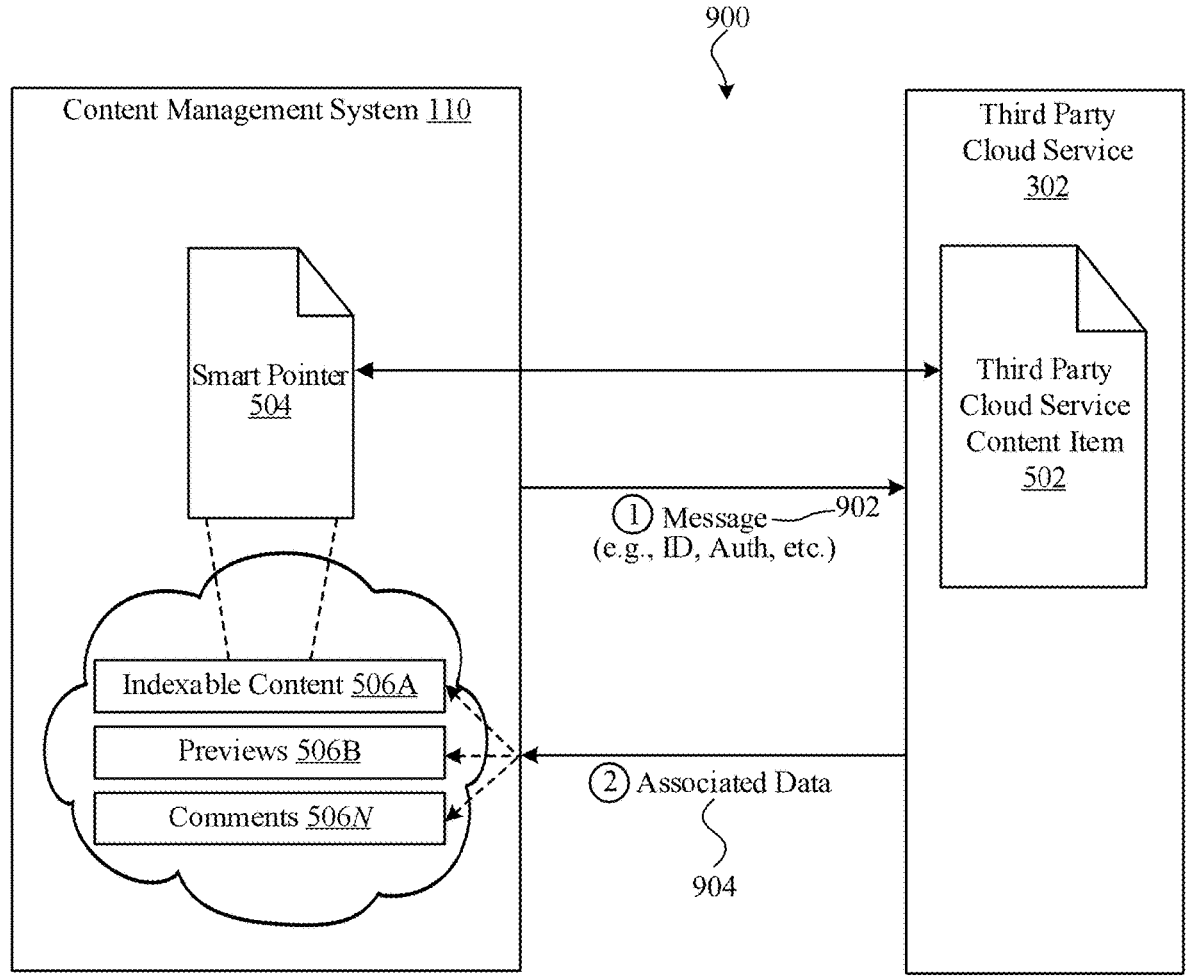
FIG. 9A shows an example flow for creating associations between content and metadata in a cloud service content item on a third-party cloud service and a smart pointer on a content management system.

FIG. 9A shows an example flow (900) for creating associations between content and metadata in third-party cloud service content item 502 on third-party cloud service 302 and smart pointer 504 in content management system 110. In flow 900, content management system 110 can receive data from third-party cloud service 302 that content management system 110 can use to associate smart pointer 504 (and any of its associated content or metadata) with third-party cloud service content item 502 and third-party cloud service 302, and store or create associated content or metadata for smart pointer 504, such as indexable content 506A, previews 506B, comments 506N, etc. Content management system 110 can also use the received data to do functionality mappings (e.g., 500) as previously described with respect to FIG. 5A.

In flow 900, content management system 110 sends message 902 with authentication information to third-party cloud service 302 in order to enable the exchange of data associated with third-party cloud service content item 502. Message 902 can include, for example, an authentication token as well as other information associated with third-party cloud service content item 502, such as a unique ID, a title, access control information, etc. Message 902 can request data or information associated with third-party cloud service content item 502 from third-party cloud service 302.

Third-party cloud service 302 can receive message 902, authenticate with content management system 110, verify access to third-party cloud service content item 502 and/or its associated data, and/or send associated data 904 to content management system 110. Associated data 904 can include content, metadata, and/or information associated with third-party cloud service content item 502, which content management system 110 can use to create, store, and/or associate content or data with smart pointer 504.

For example, associated data 904 can include indexable content 506A associated with third-party cloud service content item 502, which content management system 110 can use for indexing and to provide search functionality for smart pointer 504. Since content management system 110 may not store the actual content of third-party cloud service content item 502 in smart pointer 504 (or elsewhere in content management system 110), content management system 110 may not otherwise have content associated with third-party cloud service content item 502 available for indexing and searching. Thus, content management system 110 can receive indexable content 506A (e.g., via associated data 904) from third-party cloud service 302 and use indexable content 506A for indexing and search functionalities.

In some cases, associated data 904 can include one or more previews 506B of third-party cloud service content item 502 and/or content that content management system 110 can use to create previews 506B for smart pointer 504. Content management system 110 can store previews 506B for access by users. Previews 506B can be used to render a preview of smart pointer 504 (or the content associated with smart pointer 504 and third-party cloud service content item 502).

In some examples, associated data 904 can include comments 506N associated with third-party cloud service content item 502 and/or content within third-party cloud service content item 502. Content management system 110 can associate comments 506N with smart pointer 504 and/or one or more portions of content associated with smart pointer 504, and store comments 506N for access by users interacting with smart pointer 504. In some cases, content management system 110 can provide comments 506N as notifications to users or may embed comments 506N in smart pointer 504 (or its associated content) or otherwise provide comments 206N along with smart pointer 504 when rendered or presented to a user.

In some cases, comments 506N can be anchored or unanchored. Anchored comments can refer to comments that are mapped or anchored to specific content in a content item (e.g., smart pointer 504) and unanchored comments can refer to comments that are not mapped or anchored to specific content in a content item (e.g., smart pointer 504) but rather mapped to or associated with the content item as a whole. For example, a comment may be specific to a paragraph in a content item (e.g., smart pointer 504). Accordingly, the comment can be mapped to or associated with that particular paragraph. Once mapped to or associated with the particular paragraph, the comment becomes an anchored comment as it is specifically anchored to the paragraph it pertains to.

However, in some cases, content management system 110 may not have enough information to determine which specific portion(s) of content within a content item a comment pertains to. Accordingly, content management system 110 may not be able to anchor the comment to any specific portion(s) of the document or file, and instead maps or associates the comment with the content item as a whole. For example, content management system 110 may have a comment received from third-party cloud service 302 for third-party cloud service content item 502, but may not have information identifying which specific portion(s) of content within third-party cloud service content item 502 the comment pertains to. As a result, content management system 110 may not be able to map or anchor the comment to a specific portion(s) of the content in third-party cloud service content item 502. Instead, content management system 110 may associate the comment with third-party cloud service content item 502 (and/or smart pointer 504) as a whole.

As illustrated in flow 900, associated data 904 received from third-party cloud service 302 can be used by content management system 110 to create associations between smart pointer 504 and content or metadata corresponding to smart pointer 504. Such associations can enable content management system 110 to provide or support various features and functionalities for smart pointer 504 and, in some cases, extend the features or functionalities of smart pointer 504 to include other features or functionalities made available through the ecosystem of content management system 110 and its own supported content, storage, collaboration, interaction, and other features and functionalities.

Figure 9B:
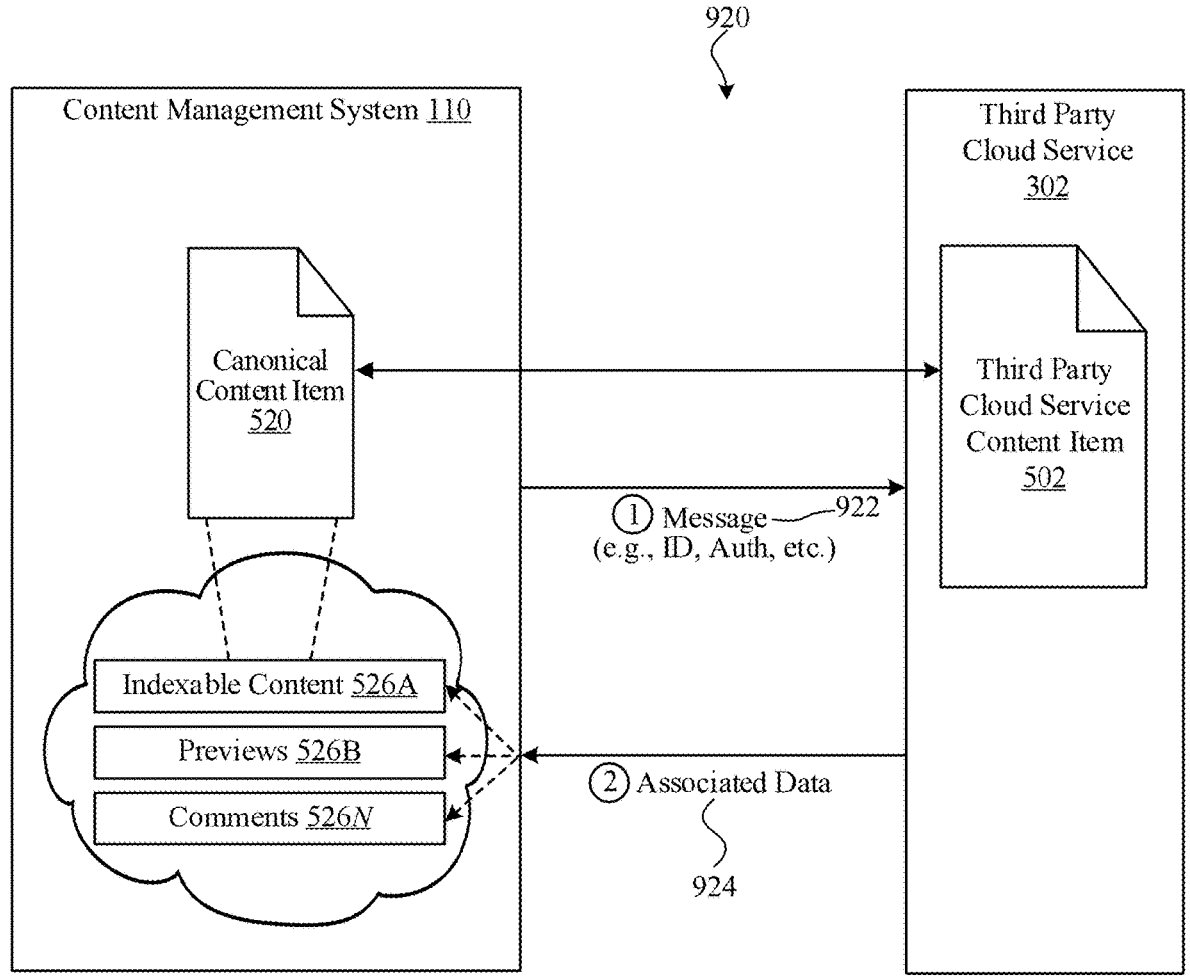
FIG. 9B shows an example flow for creating associations between content and metadata in a cloud service content item on a third-party cloud service and a canonical content item on a content management system.

FIG. 9B shows an example flow (920) for creating associations between content and metadata in third-party cloud service content item 502 on third-party cloud service 302 and canonical content item 520 in content management system 110. In flow 920, content management system 110 can receive data from third-party cloud service 302 that content management system 110 can use to associate canonical content item 520 (and any of its associated content or metadata) with third-party cloud service content item 502 and third-party cloud service 302, and store or create associated content or metadata for canonical content item 520, such as indexable content 526A, previews 526B, comments 526N, etc. Content management system 110 can also use the received data to do functionality mappings (e.g., 524) as previously described with respect to FIG. 5B.

In flow 920, content management system 110 sends message 922 with authentication information to third-party cloud service 302 in order to enable the exchange of data associated with third-party cloud service content item 502. Message 922 can include, for example, an authentication token as well as other information associated with third-party cloud service content item 502, such as a unique ID, a title, access control information, etc. Message 922 can request data or information associated with canonical content item 520 and third-party cloud service content item 502 from third-party cloud service 302.

Third-party cloud service 302 can receive message 922, authenticate with content management system 110, verify access to the data and/or features associated with third-party cloud service content item 502, and/or send associated data 924 to content management system 110. Associated data 924 can include data (e.g., metadata, content, etc.) and/or information associated with third-party cloud service content item 502 and canonical content item 520, which content management system 110 can use to create, store, and/or associate data with canonical content item 520. For example, associated data 924 can include indexable content 526A that content management system 110 can use for indexing and to provide search functionality for canonical content item 520.

In some cases, associated data 924 can include one or more previews 526B that content management system 110 can use to create previews 526B for canonical content item 520. Content management system 110 can store previews 526B for access by users. Previews 526B can be used to render a preview of canonical content item 520 (or the content associated with canonical content item 520). In some examples, associated data 924 can include comments 526N associated with canonical content item 520 and/or third-party cloud service content item 502. Content management system 110 can associate comments 526N with canonical content item 520 and/or one or more portions of content associated with canonical content item 520, and store comments 526N for access by users interacting with canonical content item 520. In some cases, content management system 110 can provide comments 526N as notifications to users or may embed comments 526N in canonical content item 520 (or its associated content) or otherwise provide comments 206N along with canonical content item 520 when rendered or presented to a user.

As previously explained, in some cases, comments 526N can be anchored or unanchored. Anchored comments can refer to comments that are mapped or anchored to specific content in a content item (e.g., canonical content item 520) and unanchored comments can refer to comments that are not mapped or anchored to specific content in a content item (e.g., canonical content item 520) but rather mapped to or associated with the content item as a whole.

As illustrated in flow 920, associated data 924 received from third-party cloud service 302 can be used by content management system 110 to create associations between canonical content item 520 and content or metadata corresponding to canonical content item 520 (and third-party cloud service content item 502). Such associations can enable content management system 110 to provide or support various features and functionalities for canonical content item 520 and, in some cases, extend the features or functionalities of canonical content item 520 to include other features or functionalities made available through the ecosystem of content management system 110 and its own supported content, storage, collaboration, interaction, and other features and functionalities.

Figure 10:
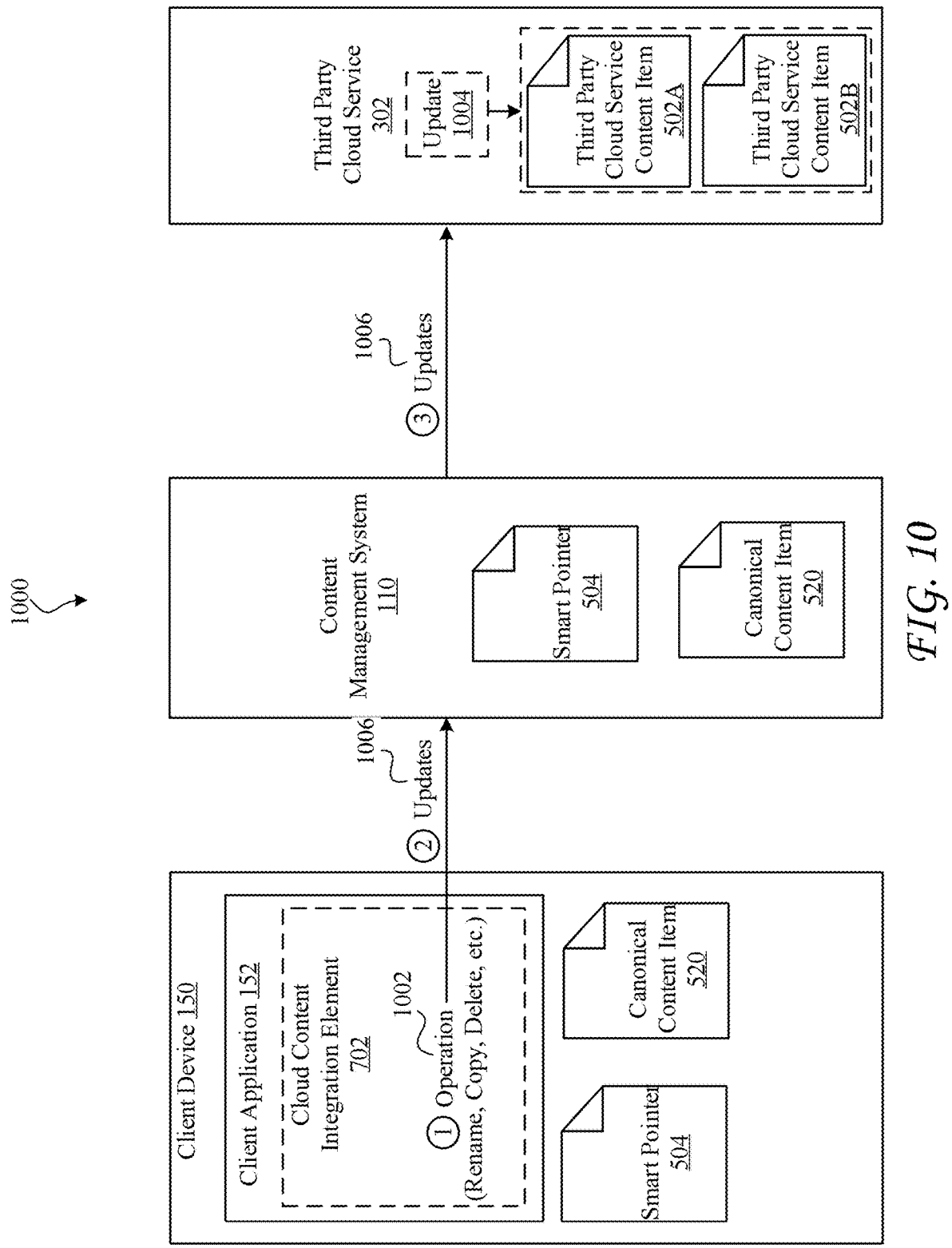
FIG. 10 shows an example flow for pushing local changes to a smart pointer and a canonical content item on a client device to a third-party cloud service hosting content items associated with the smart pointer and the canonical content item.

FIG. 10 shows flow 1000 for pushing to third-party cloud service 302 local changes made to smart pointer 504 and/or canonical content item 520 on client device 150. In this example, third-party cloud service content item 502A is a cloud-based or cloud-backed content item associated with smart pointer 504, and third-party cloud service content item 502B is a version of a cloud-based or cloud-backed content item represented by canonical content item 520.

In flow 1000, when client device 150 executes operation 1002 resulting in changes to the content and/or metadata of smart pointer 504 and/or canonical content item 520 (and thus the content and/or metadata in third-party cloud service content item 502A and/or 502B), it can send updates 1006 identifying such changes to content management system 110. Content management system 110 can receive updates 1006 and send them to third-party cloud service 302. Third-party cloud service 302 can receive updates 1006 and use the information in updates 1006 to update 1004 third-party cloud service content item 502A (and/or its associated metadata) and/or 502B (and/or its associated metadata) to reflect the changes in updates 1006.

Operation 1002 can include any filesystem operation executed at client device 150 on content or metadata associated with smart pointer 504 and/or canonical content item 520 (and thus third-party cloud service content item 502A and/or 502B). Non-limiting examples of operation 1002 include a rename operation, a copy operation, a delete operation, an edit or write operation, a restore operation, an operation for reverting to a previous version of content, etc. Flow 1000 allows any local changes to content or metadata associated with smart pointer 504 and/or canonical content item 520 resulting from operation 1002 to be propagated to or synchronized with third-party cloud service content item 502A and/or 502B on third-party cloud service 302, so changes made to the content or metadata from client device 150 are not omitted from third-party cloud service content item 502A and/or 502B on third-party cloud service 302 (or any other devices with access to third-party cloud service content item 502A and/or 502B) and do not result in conflicting versions or copies on client device 150, content management system 110, and/or third-party cloud service 302, and to provide a uniform or integrated user and content experience across client device 150, content management system 110, and third-party cloud service 302.

Figure 11:
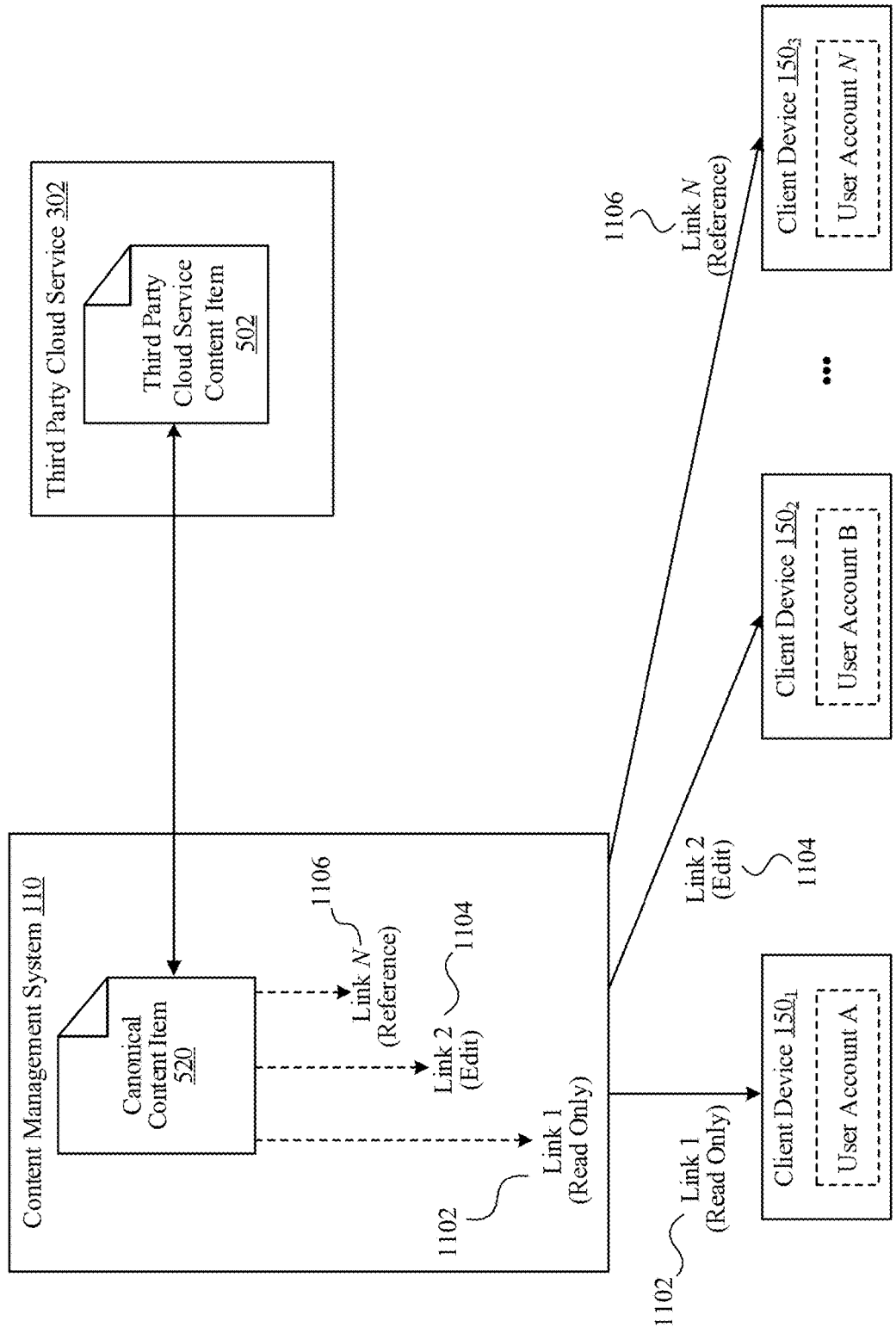
FIG. 11 shows an example link-based mechanism for sharing canonical content items stored in a content management system with users and devices.

FIG. 11 shows an example link-based mechanism for sharing cloud-based or cloud-backed content items stored in content management system 110 with users and devices. In this example, canonical content item 520 represents a cloud-based or cloud-backed content item stored in content management system 110 and being shared with users and devices using the example link-based mechanism described herein. As shown in FIG. 11, content management system 110 can create links 1102, 1104, 1106 to canonical content item 520. Links 1102, 1104, 1106 can be used to share canonical content item 520 with client devices $150_k$, $150_2$, $150_N$ and/or user accounts A, B, N. Links 1102, 1104, 1106 to canonical content item 520 can be configured with specific permissions so the links are pre-configured to provide a specific level of access to link recipients (e.g., client devices $150_k$, $150_2$, $150_N$).

For example, link 1102 can be a link configured to provide read-only access to canonical content item 520. Thus, when content management system 110 provides link 1102 to client device $150_k$, the user at client device $150_1$ will be able to use link 1002 to view or read the content associated with canonical content item 520 but will not be able to otherwise delete, modify or edit the content. On the other hand, link 1104 can be configured to provide edit access or modification rights to canonical content item 520. Thus, when content management system 110 provides link 1104 to client device $150_2$, the user at client device $150_2$ will be able to use link 1104 to view/read and edit/modify the content associated with canonical content item 520.

The different links (1102, 1104) with different rights or permissions can be used to share different levels or types of access with client devices in order to provide greater sharing flexibility and granularity. The different links (1102, 1104) also allow access to be revoked from one link without affecting access through other links. For example, if content management system 110 revokes link 1102, those users and devices (e.g., client device $150_2$) having link 1104 may not lose access to canonical content item 520 simply because link 1102 has been revoked. Likewise, if content management system 110 revokes link 1104, those users and devices (e.g., client device $150_1$) having link 1102 may not lose access to canonical content item 520 simply because link 1104 has been revoked.

Link 1106 is a reference link that does not confer or provide any rights or permissions to canonical content item 520. Instead, link 1106 uniquely identifies canonical content item 520 and can be used to request access to canonical content item 520. Thus, when content management system 110 provides link 1106 to client device $150_3$, the user at client device $150_3$ will not be able to access canonical content item 520 from link 1106, but will rather be able to use link 1106 to request access to canonical content item 520.

Link 1106 can also provide a means for users to regain access to canonical content item 520 when links 1102 or 1104 are revoked. For example, if there is a security threat or unauthorized access resulting from an unauthorized user gaining access to link 1102, content management system 110 can revoke link 1102 to prevent unauthorized access to content through link 1102. When content management system 110 revokes link 1102, this can cause any users or devices that have a read-only link (e.g., link 1102) to canonical content item 520 to lose access to canonical content item 520. For example, when content management system 110 revokes link 1102, it can retroactively remove the read/view rights or permissions on all read-only links (e.g., 1102) to prevent unauthorized access to canonical content item 520 from any read-only link shared with users or devices. As a result, those users or devices with read-only links will lose access to the content.

However, in some cases, when content management system 110 revokes the read-only links (e.g., 1102) or removes the rights/permissions from the read-only links, it can downgrade the read-only links to reference links (e.g., 1106). The reference links (e.g., 1106) then allow those users or devices losing access as a result of the read-only links being revoked (or their rights/permissions removed) to use the reference links to request and regain access to canonical content item 520. Therefore, those users or devices will have a means to regain access to canonical content item 520 after the revocation of read-only links or the rights/permissions configured for those links.

Similarly, if content management system 110 revokes the edit links (e.g., 1104) or removes the rights/permissions from the edit links, it can downgrade such links to reference links (e.g., 1106). As previously explained, the reference links (e.g., 1106) allow those users or devices losing access as a result of the edit links being revoked (or their rights/permissions removed) to use the reference links to request and regain access to canonical content item 520. The users or devices will thus have a means to regain access to canonical content item 520 after the revocation of the edit links (e.g., 1104) or the rights/permissions configured for those links.

Figure 12:
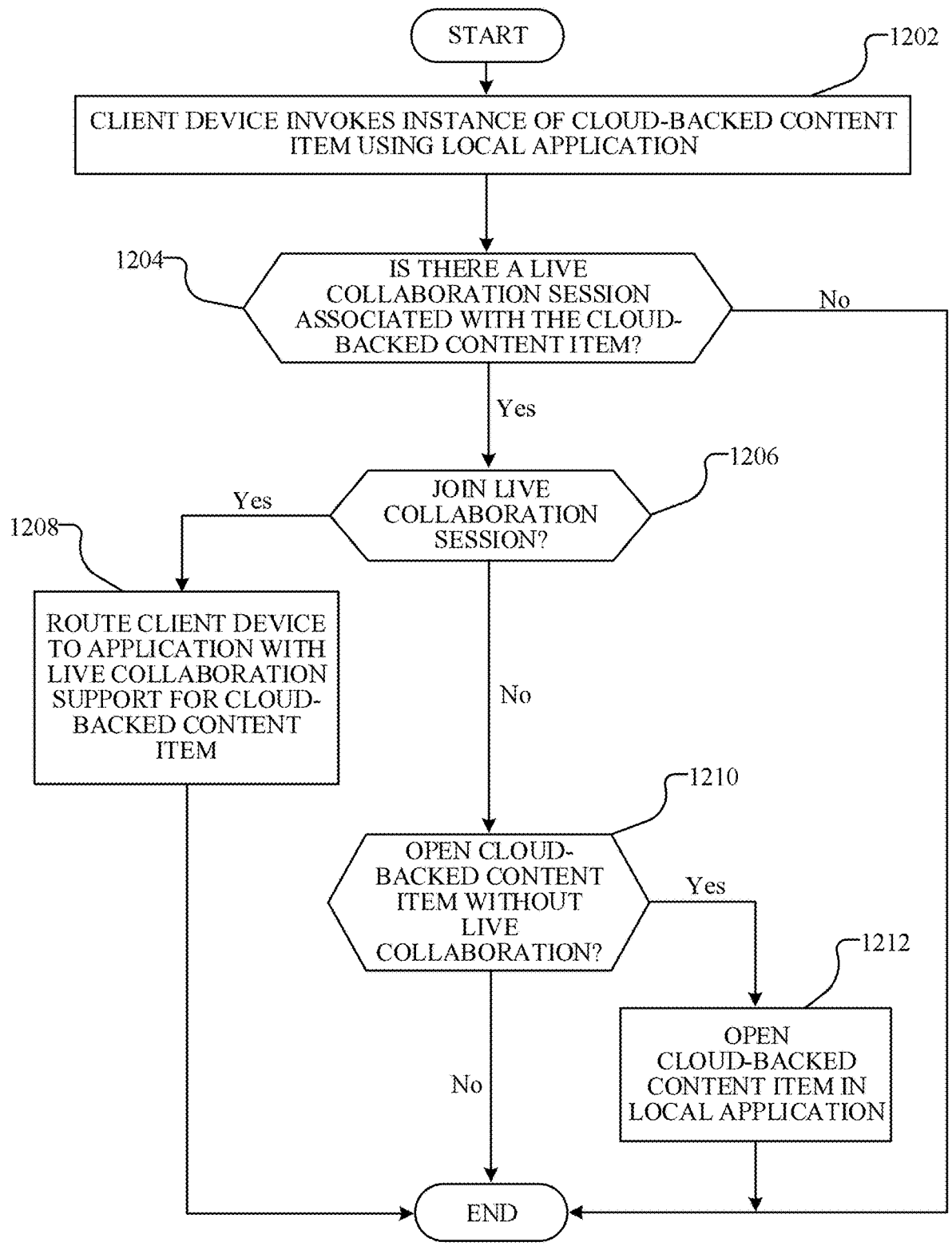
FIG. 12 shows an example flow for routing users to live collaboration sessions.

FIG. 12 shows an example flow for routing users working on cloud-backed content items to live collaboration sessions. In some cases, a user may want to open a cloud-backed content item (e.g., canonical content item 520, third-party cloud service content item 502, etc.) in an application that does not support collaboration functionalities, is not compatible with the collaboration functionality of the cloud-backed content item, or is not configured or activated to obtain additional cloud functionalities. However, if there is a live collaboration session between users interacting and working on the cloud-backed content item, by opening the cloud-backed content item in such application, the user will not be able to participate in the live collaboration session with such users or access the activity and services generated for the cloud-backed content item in the collaboration session. The user will thus have a limited experience and will lose the benefits of the collaborative experience otherwise available for the cloud-backed content item.

The example flow in FIG. 12 allows such a user to be given an option to access the cloud-backed content item using the application that does not support the collaboration functionalities and an option to be routed to another application or integration element (e.g., client application 152 or browser application 166 configured to employ cloud content integration element 702) that does support such collaboration functionalities and join the collaboration session.

Starting at step 1202, client device 150 invokes an instance of a cloud-backed content item (e.g., canonical content item 520, an instance of third-party cloud service content item 502, etc.) using a local application on client device 150. The local application can be any application or editor on client device 150. For example, the local application can be client application 152, browser application 166, a cloud-based application or editor (e.g., third-party cloud service application 604), a native application, or any other type of application or editor. In some examples, the local application can be an application that does not support collaboration functionalities, is not compatible with the collaboration functionalities of the cloud-backed content item, or is not configured or enabled to obtain such collaboration functionalities from a cloud service. In other examples, the local application can be a cloud-based application that is compatible with the cloud-backed content item.

At step 1204, the flow involves determining whether there is a live collaboration session associated with the cloud-backed content item. The live collaboration session can include users editing and/or interacting with the cloud-backed content item in a collaborative manner (e.g., in a manner which allows each user to see changes and activity generated by other users). If there are no live collaboration sessions associated with the cloud-backed content item or no other users (e.g., other than the user associated with client device 150) currently editing and/or interacting with the cloud-backed content item with whom client device 150 can establish a live collaboration session, the flow can end and the user may proceed as desired by opening and working on the cloud-backed content item using the local application or otherwise abandoning the process. On the other hand, if there is a live collaboration session associated with the cloud-backed content item, the flow can proceed to step 1206.

At step 1206, if there is a live collaboration session associated with the cloud-backed content item or if there are other users available (e.g., currently editing and/or interacting with the cloud-backed content item) to establish a live collaboration session with client device 150 can establish a live collaboration session, the user can be given an option to join (or establish) the live collaboration session. The user can be notified that a live collaboration session for the cloud-backed content item exists and provided with a prompt or option to join the live collaboration session. The prompt or option can include, for example and without limitation, an interface element, a message, or a link that the user can select to join the live collaboration session.

If the user chooses to join the live collaboration session, at step 1208 the client device 150 associated with the user can be routed to an application, editor, or interface with live collaboration support for the cloud-backed content item. The user can then join the live collaboration session using the application, editor or interface that the user was routed to. The application, editor or interface can obtain such live collaboration functionalities from a cloud service (e.g., 302, 304, 306, 170) as previously described.

For example, the client device 150 can be routed to client application 152 or browser application 166, which can implement cloud content integration element 702 to provide collaboration support for the cloud-backed content item as previously described, and allow the user to join the live collaboration session. As another example, the client device 150 can be routed to a cloud-based application or editor, such as third-party cloud service application 604, that supports collaboration for the cloud-backed content item and allows the user to join the live collaboration session.

In some cases, the application or editor a user is routed to at step 1208 can depend on one or more factors, such as user preferences, default application or editor settings, the user's current context or experience (e.g., the user's login status, the user's manner for receiving the content item such as through in-band sharing, etc.). For example, if the user at client device 150 accesses a .docx content item received through in-band sharing (e.g., shared and received through content management system 110) during a desktop or web experience, the user can be routed to a file viewer application (e.g., an application that presents data or content stored in a content item) if the user has view permissions for the .docx content item, or the user can be routed to an online or cloud-based editor for .docx content items (e.g., GOOGLE DOCS or MICROSOFT WORD ONLINE) if one is available at client device 150 and if the user has edit permissions for the .docx content item.

As another example, if the user accesses a .paper content item shared through in-band sharing during a desktop or web experience, the user can be routed to DROPBOX PAPER (Web version or desktop version if available), which supports .paper content items; and if the user accesses a .gdoc content item received through in-band sharing during a desktop or web experience, the user can be routed to GOOGLE DOCS which supports .gdoc content items.

In other examples, if the user at client device 150 accesses a .docx content item while logged out of an online or cloud-based editor for .docx content items, the user can be routed to a file viewer application on client device 150 for view-only access to the .docx content item and given an option to sign in to the online or cloud-based editor to obtain edit access to the .docx content item. If the user accesses a .paper file while logged out of DROPBOX PAPER, the user can be routed to DROPBOX PAPER (Web) with view-only access and given an option to sign into DROPBOX PAPER to obtain edit access to the .paper content item. If the user accesses a .gdoc while logged out of GOOGLE DOCS, the user can be routed to GOOGLE DOCS with view-only access and given an option to sign into GOOGLE DOCS for edit access to the .gdoc content item.

In some cases, the dynamic routing of the user to a specific application, editor, or interface with live collaboration support for the cloud-backed content item can be triggered not only when a live collaboration session associated with the cloud-backed content item exists, but also if such a live collaboration session can be established or initiated when client device 150 invokes the instance of the cloud-backed content item at step 1202. For example, if client device 150 invokes the cloud-backed content item and another user is already/currently editing and/or interacting with the cloud-backed content item from a different device, the invocation of the cloud-backed content item can create an opportunity to establish or initiate a new live collaboration session between the user associated with client device 150 and the other user editing and/or interacting with the cloud-backed content item. This opportunity to establish or initiate a new live collaboration session can trigger the dynamic routing described at steps 1206 and 1208. Thus, the user can be given an option to join a new live collaboration session with the other user and can be routed to a specific application, editor or interface with live collaboration support if the user chooses to join the new collaboration session.

Moreover, the dynamic routing of the user to a specific application, editor, or interface with live collaboration support for the cloud-backed content item at step 1208 can be triggered when client device 150 invokes an instance of the cloud-backed content item from any local application at client device 150. In some examples, the dynamic routing can be triggered when client device 150 invokes the instance of the cloud-backed content item using a local application that does not support collaboration functionalities, is not compatible with the collaboration functionalities of the cloud-backed content item, or is not configured or enabled to obtain such collaboration functionalities from a cloud service.

In other examples, the local application can be a cloud-based application that is compatible with the cloud-backed content item. In other examples, the dynamic routing can be triggered when client device 150 invokes the instance of the cloud-backed content item using a local application that is different from an application being used by another user to edit and/or interact with the cloud-backed content item on another device. Here, the user can be routed to (and/or given the option to be routed to) a different application even if the local application is compatible with the cloud-backed content item and/or supports collaboration functionalities.

If at step 1206 the user chooses not to join the live collaboration session, the user can be presented with an option to proceed without live collaboration functionalities. In such cases, at step 1210, the user is provided an option to open the cloud-backed content item from the local application without live collaboration functionalities. If the user at step 1210 chooses to open the cloud-backed content item without live collaboration functionalities, at step 1212 the client device 150 can proceed to open the cloud-backed content item in the local application without live collaboration functionalities. If the user at step 1210 instead chooses not to proceed opening the cloud-backed content item without live collaboration functionalities, the flow ends and the user can optionally return to step 1202 at any point.

Having disclosed example system components and concepts, the disclosure now turns to example methods 1300, 1320, 1340 and 1360 for integrating cloud content items with a content management system (110), as shown in FIGS. 13A through 13D. The steps outlined herein are non-limiting examples provided for illustration purposes, and can be implemented in any combination thereof, including combinations that exclude, add, or modify certain steps.

At step 1302, method 1300 can include receiving a request to access a smart pointer (e.g., 504) stored at a content management system (e.g., 110). The smart pointer can include a representation of a content item (e.g., third-party cloud service content item 502) stored at a cloud service (e.g., 302, 304, 306, 170), such as a cloud-backed content item or a cloud-based content item. The content and features of the content item can be accessed through an online application (e.g., third-party cloud service application 604) associated with the cloud service. The online application can include, for example, an online or web application or editor from the cloud service. Moreover, the online application can have native support for the content item, including the content and features of the content item. In some cases, the content and features of the content item may only be accessible or supported through the online application or through a different application using the approaches described herein.

The smart pointer can be stored at a user account (e.g., 704) registered at the content management system (110). The user account can include the smart pointer as well as other content items such as canonical content items, basic pointers, traditional content items, folders, images, videos, documents, audio content items, files, collections, and/or any other type of digital data. In some aspects, the content items on the user account can be stored on the content management system (110) as well as one or more client devices (e.g., 150). Moreover, one or more of the content items (and/or associated changes) in the user account can be synchronized between the content management system (110) and the one or more client devices (e.g., 150) in order to maintain a consistent copy of the content items across the content management system (110) and the one or more client devices (e.g., 150).

In some cases, the smart pointer (504) can be stored without the actual content of the content item. Instead, the content can be retrieved from the cloud service when the smart pointer is invoked or opened as described herein. However, in some cases, the smart pointer (504) may include at least some of the actual content of the content item or may be stored with the actual content.

Moreover, in some cases, the smart pointer (504) can be stored along with other content items on a user account at the content management system and according to a filesystem storage scheme or other organization scheme for storing the smart pointer and any other content items on the user account. For example, the smart pointer can be stored with other content items in a hierarchical file system or storage scheme, and visually depicted in storage as a content item such as a file or document. Thus, the content management system (110) can provide access control and organization for the smart pointer as well as any other content items on the user account.

At step 1304, method 1300 can include, in response to the smart pointer (504) being invoked, sending, from a cloud content integration element (e.g., 602) on a local application (e.g., client application 152 or browser application 166) to the cloud service (e.g., 302, 304, 306, or 170), a request (e.g., 710, 728, 802) for the content of the content item (e.g., 502) associated with the smart pointer (504). In some examples, the request for the content can include a unique ID associated with the smart pointer, the content and/or the content item; authentication information; a title of the content item; access control permissions configured at the content management system (110) for the smart pointer, the content, and/or the content item; etc. The access control permissions can correspond to a user account (e.g., 704) that is associated with the request for the content and registered at the content management system (110).

In some aspects, the local application may not provide native support for the content item, the content in the content item, and/or features or functionalities associated with the content item. Instead, the local application may implement the cloud content integration element (e.g., 602) to provide support for the content item, the content in the content item, and/or features or functionalities associated with the content item. The features or functionalities can include one or more features or functionalities provided by the cloud service and accessible through the online application (e.g., 604) associated with the cloud service. Non-limiting examples of features or functionalities associated with the content item can include commenting, notifications, bi-directional communications or interactions between users working on the content item, live editing or collaboration sessions, tasks, editing, sharing, activity feeds, content or metadata updates, etc.

At step 1306, method 1300 can include receiving, at the cloud content integration element (e.g., 602) on the local application (e.g., 152 or 166) and from the cloud service (e.g., 302, 304, 306, or 170), the content of the content item (e.g., 502) associated with the smart pointer. In some cases, the cloud content integration element (e.g., 602) can also receive other content or data associated with the content item, such as indexable content, a content or document preview, metadata (e.g., comments, tasks, state, events, updates, user activity information, status information, etc.), and/or any other data or information associated with the content item.

At step 1308, method 1300 can include, in response to receiving the content of the content item (e.g., 502), presenting, on the local application (e.g., 152 or 166), the content of the content item as part of a rendered instance (e.g., 602) of the smart pointer (504). The content can be presented within the rendered instance of the smart pointer so as to mirror or resemble the content item on the cloud service when rendered or displayed for a user. In some examples, the rendered instance of the smart pointer can be presented along with the content without translating the content prior to presentation of the content. In other words, the local application can have the capability to render the content without first having to modify the configuration and/or format of the content to a different configuration and/or format supported by the local application. Thus, the local application may support the configuration and/or format of the content. In other examples, the local application may instead modify the configuration and/or format of the content prior to rendering, in order to prepare or enable the content for rendering by the local application.

Moreover, the cloud content integration element (e.g., 602) on the local application and/or the content management system (110) can allow data (e.g., content, metadata, events, etc.) added or modified on the content item in the cloud service to be implemented on the smart pointer (504) and vice versa. For example, if a user renames the content item on the cloud service, the cloud service can provide the change to the content item associated with the smart pointer (504) by sending an update to the cloud content integration element (e.g., 602) and/or the content management system (110). When the cloud content integration element (e.g., 602) and/or the content management system (110) receives the update from the cloud service, the cloud content integration element (e.g., 602) and/or the content management system (110) can rename the smart pointer (504) accordingly to match the renaming of the content item.

The cloud content integration element (e.g., 602) and/or the content management system (110) can also enable collaborative functionalities and live editing or collaboration sessions between users working on the smart pointer (504) and the content item on the cloud service. For example, the cloud content integration element (e.g., 602) and/or the content management system (110) can communicate with the cloud service to exchange information and communications, thereby providing support for bi-directional or two-way communications between the smart pointer (504) and the content item on the cloud service.

To illustrate, comments or messages created from, or added to, the content item on the cloud service can be propagated to the smart pointer (e.g., via the cloud content integration element and/or the content management system) so a user working on the smart pointer (504) can view or interact with the comments or messages created from, or added to, the content item and received from the cloud service, and vice versa. A user working on the smart pointer (504) can receive or view the comments or messages from the rendered instance of the smart pointer and reply to the comments or messages from the smart pointer. Any replies added by the user from the smart pointer can be similarly propagated to the content item on the cloud service so any users working on the content item can receive and view such replies. Such collaborations and interactions between users can be exchanged and implemented between the smart pointer and the content item hosted by the cloud service to provide an integrated, collaborative experience across all platforms (e.g., the content management system, the local application, the cloud service, etc.).

In some aspects, the local application can perform filesystem operations (e.g., 1002) and/or other file or content operations on the canonical content item, such as copy operations, move operations, create operations, delete operations, purge operations, restore operations, rename operations, version history operations, sharing operations, etc. The local application can propagate any changes resulting from such operations to the content item on the cloud service. For example, the local application can implement the cloud content integration element (e.g., 602) to send updates (e.g., 716, 740, 1006) to the cloud service with the changes from the operations, which the cloud service can use to update the content item on the cloud service. The changes can include, for example, changes to the content item, changes to metadata of the content item, changes to the content of the content item, changes to the smart pointer, etc.

In some cases, method 1300 can include receiving, at the cloud content integration element (e.g., 602) on the local application and from the cloud service, metadata identifying a comment added to the content item (e.g., 502) stored on the cloud service, and presenting, on the local application, the comment with the rendered instance of the smart pointer. The comment can be a comment added by a remote user working on the content item from the cloud service or a remote user working on a rendered instance of another copy of the smart pointer. Moreover, the comment can be presented within the rendered instance of the smart pointer, within a separate user interface or application, or within a message or notification to the user of the local application. Thus, a user viewing or working on the rendered instance of the smart pointer can receive or view comments added to the content item by other users and thereby obtain a collaborative experience when accessing or working on the rendered instance of the smart pointer.

In some cases, the local application can receive one or more comments added to the rendered instance of the smart pointer from the local application and propagate the one or more comments to the cloud service for inclusion or implementation in the content item on the cloud service. For example, when the local application receives a comment added by a user working with the rendered instance of the smart pointer at the local application, it can use the cloud content integration element (e.g., 602) to send an update message (e.g., 716, 740) to the cloud service. The update message can identify the comment added by the user to the rendered instance of the smart pointer. The cloud service can receive the update message and apply or add the comment from the update message to the content item on the cloud service. This way, comments added to the content item on the cloud service and comments added to the rendered instance of the smart pointer can be exchanged between the local application and the cloud service to provide a collaborative experience and maintain consistency between the content item on the cloud service and the smart pointer.

In some cases, the cloud content integration element (e.g., 602) on the local application can receive, from the cloud service, data associated with the content item, such as metadata (e.g., comments, activity, events, tasks, content item information, update information, etc.) associated with the content item, one or more previews (e.g., a content item preview such as a text or image preview), indexable content (e.g., text, image, and/or other digital content that can be indexed for searching) corresponding to the content item, etc. The data from the cloud service can be presented by the local application as part of the rendered instance of the smart pointer, displayed on a separate interface, presented on a message or notification, depicted in storage (e.g., as a file or document in storage), etc.

Moreover, in some cases, the data or portions of the data can be indexed for searching. For example, the local application can receive a search request from a user which includes a query for a portion of the data and, in response to the search request, the local application can search any indexed data on the user account (e.g., 704) for the portion of the data associated with the search request. The local application can then present a search result to the user including any matches or, if no matches are found, an indication that no matches were found.

In some cases, the data associated with the content item can include a preview of the content item and/or an indication of user activity associated with the content item. The user activity can include any interactions between a user(s) and the content item, any events generated by a user(s) working on the content item, etc. The preview can include, for example, a preview (e.g., an image preview, a text preview, a file preview, etc.) of the content item or one or more portions of content in the content item.

The local application can present the preview and/or the user activity to a user having access to the smart pointer or viewing/working on the rendered instance of the smart pointer. For example, the local application can display an activity feed or activity notification identifying the user activity. In some examples, the preview can be stored in the user account (e.g., 704) and depicted as a content item in storage. The user can view the preview from storage without having to access the content item or obtain a rendered instance of the smart pointer. Moreover, the preview can be used by the user's device (e.g., 150) or the content management system (110) to search for content associated with the content item.

In some cases, method 1300 can include receiving a request to open a copy of a specific content item (e.g., a specific cloud-backed content item, a specific cloud-based content item, etc.) using a specific application that is different from an online application or editor that is associated with the specific content item and provides native support for the specific content item and its associated content and features/functionalities. Method 1300 can further include identifying a live collaboration session between users interacting with the specific content item (e.g., via respective client devices) and determining that the specific application does not support live collaboration for the copy of the specific content item. Method 1300 can also include providing a prompt to the requesting user or device with an option to join the live collaboration session via a different application that supports live collaboration for the specific content item, and in response to receiving an acceptance of the option to join the live collaboration session, routing the requesting user or device to the different application and/or joining the requesting user or device to the live collaboration session via the different application.

In some cases, method 1300 can also include generating a plurality of sharing links to the smart pointer (504). The sharing links can be configured with various access rights, and the sharing links can be used to share the smart pointer with users and provide such users a specific level of access to the smart pointer. For example, the plurality of sharing links can include a view link (e.g., 1102) configured with read-only access rights to the smart pointer (504), an edit link (e.g., 1104) configured with edit access rights to the smart pointer (504), and/or a reference link (e.g., 1106) that uniquely identifies the smart pointer (504) and confers no access rights to the smart pointer (504). Method 1300 can involve providing the sharing links to a plurality of client devices or users in order to share the smart pointer (504) with such client devices or users.

If a security threat associated with a shared link is detected, such as unauthorized access to a link, method 1300 can include retroactively revoking the associated access rights from the shared link (and/or any copies of the shared link) and/or downgrading the shared link to a reference link (e.g., 1106) in order to prevent unauthorized access to the smart pointer (and/or its associated content) and mitigate the security threat. The reference link (e.g., 1106) can be used by any users or devices that have rightful access to the shared link or are authorized to use the shared link, which have since lost any access conferred by the shared link as a result of the revocation of associated access rights and/or the downgrading of the shared link to a reference link, to request and regain access to the smart pointer. For example, the user can send an access request including the reference link to the content management system (110), which can then provide the user with another link having the requested access rights or convert the reference link to a link configured with the requested access rights, such as a view link (e.g., 1102) or an edit link (e.g., 1104).

Figure 13A:
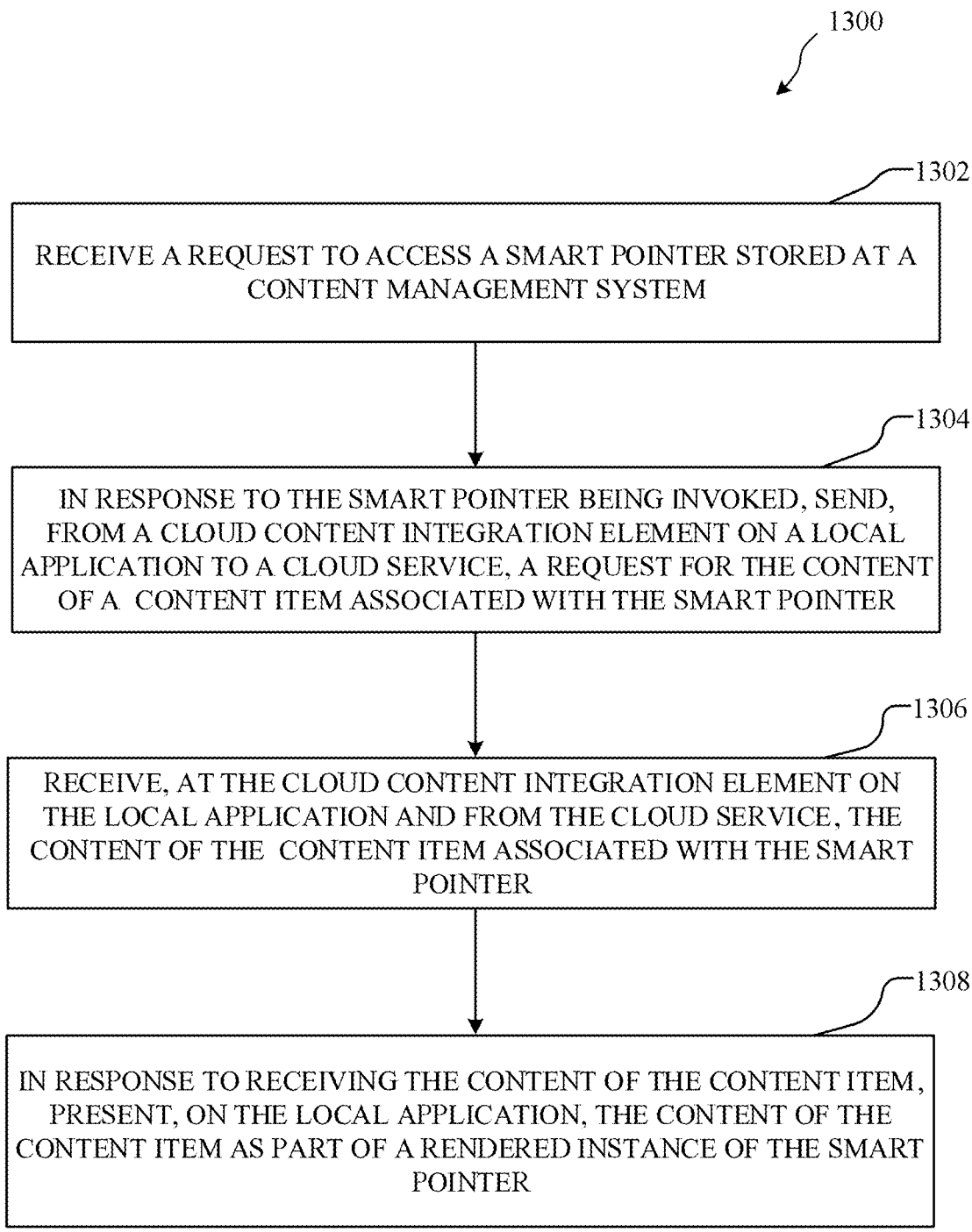
FIG. 13A shows an example method for implementing smart pointers on a content management system.
Figure 13B:
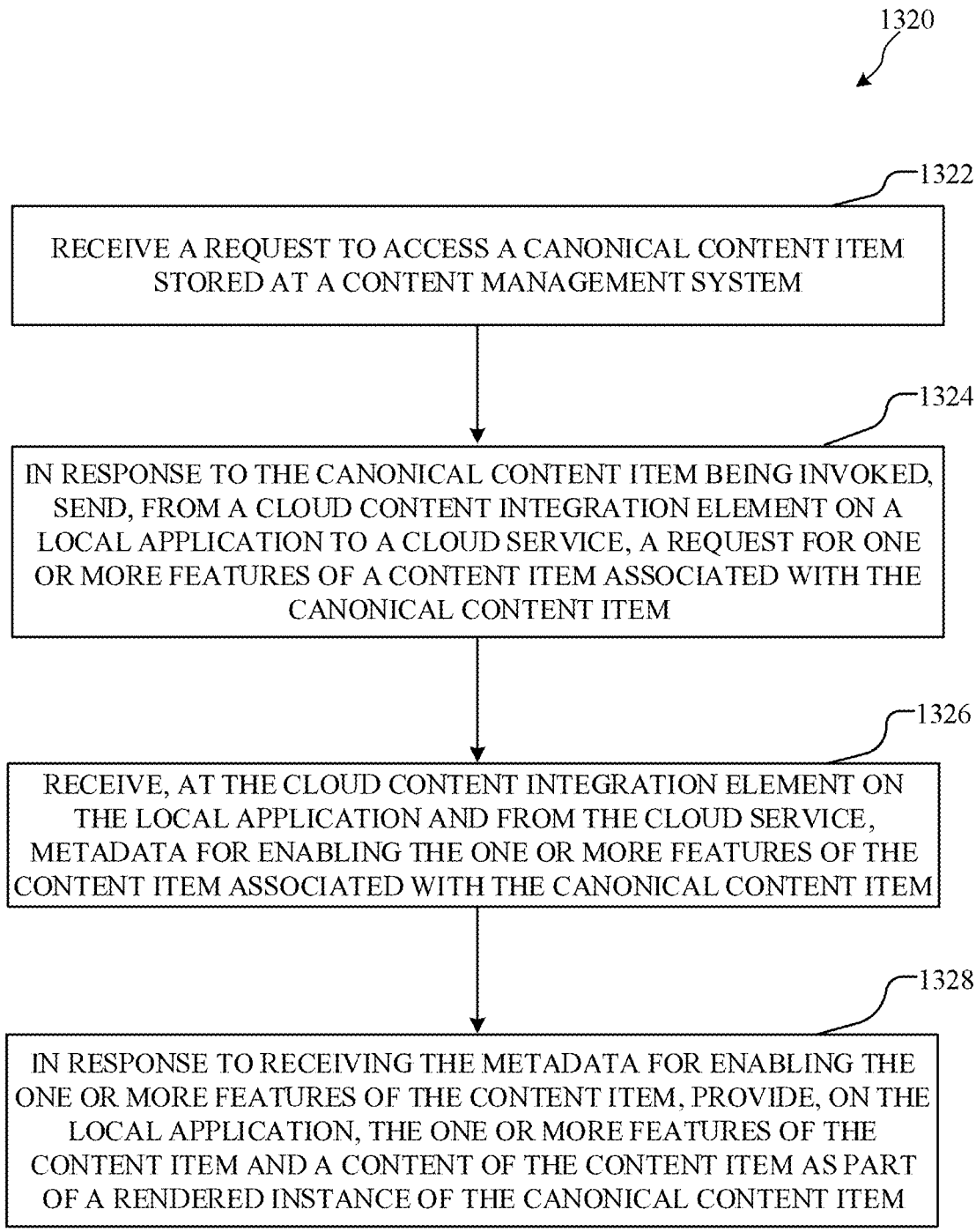
FIG. 13B shows an example method for implementing canonical content items on a content management system.

Turning now to method 1320 shown in FIG. 13B, at step 1322, method 1320 can include receiving a request to access a canonical content item (e.g., 520) stored at a content management system (e.g., 110). The canonical content item can include a representation of a content item (e.g., a representation, copy or version of third-party cloud service content item 502) stored at a cloud service (e.g., 302, 304, 306, 170). The representation of the content item and the content item in method 1320 can be or represent a cloud-backed content item or a cloud-based content item.

The content and features of the content item can be accessed through an online application (e.g., third-party cloud service application 604) associated with the cloud service. The online application can have native support for the content item, including the content and features of the content item. In some cases, the content and features of the content item may only be accessible or supported through the online application or through a different application using the approaches described herein.

In some cases, the canonical content item stored on the content management system can include some or all of the content of the content item (and the canonical content item). Moreover, in some cases, the content and some of the features or functionality of the canonical content item can be accessed or supported by one or more local applications on one or more client devices (e.g., 150), while additional features or functionalities may only be accessible through the cloud service, the online application associated with the cloud service, and/or through the one or more local applications using the approaches described herein The canonical content item can be stored at a user account (e.g., 704) registered at the content management system (110). The user account can include the canonical content item as well as other content items such as smart pointers, basic pointers, traditional content items, folders, images, videos, documents, audio content items, files, collections, and/or any other type of digital data. In some aspects, the content items on the user account can be stored on the content management system (110) as well as one or more client devices (e.g., 150). Moreover, one or more of the content items (and/or associated changes) on the user account can be synchronized between the content management system (110) and the one or more client devices (e.g., 150) in order to maintain a consistent copy of the content items across the content management system (110) and the one or more client devices (e.g., 150).

In some cases, the canonical content item (520) can be stored along with other content items on a user account at the content management system and according to a filesystem storage scheme or other organization scheme for storing the canonical content item and any other content items on the user account. For example, the canonical content item can be stored with other content items in a hierarchical file system or storage scheme, and visually depicted in storage as a content item such as a file or document. Thus, the content management system (110) can provide access control and organization for the canonical content item as well as any other content items on the user account.

At step 1324, method 1320 can include, in response to the canonical content item (520) being invoked, sending, from a cloud content integration element (e.g., 602) on a local application (e.g., client application 152 or browser application 166) to the cloud service (e.g., 302, 304, 306, or 170), a request (e.g., 756, 778, 802) for one or more features of the content item (e.g., 502) associated with the canonical content item (520). In some examples, the request for the one or more features can include a unique ID associated with the canonical content item and/or the content item; authentication information; a title of the content item and/or the canonical content item; access control permissions configured at the content management system (110) for the canonical content item, the content, and/or the content item; etc. The access control permissions can correspond to a user account (e.g., 704) that is associated with the request for the content and registered at the content management system (110).

In some aspects, the local application may not provide native support for the content item, the content in the content item, and/or features or functionalities associated with the content item. Instead, the local application may implement the cloud content integration element (e.g., 602) to provide support for the content item and the canonical content item, the content in the content item and the canonical content item, and/or features or functionalities associated with the content item and the canonical content item. The features or functionalities can include one or more features or functionalities provided by the cloud service and accessible through the online application (e.g., 604) associated with the cloud service. Non-limiting examples of features or functionalities associated with the content item can include commenting, notifications, bi-directional communications or interactions between users working on the content item, live editing or collaboration sessions, tasks, editing, sharing, activity feeds, content or metadata updates, etc.

At step 1326, method 1320 can include receiving, at the cloud content integration element (e.g., 602) on the local application (e.g., 152 or 166) and from the cloud service (e.g., 302, 304, 306, or 170), metadata for enabling the one or more features of the content item (e.g., 502) associated with the canonical content item. In some cases, the cloud content integration element (e.g., 602) can also receive other content or data associated with the content item, such as indexable content, a content or document preview, and/or any other data or information associated with the content item. Moreover, in some examples, the metadata can include one or more comments, one or more tasks, state, one or more events, one or more updates, user activity information, status information, authoring data, other collaboration information, etc.

At step 1328, method 1320 can include, in response to receiving the metadata for enabling the one or more features of the content item (e.g., 502), providing, on the local application (e.g., 152 or 166), the one or more features of the content item and a content of the content item as part of a rendered instance (e.g., 610) of the canonical content item (520). The content can be presented within the rendered instance of the canonical content item so as to mirror or resemble the content item on the cloud service when rendered or displayed for a user. In some examples, the rendered instance of the canonical content item can be presented along with the content without translating the content prior to presentation of the content.

Moreover, the content can be presented along with the one or more features associated with the content item. The one or more features can include one or more collaboration features such as, for example and without limitation, live commenting, live editing, bi-directional communications between users working on the content item and the canonical content item, user activity feeds or notifications, authoring information, sharing features, collaboration sessions, content and/or metadata updates, tasks, etc.

The cloud content integration element (e.g., 602) on the local application and/or the content management system (110) can allow data (e.g., content, metadata, events, etc.) added or modified on the content item in the cloud service to be implemented on the canonical content item (520), and vice versa. For example, if a user renames the content item on the cloud service, the cloud service can provide the change to the content item associated with the canonical content item (520) by sending an update to the cloud content integration element (e.g., 602) and/or the content management system (110). When the cloud content integration element (e.g., 602) and/or the content management system (110) receives the update from the cloud service, the cloud content integration element (e.g., 602) and/or the content management system (110) can rename the canonical content item (520) accordingly to match the renaming of the content item.

The cloud content integration element (e.g., 602) and/or the content management system (110) can also enable collaborative functionalities and live editing or collaboration sessions between users working on the canonical content item (520) and the content item on the cloud service. For example, the cloud content integration element (e.g., 602) and/or the content management system (110) can communicate with the cloud service to exchange information and communications, thereby providing support for bi-directional or two-way communications between the canonical content item (520) and the content item on the cloud service.

To illustrate, comments or messages created from, or added to, the content item on the cloud service can be propagated to the canonical content item (e.g., via the cloud content integration element and/or the content management system) so a user working on the canonical content item (520) can view or interact with the comments or messages created from, or added to, the content item and received from the cloud service, and vice versa. A user working on the canonical content item (520) can receive or view the comments or messages from the rendered instance of the canonical content item and reply to the comments or messages from the canonical content item. Any replies added by the user from the canonical content item can be similarly propagated to the content item on the cloud service so any users working on the content item can receive and view such replies. Such collaborations and interactions between users can be exchanged and implemented between the canonical content item and the content item hosted by the cloud service to provide an integrated, collaborative experience across all platforms (e.g., the content management system, the local application, the cloud service, etc.).

In some aspects, the local application can perform filesystem operations (e.g., 1002) and/or other file or content operations on the canonical content item, such as copy operations, move operations, create operations, delete operations, purge operations, restore operations, rename operations, version history operations, sharing operations, etc. The local application can propagate any changes resulting from such operations to the content item on the cloud service. For example, the local application can implement the cloud content integration element (e.g., 602) to send updates (e.g., 762, 790, 1006) to the cloud service with the changes from the operations, which the cloud service can use to update the content item on the cloud service. The changes can include, for example, changes to the content item, changes to metadata of the content item, changes to the content of the content item, changes to the canonical content item, etc.

In some cases, method 1320 can include receiving, at the cloud content integration element (e.g., 602) on the local application and from the cloud service, metadata identifying a comment added to the content item (e.g., 502) stored on the cloud service, and presenting, on the local application, the comment with the rendered instance of the canonical content item. The comment can be a comment added by a remote user working on the content item from the cloud service or a remote user working on a rendered instance of another copy of the canonical content item. Moreover, the comment can be presented within the rendered instance of the canonical content item, within a separate user interface or application, or within a message or notification to the user of the local application. Thus, a user viewing or working on the rendered instance of the canonical content item can receive or view comments added to the content item by other users and thereby obtain a collaborative experience when accessing or working on the rendered instance of the canonical content item.

In some cases, the local application can receive one or more comments added to the rendered instance of the canonical content item from the local application and propagate the one or more comments to the cloud service for inclusion or implementation in the content item on the cloud service. For example, when the local application receives a comment added by a user working with the rendered instance of the canonical content item at the local application, it can use the cloud content integration element (e.g., 602) to send an update message (e.g., 762, 790) to the cloud service. The update message can identify the comment added by the user to the rendered instance of the canonical content item. The cloud service can receive the update message and apply or add the comment from the update message to the content item on the cloud service. This way, comments added to the content item on the cloud service and comments added to the rendered instance of the canonical content item can be exchanged between the local application and the cloud service to provide a collaborative experience and maintain consistency between the content item on the cloud service and the canonical content item.

In some cases, the cloud content integration element (e.g., 602) on the local application can receive, from the cloud service, data associated with the content item, such as metadata (e.g., comments, activity, events, tasks, content item information, update information, etc.) associated with the content item, one or more previews (e.g., a content item preview such as a text or image preview), indexable content (e.g., text, image, and/or other digital content that can be indexed for searching) corresponding to the content item, etc. The data from the cloud service can be presented by the local application as part of the rendered instance of the canonical content item, displayed on a separate interface, presented on a message or notification, depicted in storage (e.g., as a file or document in storage), etc.

Moreover, in some cases, the data or portions of the data can be indexed for searching. For example, the local application can receive a search request from a user which includes a query for a portion of the data and, in response to the search request, the local application can search any indexed data on the user account (e.g., 704) for the portion of the data associated with the search request. The local application can then present a search result to the user including any matches or, if no matches are found, an indication that no matches were found.

In some cases, the data associated with the content item can include a preview of the content item (or the canonical content item) and/or an indication of user activity associated with the content item and the canonical content item. The user activity can include any interactions between a user(s) and the content item, any events generated by a user(s) working on the content item, etc. The preview can include, for example, a preview (e.g., an image preview, a text preview, a file preview, etc.) of the content item and/or the canonical content item, a preview of one or more portions of content in the content item and/or the canonical content item, etc.

The local application can present the preview and/or the user activity to a user having access to the canonical content item or viewing/working on the rendered instance of the canonical content item. For example, the local application can display an activity feed or activity notification identifying the user activity. In some examples, the preview can be stored in the user account (e.g., 704) and depicted as a content item in storage. The user can view the preview from storage without accessing the content item or obtaining a rendered instance of the canonical content item. Moreover, the preview can be used by the user's device (e.g., 150) or the content management system (110) to search for content associated with the content item and/or the canonical content item.

In some cases, method 1320 can include receiving a request to open a copy of a specific canonical content item (e.g., a copy of a canonical content item representing a specific cloud-backed or cloud-based content item) using a specific application that is different from an online application or editor that is associated with the specific canonical content item and provides native support for the specific canonical content item and its associated content and features/functionalities. Method 1320 can further include identifying a live collaboration session between users interacting with the specific canonical content item and/or an associated third-party content item (e.g., 502) and determining that the specific application does not support live collaboration for the copy of the specific canonical content item. Method 1320 can also include providing a prompt to the requesting user or device with an option to join the live collaboration session via a different application that supports live collaboration for the specific content item, and in response to receiving an acceptance of the option to join the live collaboration session, routing the requesting user or device to the different application and/or joining the requesting user or device to the live collaboration session via the different application.

In some cases, method 1320 can also include generating a plurality of sharing links to the canonical content item (520). The sharing links can be configured with various access rights, and the sharing links can be used to share the canonical content item with users and provide such users a specific level of access to the canonical content item. For example, the plurality of sharing links can include a view link (e.g., 1102) configured with read-only access rights to the canonical content item (520), an edit link (e.g., 1104) configured with edit access rights to the canonical content item (520), and/or a reference link (e.g., 1106) that uniquely identifies the canonical content item (520) and confers no access rights to the canonical content item (520). The method 1320 can involve providing the sharing links to a plurality of client devices or users in order to share the canonical content item (520) with such client devices or users.

If a security threat associated with a shared link is detected, such as unauthorized access to a link, method 1320 can include retroactively revoking the associated access rights from the shared link (and/or any copies of the shared link) and/or downgrading the shared link to a reference link (e.g., 1106) in order to prevent unauthorized access to the canonical content item (and/or its associated content) and mitigate the security threat. The reference link (e.g., 1106) can be used by any users or devices that have rightful access to the shared link or are authorized to use the shared link, which have since lost any access conferred by the shared link as a result of the revocation of associated access rights and/or the downgrading of the shared link to a reference link, to request and regain access to the canonical content item. For example, the user can send an access request including the reference link to the content management system (110), which can then provide the user with another link having the requested access rights or convert the reference link to a link configured with the requested access rights, such as a view link (e.g., 1102) or an edit link (e.g., 1104).

Figure 13C:
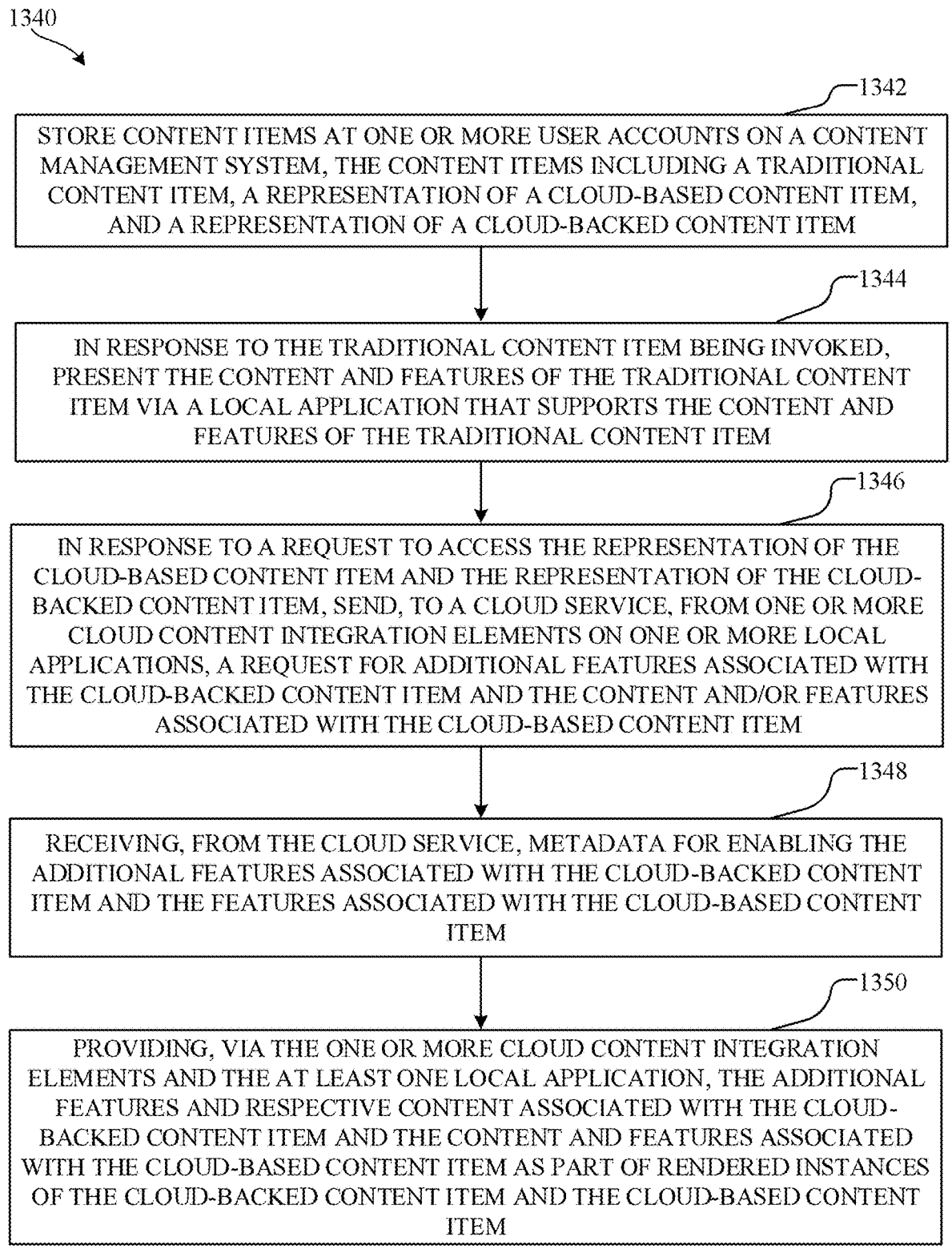
FIG. 13C shows an example method for implementing cloud-based content items, cloud-backed content items, and smart pointers on a content management system.

With reference to method 1340 shown in FIG. 13C, at step 1342, method 1340 can include storing content items at one or more user accounts (e.g., 704) on a content management system (110). In some cases, the content items can be stored along with other content items on the one or more user accounts at the content management system and according to a filesystem storage scheme or other organization scheme for storing the content items and any other content items on the one or more user accounts. For example, the content items can be stored with other content items in a hierarchical file system or storage scheme, and visually depicted in storage. Thus, the content management system (110) can provide access control and organization for the content items as well as any other content items on the one or more user accounts.

The content items can include one or more traditional content items, one or more representations of one or more cloud-based content items, one or more representations of one or more cloud-backed content items, one or more smart pointers, one or more canonical content items, one or more basic pointers, etc. In example method 1340, the content items include a traditional content item, a representation of a cloud-based content item, and a representation of a cloud-backed content item. The representation of the cloud-based content item and the representation of the cloud-backed content item can include a smart pointer (e.g., 504) and/or a canonical content item (e.g., 520).

The traditional content item can be supported by one or more local applications without use or involvement of a cloud service (e.g., 302, 304, 306, 170). The content and features of the cloud-based content item can be enabled by the cloud service and designed for access through an online application associated with the cloud service. The cloud-backed content item can have some content and features supported by one or more local applications without use or involvement of the cloud service or the online application associated with the cloud service, as well as additional features designed for access through the cloud service and the online application associated with the cloud service.

At step 1344, method 1340 can include, in response to the traditional content item being invoked (e.g., by a client device or application), presenting the content and features of the traditional content item via one of the one or more local applications (e.g., 152, 166) that support the content and features of the traditional content item.

At step 1346, method 1340 can include, in response to a request to access the representation of the cloud-based content item and the representation of the cloud-backed content item, sending, to the cloud service, from one or more cloud content integration elements (e.g., 602) on at least one local application (e.g., 152, 166) from the one or more local applications, a request for the additional features associated with the cloud-backed content item and the content and/or features associated with the cloud-based content item. In some cases, the request for the additional features associated with the cloud-backed content item and the content and/or features associated with the cloud-based content item can include authentication information associated with the content management system, unique identifiers associated with the cloud-backed content item and the cloud-based content item, access permissions configured at the content management system for the cloud-backed content item and the cloud-based content item, and/or any other information.

In some cases, the request can also request some or all of the content associated with the cloud-backed content item. Moreover, the requested features associated with the cloud-based content item and the cloud-backed content item can include collaboration and other features such as, for example and without limitation, live commenting, live editing, live communications between users working on such content items, authoring, tasks, state information, activity feeds or notifications, previewing features, indexing features, content and/or metadata updates, collaboration sessions, sharing features, etc.

At step 1348, method 1340 can include receiving, from the cloud service, metadata for enabling the additional features associated with the cloud-backed content item and the features associated with the cloud-based content item. In some cases, method 1340 can also include receiving some or all of the content associated with the cloud-backed and/or cloud-based content item. The metadata can include, for example, one or more comments, one or more tasks, one or more edits, one or more content operations, one or more previews, one or more notifications, one or more events, user activity information, sharing information, indexing data, state data, one or more messages or communications, one or more content or metadata updates or changes, content item information, etc.

Based on the metadata, at step 1350, method 1340 can include providing, via the one or more cloud content integration elements and the at least one local application, the additional features and respective content associated with the cloud-backed content item and the content and features associated with the cloud-based content item as part of rendered instances of the cloud-backed content item and the cloud-based content item.

In some cases, method 1340 can include presenting, at the one or more user accounts on the content management system, the content items including the traditional content item, the representation of the cloud-based content item, and the representation of the cloud-backed content item. The content items can be presented according to an organization associated with the one or more user accounts and/or an access control associated with the one or more user accounts.

In some examples, a cloud content integration element (e.g., 602) on a local application and/or the content management system (110) can allow data (e.g., content, metadata, events, etc.) added or modified on a copy of the cloud-based and/or cloud-backed content item in the cloud service to be implemented on the cloud-based and/or cloud-backed content item on the content management system, and vice versa. For example, if a user renames a cloud-based or cloud-backed content item on the cloud service, the cloud service can provide the change to the content item by sending an update to the cloud content integration element (e.g., 602) and/or the content management system (110). When the cloud content integration element (e.g., 602) and/or the content management system (110) receives the update from the cloud service, the cloud content integration element (e.g., 602) and/or the content management system (110) can rename the cloud-based or cloud-backed content item accordingly to match the renaming of the content item.

The cloud content integration element (e.g., 602) and/or the content management system (110) can also enable collaborative functionalities and live editing or collaboration sessions between users working on the cloud-based and/or cloud-backed content items on the cloud service and the content management system. For example, the cloud content integration element (e.g., 602) and/or the content management system (110) can communicate with the cloud service to exchange information and communications, thereby providing support for bi-directional or two-way communications between the cloud-based and/or cloud-backed content items on the cloud service and the content management system.

To illustrate, comments or messages created from, or added to, the cloud-based and/or cloud-backed content items on the cloud service can be propagated to the cloud-based and/or cloud-backed content items on the content management system (e.g., via the cloud content integration element and/or the content management system) so a user working on the cloud-based and/or cloud-backed content items on the content management system can view or interact with the comments or messages created from, or added to, the cloud-based and/or cloud-backed content items and received from the cloud service, and vice versa. A user working on the cloud-based and/or cloud-backed content items can receive or view the comments or messages from the rendered instance of the cloud-based and/or cloud-backed content items and reply to the comments or messages from the cloud-based and/or cloud-backed content items on the cloud service or the content management system. Any replies added by the user from the cloud-based and/or cloud-backed content items on the content management system can be similarly propagated to the cloud-based and/or cloud-backed content items on the cloud service so any users working on the content item can receive and view such replies. Such collaborations and interactions between users can be exchanged and implemented between the cloud-based and/or cloud-backed content items on the content management system and the cloud service to provide an integrated, collaborative experience across all platforms (e.g., the content management system, the local application, the cloud service, etc.).

In some aspects, a local application can perform filesystem operations (e.g., 1002) and/or other file or content operations on the cloud-based and/or cloud-backed content items, such as copy operations, move operations, create operations, delete operations, purge operations, restore operations, rename operations, version history operations, sharing operations, etc. The local application can propagate any changes resulting from such operations to the cloud-based and/or cloud-backed content items on the cloud service. For example, the local application can implement the cloud content integration element (e.g., 602) to send updates (e.g., 762, 790, 1006) to the cloud service with the changes from the operations, which the cloud service can use to update the cloud-based and/or cloud-backed content items on the cloud service. The changes can include, for example, changes to the cloud-based and/or cloud-backed content items, changes to metadata of the cloud-based and/or cloud-backed content items, changes to the content of the cloud-based and/or cloud-backed content items, changes to the cloud-based and/or cloud-backed content items, etc.

In some cases, method 1340 can include receiving, at a cloud content integration element (e.g., 602) on a local application and from the cloud service, metadata identifying a comment added to the cloud-based and/or cloud-backed content items stored on the cloud service, and presenting, on the local application, the comment with a rendered instance of the cloud-based and/or cloud-backed content items. The comment can be a comment added by a remote user working on the cloud-based and/or cloud-backed content items from the cloud service or a remote user working on a rendered instance of another copy of the cloud-based and/or cloud-backed content items. Moreover, the comment can be presented within the rendered instance of the cloud-based and/or cloud-backed content items, within a separate user interface or application, or within a message or notification to the user of the local application. Thus, a user viewing or working on the rendered instance of the cloud-based and/or cloud-backed content items can receive or view comments added to the cloud-based and/or cloud-backed content items by other users and thereby obtain a collaborative experience when accessing or working on the rendered instance of the cloud-based and/or cloud-backed content items.

In some cases, the local application can receive one or more comments added to the rendered instance of the cloud-based and/or cloud-backed content items from the local application and propagate the one or more comments to the cloud service for inclusion or implementation in the cloud-based and/or cloud-backed content items on the cloud service. For example, when the local application receives a comment added by a user working with the rendered instance of the cloud-based and/or cloud-backed content items at the local application, it can use the cloud content integration element (e.g., 602) to send an update message (e.g., 716, 738, 762, 790) to the cloud service. The update message can identify the comment added by the user to the rendered instance of the cloud-based and/or cloud-backed content items. The cloud service can receive the update message and apply or add the comment from the update message to the cloud-based and/or cloud-backed content items on the cloud service. This way, comments added to the cloud-based and/or cloud-backed content items on the cloud service and comments added to the rendered instance of the cloud-based and/or cloud-backed content items can be exchanged between the local application and the cloud service to provide a collaborative experience and maintain consistency between the cloud-based and/or cloud-backed content items on the cloud service and the content management system.

In some cases, the cloud content integration element (e.g., 602) on the local application can receive, from the cloud service, data associated with the cloud-based and/or cloud-backed content items, such as metadata (e.g., comments, activity, events, tasks, content item information, update information, etc.) associated with the cloud-based and/or cloud-backed content items, one or more previews (e.g., a content item preview such as a text or image preview), indexable content (e.g., text, image, and/or other digital content that can be indexed for searching) corresponding to the cloud-based and/or cloud-backed content items, etc. The data from the cloud service can be presented by the local application as part of the rendered instance of the cloud-based and/or cloud-backed content items, displayed on a separate interface, presented on a message or notification, depicted in storage (e.g., as a file or document in storage), etc.

Moreover, in some cases, the data or portions of the data can be indexed for searching. For example, the local application can receive a search request from a user that includes a query for a portion of the data and, in response to the search request, the local application can search any indexed data on the user account (e.g., 704) for the portion of the data associated with the search request. The local application can then present a search result to the user including any matches or, if no matches are found, an indication that no matches were found.

In some cases, the data associated with the cloud-based and/or cloud-backed content items can include a preview of the cloud-based and/or cloud-backed content items and/or an indication of user activity associated with the cloud-based and/or cloud-backed content items. The user activity can include any interactions between a user(s) and the cloud-based and/or cloud-backed content items, any events generated by a user(s) working on the cloud-based and/or cloud-backed content items, etc. The preview can include, for example, a preview (e.g., an image preview, a text preview, a file preview, etc.) of the cloud-based and/or cloud-backed content items, a preview of one or more portions of content in the cloud-based and/or cloud-backed content items, etc.

The local application can present the preview and/or the user activity to a user having access to the cloud-based and/or cloud-backed content items or viewing/working on a rendered instance of the cloud-based and/or cloud-backed content items. For example, the local application can display an activity feed or activity notification identifying the user activity. In some examples, the preview can be stored in the user account (e.g., 704) and depicted as a content item in storage. The user can view the preview from storage without accessing the cloud-based and/or cloud-backed content items or obtaining a rendered instance of the cloud-based and/or cloud-backed content items. Moreover, the preview can be used by the user's device (e.g., 150) or the content management system (110) to search for content associated with the cloud-based and/or cloud-backed content items.

In some cases, method 1340 can include receiving a request to open a copy of a specific cloud-based and/or cloud-backed content item using a specific application that is different from an online application or editor that is associated with the specific cloud-based and/or cloud-backed content item and provides native support for the specific cloud-based and/or cloud-backed content item and its associated content and features/functionalities. Method 1340 can further include identifying a live collaboration session between users interacting with the specific cloud-based and/or cloud-backed content item and determining that the specific application does not support live collaboration for the copy of the specific cloud-based and/or cloud-backed content item. Method 1340 can also include providing a prompt to the requesting user or device with an option to join the live collaboration session via a different application that supports live collaboration for the specific cloud-based and/or cloud-backed content item, and in response to receiving an acceptance of the option to join the live collaboration session, routing the requesting user or device to the different application and/or joining the requesting user or device to the live collaboration session via the different application.

In some cases, method 1340 can also include generating a plurality of sharing links to the cloud-based and/or cloud-backed content item. The sharing links can be configured with various access rights, and the sharing links can be used to share the cloud-based and/or cloud-backed content item with users and provide such users a specific level of access to the cloud-based and/or cloud-backed content item. For example, the plurality of sharing links can include a view link (e.g., 1102) configured with read-only access rights to the cloud-based and/or cloud-backed content item, an edit link (e.g., 1104) configured with edit access rights to the cloud-based and/or cloud-backed content item, and/or a reference link (e.g., 1106) that uniquely identifies the cloud-based and/or cloud-backed content item and confers no access rights to the cloud-based and/or cloud-backed content item. The method 1340 can involve providing the sharing links to a plurality of client devices or users in order to share the cloud-based and/or cloud-backed content item with such client devices or users.

If a security threat associated with a shared link is detected, such as unauthorized access to a link, method 1340 can include retroactively revoking the associated access rights from the shared link (and/or any copies of the shared link) and/or downgrading the shared link to a reference link (e.g., 1106) in order to prevent unauthorized access to the cloud-based and/or cloud-backed content item and mitigate the security threat. The reference link (e.g., 1106) can be used by any users or devices that have rightful access to the shared link or are authorized to use the shared link, which have since lost any access conferred by the shared link as a result of the revocation of associated access rights and/or the downgrading of the shared link to a reference link, to request and regain access to the cloud-based and/or cloud-backed content item. For example, the user can send an access request including the reference link to the content management system (110), which can then provide the user with another link having the requested access rights or convert the reference link to a link configured with the requested access rights, such as a view link (e.g., 1102) or an edit link (e.g., 1104).

Figure 13D:
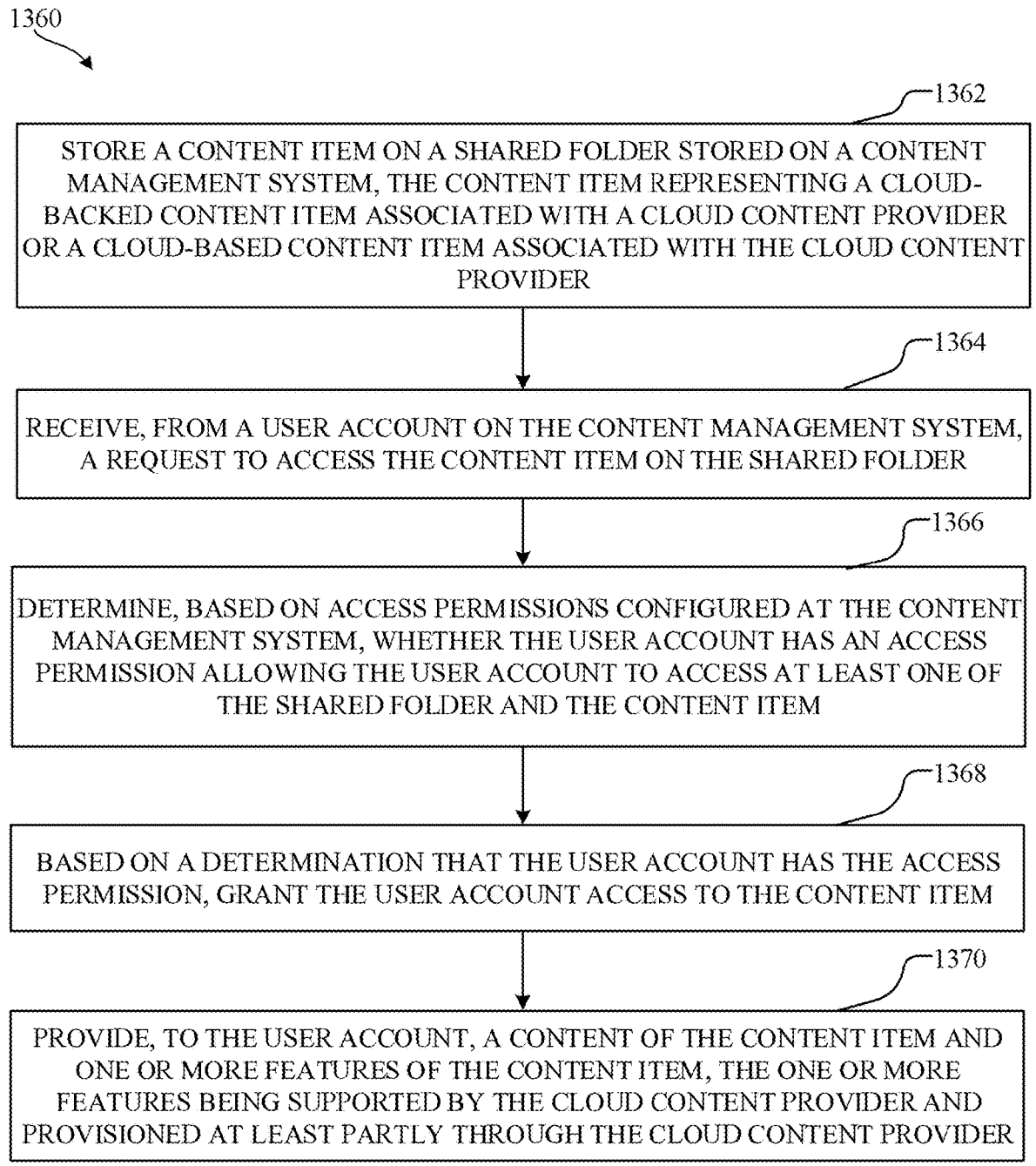
FIG. 13D shows an example method for implementing access control for cloud-based content items and cloud-backed content items on a content management system.

With reference to method 1360 shown in FIG. 13D, at step 1362, method 1360 can include storing a content item in a shared folder stored on a content management system (110), the content item representing a cloud-backed content item associated with a cloud content provider (e.g., 302, 304, 306, 170) or a cloud-based content item associated with the cloud content provider (e.g., 302, 304, 306, 170). In some cases, the content of the content item can be stored on the content management system. For example, the content item can be a canonical content item representing a cloud-based or cloud-backed content item stored on the content management system. In other cases, the content of the content item can be stored on the cloud content provider. For example, the content item can be a smart pointer stored on the content management system and referencing a cloud-based or cloud-backed content item stored on the cloud content provider.

At step 1364, method 1360 can include receiving, from a user account (704) on the content management system, a request to access the content item in the shared folder. For example, the content management system can receive a request from the user account to access the content item from the shared folder using a local application (e.g., 152, 166) on a client device (150) associated with a user. In some cases, the request can be generated when a user associated with the user account invokes the content item from the shared folder, selects the content item, attempts to access the content item from the shared folder, etc.

At step 1366, method 1360 can include determining, based on access permissions configured at the content management system, whether the user account has an access permission allowing the user account to access the shared folder and/or the content item. For example, the content management system can check access permissions set for the shared folder and/or the content item to determine if the user account has an access permission set for allowing the user account to access the shared folder and/or the content item.

In some cases, the access permission can include a content item permission inherited by the content item from a shared folder permission set at the content management system for the shared folder. For example, the content item can inherit permissions from the shared folder it resides in. Thus, if the user account has an access permission allowing the user account access to the shared folder, the user account can inherit from the shared folder an access permission allowing access to the content item in the shared folder.

In some examples, the shared folder permission can include a read permission providing the user account read access to the shared folder or an edit permission providing the user account edit access to the shared folder. The read permission can include, for example, a view and/or read-only permission. The edit permission can include, for example, a permission granting modification rights, write access rights, full control rights (e.g., add, modify, move, delete, rename, etc.), execute privileges allowing the user account to run executable content items, etc.

Moreover, in some examples, the content item permission can include a content item read permission inherited from the read permission associated with the shared folder or a content item edit permission inherited from the edit permission associated with the shared folder. The content management system can grant the user account access to the content item based on the content item permission inherited by the content item from the shared folder permission.

If the content management system determines that the user account does not have an access permission configured allowing the user account to access the shared folder or the content item, the content management system can prevent the user account from accessing the content item. The user associated with the user account can, in turn, optionally request access to the content item from a user having sufficient access to the shared folder and/or the content item to share the content item and/or the shared folder with the user account.

On the other hand, if the content management system determines that the user account has an access permission configured allowing the user account to access the shared folder or the content item, at step 1368, method 1360 can include granting the user account access to the content item based on a determination that the user account has the access permission.

At step 1370, method 1360 can include providing, to the user account, a content of the content item and one or more features of the content item, the one or more features being supported by the cloud content provider and provisioned at least partly through the cloud content provider. In some cases, the one or more features can be designed for access via a native online application (e.g., third-party cloud service application 604) associated with the cloud content provider.

In some examples, providing the one or more features of the content item can include sending, from a cloud content integration element (702) on a local application (e.g., 152, 166) to the cloud content provider, a request for the one or more features of the content item; receiving, at the cloud content integration element on the local application, from the cloud content provider, metadata for enabling the one or more features of the content item; and in response to receiving the metadata for enabling the one or more features of the content item, providing, on the local application, the content item and the one or more features of the content item as part of a rendered instance of the canonical content item. In this example, the one or more features can be provided based on the metadata.

The local application can be a different application than the native online application (e.g., third-party cloud service application 604) associated with the cloud content provider. In some cases, the local application may not natively support the content and/or the one or more features associated with the content item. Moreover, the local application can provide the one or more features and the content of the content item as part of the rendered instance of the canonical content item without translating the content prior to rendering the content. The local application can thus provide support for the content and features of the content item without translating the content prior to rendering the content and despite lacking native support for the content and/or the features of the content item. Such support can be provided as previously described herein.

In some cases, the content of the content item can be stored on and provided from the cloud content provider. For example, the content item can be a smart pointer (504) representing the cloud-backed content item or the cloud-backed content item. The smart pointer can reference the cloud-backed or cloud-based content item, which can have its content stored on the cloud content provider. To provide the content and the one or more features of the content item (e.g., the content and one or more features associated with the smart pointer), the local application can send, from a cloud content integration element (702) to the cloud content provider, a request for the content and one or more features of the content item. The local application can then receive, at the cloud content integration element and from the cloud content provider, the content of the content item and metadata for enabling the one or more features of the content item. In response to receiving the content of the content item and the metadata, the local application can provide the content and one or more features of the content item as part of a rendered instance of the smart pointer.

The local application can use the metadata to provide the one or more features of the content item. Moreover, the local application can provide the one or more features and the content of the content item as part of the rendered instance of the smart pointer without translating the content prior to rendering the content. The local application can provide the content and the one or more features even if the local application does not natively support such content and features as described herein.

In some examples, the content item can be a canonical content item (520) stored on the content management system. The content of the content item can be stored on the content management system and provided via the canonical content item. The canonical content item can represent the cloud-backed content item or the cloud-backed content item. Moreover, in some cases, the one or more features can be designed for access via a native online application (e.g., third-party cloud service application 604) associated with the cloud content provider.

To provide the content of the canonical content item (e.g., the content of the content item), the local application can retrieve the content from storage at the content management system or a client device (150) storing content items of a user account registered at the content management system. Moreover, to provide the one or more features of the canonical content item (e.g., the one or more features of the content item), the local application can send, from a cloud content integration element (e.g., 702) to the cloud content provider, a request for the one or more features of the content item. The local application can receive (e.g., via the cloud content integration element) from the cloud content provider, metadata for enabling the one or more features of the content item. In response to receiving the metadata for enabling the one or more features of the content item, the local application can provide the content of the content item (e.g., retrieved from storage) and the one or more features of the content item as part of a rendered instance of the canonical content item.

The one or more features can be provided based on the metadata. The local application can provide the one or more features and the content of the content item as part of the rendered instance of the canonical content item without translating the content prior to rendering the content. Moreover, the local application can provide the content and the one or more features as described herein, even if it lacks native support for the content and/or features.

In some cases, the one or more features can include one or more collaboration functionalities. The one or more collaboration functionalities can include, for example and without limitation, active commenting on the content of the content item, bi-directional communication between user accounts working on the content item, accessing user activity associated with user accounts working on the content item, authoring functionalities, previewing functionalities, sharing functionalities, etc.

In some implementations, method 1360 can include receiving, from the content management system, one or more additional features supported by the content management system. The one or more additional features can provide additional functionality for the content item. In some examples, the one or more additional features can include organization settings associated with the one or more user accounts registered at the content management system, sharing features, access control, etc.

In some cases, the content management system can provide the source of truth for permissions of cloud-based and/or cloud-backed content items, such as canonical content items, stored at the content management system as well as one or more cloud content providers. For example, while the content item can have synchronized copies on the cloud content provider and/or can have its content stored at the cloud content provider (e.g., if the content item is a smart pointer), the content management system can nevertheless provide the source of truth for permissions to the content item.

Thus, access to the content item, including reading, editing, renaming, moving, sharing, deleting, etc., can be controlled by the content management system. In some cases, the content management system can provide a user on the content management system certain access to the content item even if the cloud content provider does not provide or has not enabled such access to the user. For example, assume User A and User B have a cloud-based or cloud-backed content item stored at the cloud content provider. Assume that User A then stores a copy of the cloud-based or cloud-backed content item, such as a canonical content item, in a folder on the content management system and shared the folder with User C at the content management system. Despite User C not having permission at the cloud content provider to access the cloud-based or cloud-backed content item and its contents, User C in this example may be able to access the cloud-based or cloud-backed content item from the shared folder on the content management system.

Thus, the content management system can implement the access permissions on the content management system (e.g., the access permissions for the shared folder, the cloud-based or cloud-backed content item, and/or User C) to determine whether to provide User C access to the cloud-based or cloud-backed content item. If User C then shares the cloud-based or cloud-backed content item with User D at the content management system (e.g., by moving or copying the cloud-based or cloud-backed content item to a folder shared between User C and User D), User D can obtain access to the cloud-based or cloud-backed content item based on the access permissions at the content management system even if User D does not have sufficient access to the cloud-based or cloud-backed content item through the cloud content provider.

However, in some implementations, the content management system can implement policies preventing users from sharing some or all types of cloud-based or cloud-backed content items (e.g., canonical content items, smart pointers, etc.) outside of the content management system's ecosystem and/or with users that do not have accounts at the content management system. For example, in some cases, the content management system may implement a policy that would prevent a user from sharing a smart pointer on the content management system, which would have its associated content stored at the cloud content provider, with users that do not have accounts at the content management system and/or storing the smart pointer outside of the content management system's ecosystem.

In some cases, a user can access the content item stored on the shared folder at the content management system from the native online application associated with the content item and the cloud content provider. The access permissions (e.g., access control lists) at the content management system can still control the level of access (if any) provided to the user. However, in some cases, the native online application can also apply access permissions defined at the cloud content provider for the content item (or an associated cloud-based or cloud-backed content item at the cloud content provider).

For example, the native online application can apply access permissions set at the cloud content provider in addition to, or on top of, the access permissions at the content management system. In some implementations, if there is a conflict between the access permissions at the content management system and the access permissions at the cloud content provider, the access permissions at the content management system control. In other implementations, the more restrictive access permissions—between the access permissions at the content management system and the cloud content provider—can control. In yet other implementations, the more permissive access permissions—between the access permissions at the content management system and the cloud content provider—can control.

A non-limiting, illustrative example snippet of code for access to a cloud-based or cloud-backed content item on the content management system (CMS) is provided below:

```
1  get("/ContentItem/{ContentItem_ID }", function(request, response)
   {
2     // Request access via an API associated with CMS 110 (e.g., 310, 312, 314)
3     access = httpPost("https://api.CMS.com/Cloud_ContentItems/metadata", {
4        {"ContentItem_ID": request.params.ContentItem_ID
5     });
6     if (access.error) { // user has no permission to access this cloud-based or cloud-backed content item
7        response.write(403);
8     } else {
9        ContentItem_ID = sql.execute(
10          "SELECT my_ID FROM cms_cloud_content_items WHERE cloud_content_item id = $1",
11          [request.params.ContentItem_ID}
12       );
13       // Show view-only version of this content item if no edit access
         is available
14       Return render_ContentItem(ContentItem_ID, content = content, edit = response.is_editor)
15    }
16 })
```

Figure 14:
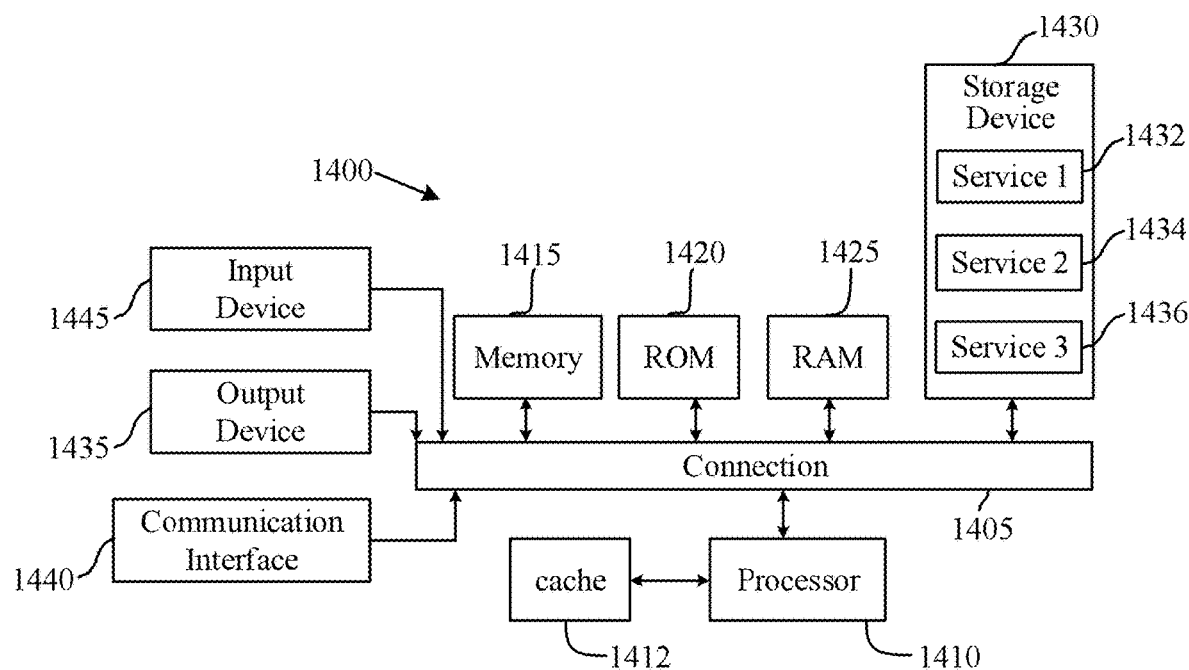
FIG. 14 shows an example system for implementing various aspects of the present technology.

FIG. 14 shows an example of computing system 1400, which can be for example any computing device making up client device 150, content management system 110 or any component thereof in which the components of the system are in communication with each other using connection 1405. Connection 1405 can be a physical connection via a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 1400 includes at least one processing unit (CPU or processor) 1410 and connection 1405 that couples various system components including system memory 1415, such as read only memory (ROM) 1420 and random access memory (RAM) 1425 to processor 1410. Computing system 1400 can include a cache of high-speed memory 1412 connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms known to those of skill in the art. In some instances, multimodal systems can enable a user to provide multiple types of input/output to communicate with computing system 1400. Computing system 1400 can include communications interface 1440, which can generally govern and manage the user input and system output. There is no restriction on operating on any particular hardware arrangement and therefore the basic features here may easily be substituted for improved hardware or firmware arrangements as they are developed.

Storage device 1430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B. In other words, claim language reciting "at least one of A and B" means A and/or B.

What is claimed is:

1. A method comprising:
   receiving a first request to access a canonical content item stored at a content management system, the canonical content item representing a content item comprising a cloud-based content item or a cloud-backed content item, wherein one or more features of the content item are designed for access through a native online application associated with a cloud content provider;
   in response to the canonical content item being invoked, sending, from a local application to the cloud content provider, a second request for the one or more features of the content item;
   receiving, at the local application and from the cloud content provider, metadata for enabling the one or more features of the content item; and
   in response to receiving the metadata for enabling the one or more features of the content item, providing, on the local application, the one or more features of the content item and a content of the content item as part of a rendered instance of the canonical content item.

2. The method of claim 1, wherein the second request comprises at least one of (1) authentication information associated with the content management system, (2) a unique identifier associated with at least one of the canonical content item or the content item, or (3) access permissions configured at the content management system for the canonical content item, wherein the canonical content item is stored at a user account that is registered at the content management system and associated with the local application.

3. The method of claim 1, wherein the cloud content provider comprises a third-party cloud service that is separate from the content management system, wherein the local application is different from the native online application associated with the cloud content provider and lacks native support for the one or more features associated with the content item, the local application providing the one or more features and the content of the content item as part of the rendered instance of the canonical content item without translating the content prior to presentation of the content.

4. The method of claim 1, wherein providing the one or more features and the content of the content item as part of the rendered instance of the canonical content item comprises providing access and support to the one or more features associated with the content item through the metadata and at least one of the canonical content item, the local application, or the content management system.

5. The method of claim 4, wherein the one or more features comprise one or more collaboration functionalities supported by the cloud content provider, the one or more collaboration functionalities comprising functionality for at least one of active commenting on the content of the content item, bi-directional communication between user accounts working on the content item, or accessing user activity associated with user accounts working on the content item.

6. The method of claim 1, further comprising:
   performing, using the local application, a filesystem operation on the canonical content item; and
   propagating, from the local application to the cloud content provider, one or more changes associated with the filesystem operation performed on the canonical content item, the one or more changes comprising at least one of an update to the content of the content item, an update to a copy of the content of the content item that is stored on the cloud content provider, or an update to metadata that is associated with the content item.

7. The method of claim 1, wherein the metadata comprises a first comment added to a copy of the content item stored on the cloud content provider, the method further comprising:
   presenting, on the local application, the first comment with the rendered instance of the canonical content item;
   receiving, by the local application, a second comment added to the rendered instance of the canonical content item from a client device associated with the local application; and
   propagating, from the local application to the cloud content provider, the second comment to the copy of the content item stored on the cloud content provider.

8. The method of claim 1, further comprising:
   receiving, from the cloud content provider, data associated with the content item stored on the cloud content provider, the data comprising at least one of the metadata associated with the content item or one or more portions of content associated with a copy of the content item stored on the cloud content provider;
   in response to a search request associated with the data, searching indexed data on a user account registered at the content management system for at least one of the metadata or the one or more portions of content, the user account containing a plurality of content items stored on the content management system, and the indexed data comprising at least a portion of the data associated with the content item; and presenting a search result at the local application.

9. The method of claim 1, wherein the metadata comprises at least one of a preview of the content item or an indication of user activity associated with the content item, the user activity comprising one or more interactions between one or more users and the content item, the method further comprising:

presenting, at the local application, at least one of the preview of the content item or the user activity associated with the content item, the user activity being presented within at least one of the rendered instance of the canonical content item, an activity feed, or a notification message.

10. The method of claim 1, further comprising:

providing, to a plurality of client devices, a plurality of sharing links to the canonical content item, the plurality of sharing links comprising a view link configured with read-only access rights to the canonical content item and an edit link configured with edit access rights to the canonical content item;

in response to a security threat associated with at least one of the view link or the edit link, retroactively revoking associated access rights from the at least one of the view link or the edit link and downgrading the at least one of the view link or the edit link to a reference link that uniquely identifies the canonical content item and confers no access rights to the canonical content item; and in response to an access request comprising the reference link, providing, to one or more client devices associated with the access request, a sharing link configured with at least one of read-only access rights to the canonical content item or edit access rights to the canonical content item, the sharing link being provided based on the reference link.

11. The method of claim 1, further comprising:

receiving, from the content management system, one or more additional features associated with the canonical content item and supported by the content management system, the one or more additional features comprising at least one of (1) access permission settings associated with the canonical content item and a user account registered at the content management system, (2) organization settings associated with the canonical content item and the user account registered at the content management system, or (3) sharing features associated with the canonical content item.

12. A computing device comprising:

one or more processors; and at least one non-transitory computer-readable medium having stored therein instructions which, when executed by the one or more processors, cause the computing device to:

receive a first request to access a canonical content item stored at a content management system, the canonical content item representing a content item comprising a cloud-based content item or a cloud-backed content item, wherein one or more features of the content item are designed for access through a native online application associated with a cloud content provider;

in response to the canonical content item being invoked, send, from a local application to the cloud content provider, a second request for the one or more features of the content item;

receive, at the local application and from the cloud content provider, metadata for enabling the one or more features of the content item; and in response to receiving the metadata for enabling the one or more features of the content item, provide, on the local application, the one or more features of the content item and a content of the content item as part of a rendered instance of the canonical content item.

13. The computing device of claim 12, wherein the second request comprises at least one of (1) authentication information associated with the content management system, (2) a unique identifier associated with at least one of the canonical content item or the content item, or (3) access permissions configured at the content management system for the canonical content item, wherein the canonical content item is stored at a user account that is registered at the content management system and associated with the local application.

14. The computing device of claim 12, wherein the cloud content provider comprises a third-party cloud service that is separate from the content management system, wherein the local application is different from the native online application associated with the cloud content provider and lacks native support for the one or more features associated with the content item, the local application providing the one or more features and the content of the content item as part of the rendered instance of the canonical content item without translating the content prior to presentation of the content.

15. The computing device of claim 12, wherein providing the one or more features and the content of the content item as part of the rendered instance of the canonical content item comprises providing access and support to the one or more features associated with the content item through the metadata and at least one of the canonical content item, the local application, or the content management system, wherein the one or more features comprise a collaboration functionality supported by the cloud content provider, the collaboration functionality comprising at least one of active commenting on the content of the content item, bi-directional communication between user accounts working on the content item, or accessing user activity associated with user accounts working on the content item.

16. The computing device of claim 12, wherein the at least one non-transitory computer-readable medium stores additional instructions which, when executed by the one or more processors, cause the computing device to:

perform, using the local application, a filesystem operation on the canonical content item; and propagate, from the local application to the cloud content provider, one or more changes associated with the filesystem operation performed on the canonical content item, the one or more changes comprising at least one of an update to the content of the content item, an update to a copy of the content of the content item that is stored on the cloud content provider, or an update to metadata that is associated with the content item.

17. The computing device of claim 12, wherein the metadata comprises at least one of a comment added to a copy of the content item stored on the cloud content provider, a preview of the content item or an indication of user activity associated with the content item, the user activity comprising one or more interactions between one or more user accounts and the content item, wherein the at least one non-transitory computer-readable medium stores additional instructions which, when executed by the one or more processors, cause the computing device to:

present at least one of the comment, the preview of the content item, or the user activity;
receive, by the local application, a second comment added to the rendered instance of the canonical content item from a client device associated with the local application; and
propagate, from the local application to the cloud content provider, the second comment to the copy of the content item stored on the cloud content provider.

18. The computing device of claim 12, wherein the at least one non-transitory computer-readable medium stores additional instructions which, when executed by the one or more processors, cause the computing device to:
receive, from the cloud content provider, data associated with the content item, the data comprising at least one of the metadata associated with the content item or one or more portions of content associated with a copy of the content item stored on the cloud content provider;
in response to a search request, search indexed data on a user account registered at the content management system for at least one of the metadata or the one or more portions of content, the user account containing a plurality of content items stored on the content management system, and the indexed data comprising at least a portion of the data associated with the content item; and
present a search result at the local application.

19. A non-transitory computer-readable medium comprising instructions that, when executed by one or more processors, cause the one or more processors to:
receive a first request to access a canonical content item stored at a content management system, the canonical content item representing a content item comprising a cloud-based content item or a cloud-backed content item, wherein one or more features of the content item are designed for access through a native online application associated with a cloud content provider;
in response to the canonical content item being invoked, send, from a local application to the cloud content provider, a second request for the one or more features of the content item;
receive, at the local application and from the cloud content provider, metadata for enabling the one or more features of the content item; and
in response to receiving the metadata for enabling the one or more features of the content item, provide, on the local application, the one or more features of the content item and a content of the content item as part of a rendered instance of the canonical content item.

20. The non-transitory computer-readable medium of claim 19, wherein the cloud content provider comprises a third-party cloud service that is separate from the content management system, wherein the local application is different from the native online application associated with the cloud content provider and lacks native support for the one or more features associated with the content item, the local application providing the one or more features and the content of the content item as part of the rendered instance of the canonical content item without translating the content prior to presentation of the content.

* * * * *